US007716691B2

(12) United States Patent
Tatekawa

(10) Patent No.: US 7,716,691 B2
(45) Date of Patent: May 11, 2010

(54) DISK-STORING DISK DEVICE WITH LATERALLY DISPOSED SWITCHOVER MEMBER

(75) Inventor: Tsutomu Tatekawa, Iwaki (JP)

(73) Assignee: Alpine Electronics, Inc., Tokyo (JP)

(*) Notice: Subject to any disclaimer, the term of this patent is extended or adjusted under 35 U.S.C. 154(b) by 894 days.

(21) Appl. No.: 11/541,499

(22) Filed: Sep. 29, 2006

(65) Prior Publication Data
US 2007/0076538 A1    Apr. 5, 2007

(30) Foreign Application Priority Data
Sep. 30, 2005    (JP)    ............... 2005-285995

(51) Int. Cl.
*G11B 7/085*  (2006.01)
*G11B 21/08*  (2006.01)
(52) U.S. Cl. .................................. 720/619; 369/30.85
(58) Field of Classification Search ............. 369/30.78, 369/30.85, 30.87, 30.9; 720/619–625
See application file for complete search history.

(56) References Cited

U.S. PATENT DOCUMENTS

| 5,687,145 | A  | * | 11/1997 | Takashina et al. ......... 369/30.87 |
| 6,411,590 | B1 |   | 6/2002  | Yoshida et al. |
| 6,466,524 | B1 | * | 10/2002 | Fujimoto ................... 369/30.85 |
| 6,817,022 | B1 | * | 11/2004 | Taniguchi et al. ........... 720/623 |
| 2003/0151986 | A1 | * | 8/2003 | Otsuki ....................... 369/30.85 |
| 2004/0057349 | A1 |   | 3/2004 | Nishida et al. |
| 2005/0235296 | A1 | * | 10/2005 | Ito .............................. 720/619 |
| 2006/0193213 | A1 | * | 8/2006 | Nishida et al. ............. 369/30.85 |
| 2007/0086285 | A1 |   | 4/2007 | Tokita et al. |
| 2008/0019229 | A1 | * | 1/2008 | Handa et al. .............. 369/30.85 |

FOREIGN PATENT DOCUMENTS

| JP | 06-203519 | 7/1994 |
| JP | 2000-163851 | 6/2000 |
| JP | 2000-173150 | 6/2000 |
| JP | 2001-101745 | 4/2001 |
| JP | 2001-266449 | 9/2001 |
| JP | 2002-237124 | 8/2002 |
| JP | 2004-063017 | 2/2004 |
| JP | 2004-355666 | 12/2004 |
| JP | 2005-011528 | 1/2005 |
| JP | 2005-202990 | 7/2005 |

* cited by examiner

*Primary Examiner*—Brian E Miller
(74) *Attorney, Agent, or Firm*—Brinks Hofer Gilson & Lione

(57) ABSTRACT

A disk-storing disk device includes a mechanism base provided at a position beyond the perimeter of a disk stored in a disk storing region provided vertically within a middle portion of a casing, and a switchover member which moves following an arc path is provided on the mechanism base. Switching operations of various types of mechanisms can be performed by this switchover member. Also, other switchover members can be disposed vertically overlapping the mechanism base. Accordingly, the vertical movement region for holding disks can be made larger, and also, the planar area of the casing can be reduced. This allows a greater number of disks to be stored within the casing, while reducing the size of the casing.

15 Claims, 20 Drawing Sheets

X1 ←——→ X2

DISK-STORING DISK DEVICE WITH LATERALLY DISPOSED SWITCHOVER MEMBER

RELATED APPLICATIONS

The present application claims priority to Japanese Patent Application Number 2005-285995, filed Sep. 30, 2005, the entirety of which is hereby incorporated by reference.

BACKGROUND OF THE INVENTION

1. Field of the Invention

The present invention relates to a disk-storing disk device wherein multiple disks are stored within a casing, and the disks are selected to be driven.

2. Description of the Related Art

Japanese Unexamined Patent Application Publication No. 2004-63017 (hereafter also referred to as "known document") discloses a disk changer wherein multiple supporting members are stored within a casing. With this disk changer, disks inserted from an insertion opening in the casing are held by respective supporting members. Provided within the casing is a supporting member selecting mechanism for selecting one of the multiple supporting members and increasing the spacing between the selected supporting member and another supporting member adjacent thereto below.

With the disk changer described in the above known document, a driving unit having a turntable on an end thereof is provided within the casing, the driving unit turns on a supporting axis serving as a pivot situated at the base thereof, and pivots from a position beyond the perimeter of a disk supported by a supporting member toward the inside of the casing. The driving unit enters the space between the selected supporting member and the supporting member situated below, and the disk held by the selected supporting member is clamped to the turntable.

With this type of disk device, various types of motive force transporting paths are necessary, such as motive force for turning the driving unit, motive force for moving the supporting members vertically with the supporting member selecting mechanism, motive force for carrying disks in the casing from the insertion opening and carrying disks out of the casing from the insertion opening, and so forth.

With the disk changer disclosed in the known document, motors serving as the power sources of each of the motive forces, and switchover mechanisms for switching the motive power of the motors, are primarily disposed in a concentrated manner on the base face of the casing. However, such types of switchover mechanisms for performing various actions such as turning of driving units, supporting member selection with the supporting member selecting mechanism, and so forth, require a great number of mechanism components, gears, and so forth. Disposing such motors, mechanism components, gears, and so forth, in a concentrated manner on the base face of the casing requires a wide placement space for the mechanisms on the base face of the casing.

In this case, moving a supporting member supporting a disk to a position close to the base face of the casing at the time of selection operations may lead to the supporting member or the disk colliding with the mechanisms, and accordingly the movement range in the downward direction is restricted. Accordingly, the number of supporting members which can be disposed within the casing is restricted, so that either the number of disks which can be stored in the casing needs to be reduced, or the vertical height of the casing needs to be increased.

Also, in the event of increasing the number of supporting members within the casing and bringing a supporting member close to the base face of the casing in the selection operation, there is a need to disperse the placement of the motors, mechanism components, gears, and so forth, on the base face of the casing, to positions away from the edge of the disk held by the supporting member. Accordingly, a wider footprint is required for the casing, and the width and depth dimensions of the casing cannot be reduced.

SUMMARY OF THE INVENTION

The present invention has been made to solve the above-described problems of the conventional art, and accordingly, it is an object of the invention to provide a disk-storing disk device wherein multiple supporting members can be moved over a wide range in the axial direction of the disks within the casing, and further wherein many mechanisms can be disposed in a narrow space away from the perimeter of the disks without increasing the size of the casing.

According to a first aspect of the present invention, a disk-storing disk device having a casing comprises within the casing: a disk storing region in which a plurality of supporting members capable of supporting a disk are disposed in a stacked manner in the axial direction of the disk; a supporting member selecting mechanism for moving the supporting members in the axial direction within the disk storing region so as to move one of the supporting members to a selecting position; a driving unit for clamping a disk held by the supporting member at the selecting position, and rotatably driving the disk; a transporting mechanism for transporting a disk inserted from an insertion opening of the casing to the selected supporting member at the selecting position; a mechanism supporting unit disposed within the casing, outside the perimeter of disks stored in the disk storing region, and between the upper limit and lower limit of a moving region of the supporting members at the time of selection; and a first switchover member, provided with the mechanism supporting unit, disposed outside the perimeter of disks stored in the disk storing region, and moving along an arc path following the perimeter.

With the disk-storing disk device according to the present invention, a switchover member is provided with the mechanism supporting unit, disposed within the casing outside the perimeter of disks stored in the disk storing region, and between the upper limit and lower limit of a moving region of the supporting members at the time of selection, and moves along an arc path following the perimeter of disks stored in the disk storing region. Accordingly, the middle region in the vertical direction of the casing (the axial direction of disks stored in the disk storing region) can be efficiently used, and the first switching member essentially can be moved a long distance within a narrow space, so as to switch over operations of the mechanisms.

The disk-storing disk device may further comprise within the casing a motive power transmission mechanism separate from the first switchover member, at a position overlapping the first switchover member above or below in the movement region thereof. Thus, providing a motive power transmission mechanism separate from the first switchover member and vertically overlapping the first switchover member allows the supporting members to be stored over a wide range in the vertical direction in the disk storing region, so not only can the number of stored disks be increased, but also the footprint of the casing can be reduced.

In this case, the disk-storing disk device may further comprise a second switchover member, provided to the motive power transmission mechanism, disposed outside the perimeter of disks in the disk storing region, and moving along an arc path following the perimeter.

With this configuration, the two separate switchover members vertically stacked both move along an arc path, so that distributing the tasks of switching the operations of the respective mechanisms between these switchover members enables the switchover mechanisms to be disposed in a concentrated manner within a narrow space.

The disk-storing disk device may further comprise a shutter for opening/closing an insertion opening of the casing by the moving force of the first switchover member provided to the mechanism supporting unit. Also, the transporting mechanism may be moved from a standby position closest to an insertion opening of the casing to a transporting operation position close to the supporting member at the selecting position by the moving force of the first switchover member provided to the mechanism supporting unit. Further, the disk-storing disk device may further comprise a holding member provided to each of the supporting members, for moving between a holding position where a disk is held and a holding disengaged position where the holding is disengaged, wherein the holding member of a supporting member at the selecting position is operated between the holding position and the holding disengaged position by the moving force of the first switchover member provided to the mechanism supporting unit.

The moving force of the first switching member provided with the mechanism supporting unit may be used to move any two, or all, of a shutter, the transporting mechanism, and the holding member.

Further, the mechanism supporting unit may further comprise a motor for driving the first switchover member, and a plurality of gears for transmitting the motive force of the motor to the first switchover member.

Providing a motor for the mechanism supporting member at a vertically intermediate position within the casing enables the motor to be disposed at a position overlapping with a switchover member either above or below, or another motor either above or below, so the space within the casing can be used even more efficiently.

The moving range of the first switchover member provided to the mechanism supporting unit may be a region from the inner side of a front face of the casing where an insertion opening is formed to the inner side of a side face, with the moving range of the first switchover member being set at a position vertically overlapping the carry-in path of a disk from the insertion opening to the supporting member at the selecting position. This configuration allows the moving range of the first switchover member to be longer, and the operations of various different types of mechanisms can be switched over with shifted timings due to the moving force of the first switchover member.

The mechanism supporting unit may have a flat face parallel to a base face of the casing, with an inner edge of the mechanism supporting unit being formed as a recessed curve away from the perimeter of disks within the disk storing region and following the perimeter. This configuration allows the area of the mechanism supporting unit to be as wide as possible, and various types of mechanisms can be disposed upon the mechanism supporting unit.

The above configuration allows the moving range of the supporting members within the disk storage region to be a range from a position close to the inner side of a base face of the casing to a position close to the inner side of a ceiling face.

Note that the driving unit actions may be rotational, as described later in embodiments of the invention, or may be linearly sliding actions.

Moreover, the supporting member selecting mechanism may use selecting shafts having spiral selecting grooves as described later in embodiments of the invention, or may operate protrusions protruding from each supporting member with a linearly-sliding cam or the like so as to select a supporting member.

With the disk-storing disk device according to the present invention, mechanisms can be disposed within the casing effectively using space to the sides of the moving region of supporting members. Accordingly, a greater number of supporting members can be disposed within the disk storing region, and further, the footprint of the casing can be reduced, thereby reducing the size of the device.

DESCRIPTION OF THE PREFERRED EMBODIMENTS

Overall Configuration

Figure 1:
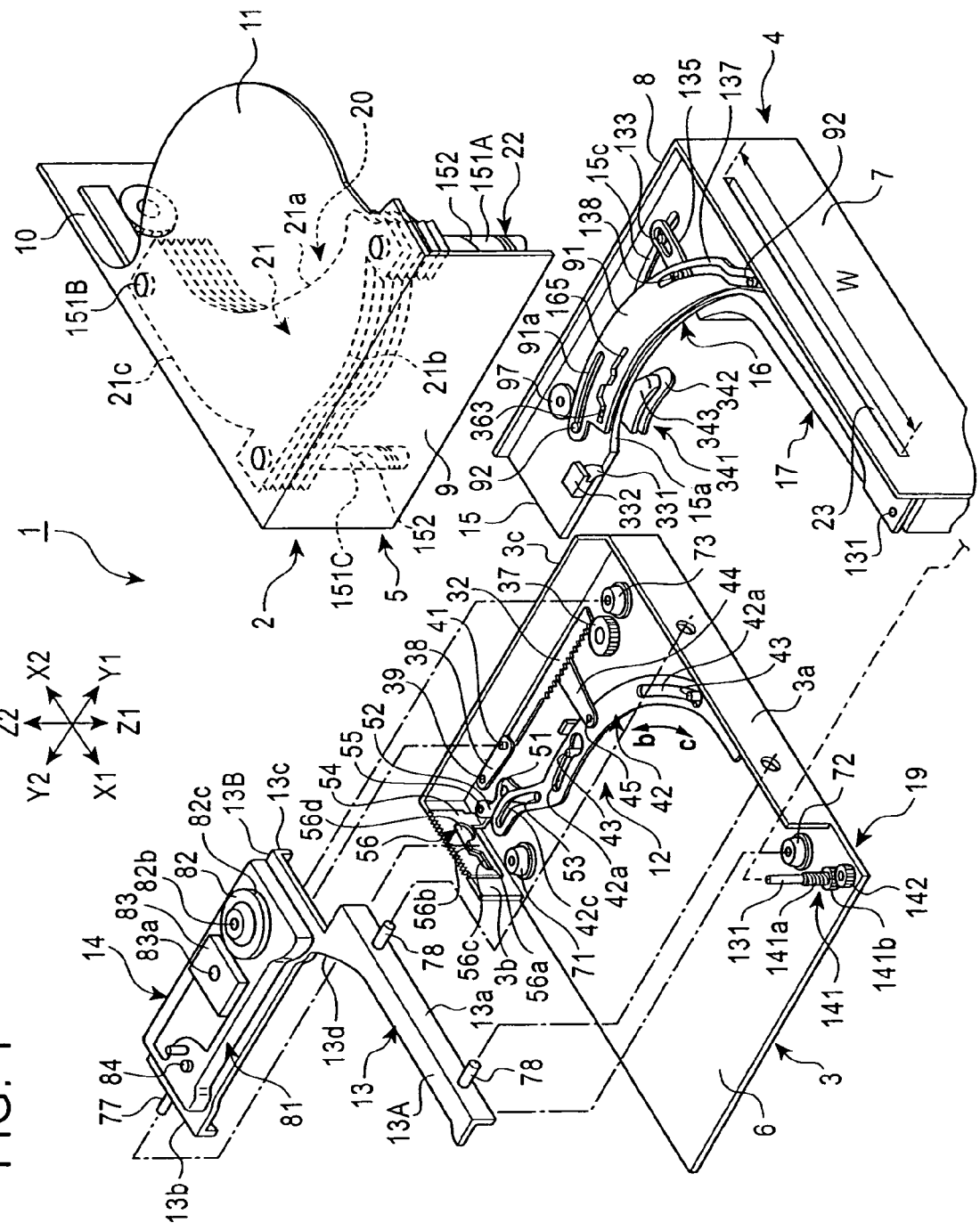
FIG. 1 is a disassembled perspective view illustrating the overall configuration of a disk-storing disk device according to an embodiment of the present invention.

A disk-storing disk device 1 shown in FIG. 1 has a box-shaped casing 2. The reference directions of this casing 2 is as follows; the Z1 side is the lower side, the Z2 side is the upper side, the X1 side is the left side, the X2 side is the right side, the Y1 side is the near (front) side, and the Y2 side is the far (rear) side. Further, the X1-X2, Y1-Y2 direction is the horizontal direction, and the Z1-Z2 direction is the vertical direction.

The casing 2 is assembled of a lower casing 3, middle casing 4, and upper casing 5 being stacked from the bottom up in that order. The lower casing 3 has a base face 6 of the casing 2, and the middle casing 4 has a front face 7 and right side face 8. The upper casing 5 has a left side face 9, rear side face 10, and ceiling face 11.

A first motive force transmission mechanism 12 is provided on the upper face of the base face 6 of the lower casing 3. A unit supporting base 13 is supported above the first motive force transmission mechanism 12, and a driving unit 14 is mounted on the unit supporting base 13. A mechanism base 15 parallel to the base face 6 is provided as a mechanism supporting unit to the upper part of the middle casing 4, and a second motive force transmission mechanism 16 is provided above the mechanism base 15. In the middle casing 4, a transporting unit (transporting mechanism) 17 is provided below the mechanism base 15 and on the inner side of the front face 7. A third motive force transmission mechanism 19 is provided between the edge of the left side (X1 side) of the transporting unit 17 and the base face 6 of the lower casing 3. The third motive force transmission mechanism 19 functions as a roller driving means.

At the upper casing 5, a region defined by the left side face 9, rear side face 10, and ceiling face 11 serves as a disk storing region 20, this disk storing region 20 having multiple supporting members 21 each capable of supporting a disk D. In the present embodiment, there are six supporting members 21 provided, with the supporting members 21 being stacked in the axial (vertical) direction. A supporting member selecting mechanism 22 is provided to the upper casing 5, and the supporting member selecting mechanism 22 operates such that one of the six supporting members 21 is selected and moved to a selection position (a) shown in FIG. 2B, and also the gap between the selected supporting member 21 and the supporting member adjacent thereto below is increased.

The disk D has a diameter of 12 cm, and is for example, a CD (compact disk), DVD (digital versatile disk), DVD-ROM, or the like.

Figure 2A:
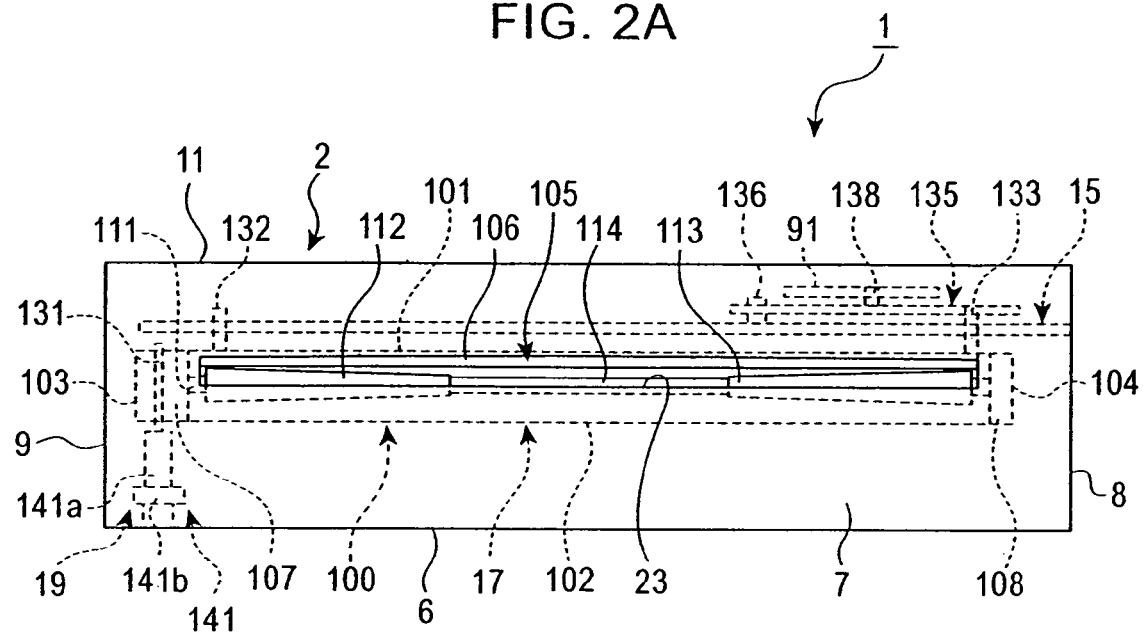
FIGS. 2A and 2B are frontal views of the casing of the disk-storing disk device, wherein FIG. 2A primarily illustrates a transportation unit within the casing, and FIG. 2B primarily illustrates a supporting member selecting mechanism and driving unit.
Figure 2B:
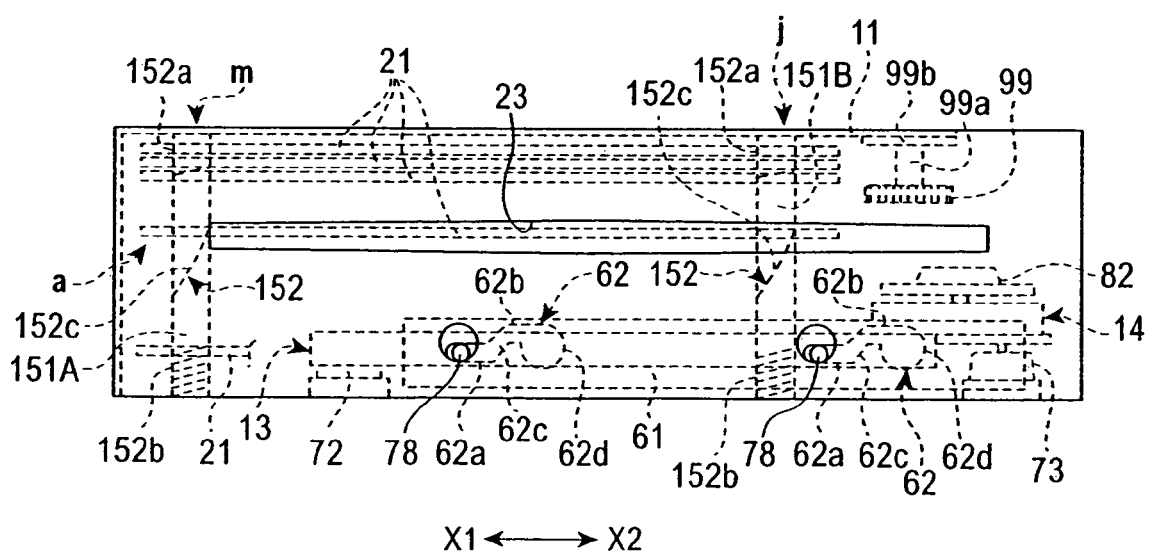

As shown in FIGS. 2A and 2B, an insertion opening 23 is formed in the front face 7 of the casing 2. The insertion opening 23 is formed as a slit, with the vertical dimensions being slightly larger than the thickness dimension of the disk D, and the opening width dimensions W in the horizontal direction being slightly greater than the diameter of the disk D.

As shown in FIG. 2A, the transporting unit 17 is positioned at the same height as the insertion opening 23, and a disk D inserted through the insertion opening 23 is transported to the disk storing region 20 by the transporting unit 17. As shown in FIG. 2B, of the multiple supporting units 21, the supporting member 21 which has reached the selection position (a) attains the same height as the insertion opening 23, and the disk D inserted through the insertion opening 23 is transported by the transporting unit 17 to the lower face (Z1 side face) of the supporting member 21 at the selection position (a), and is thus supported.

Figure 20:
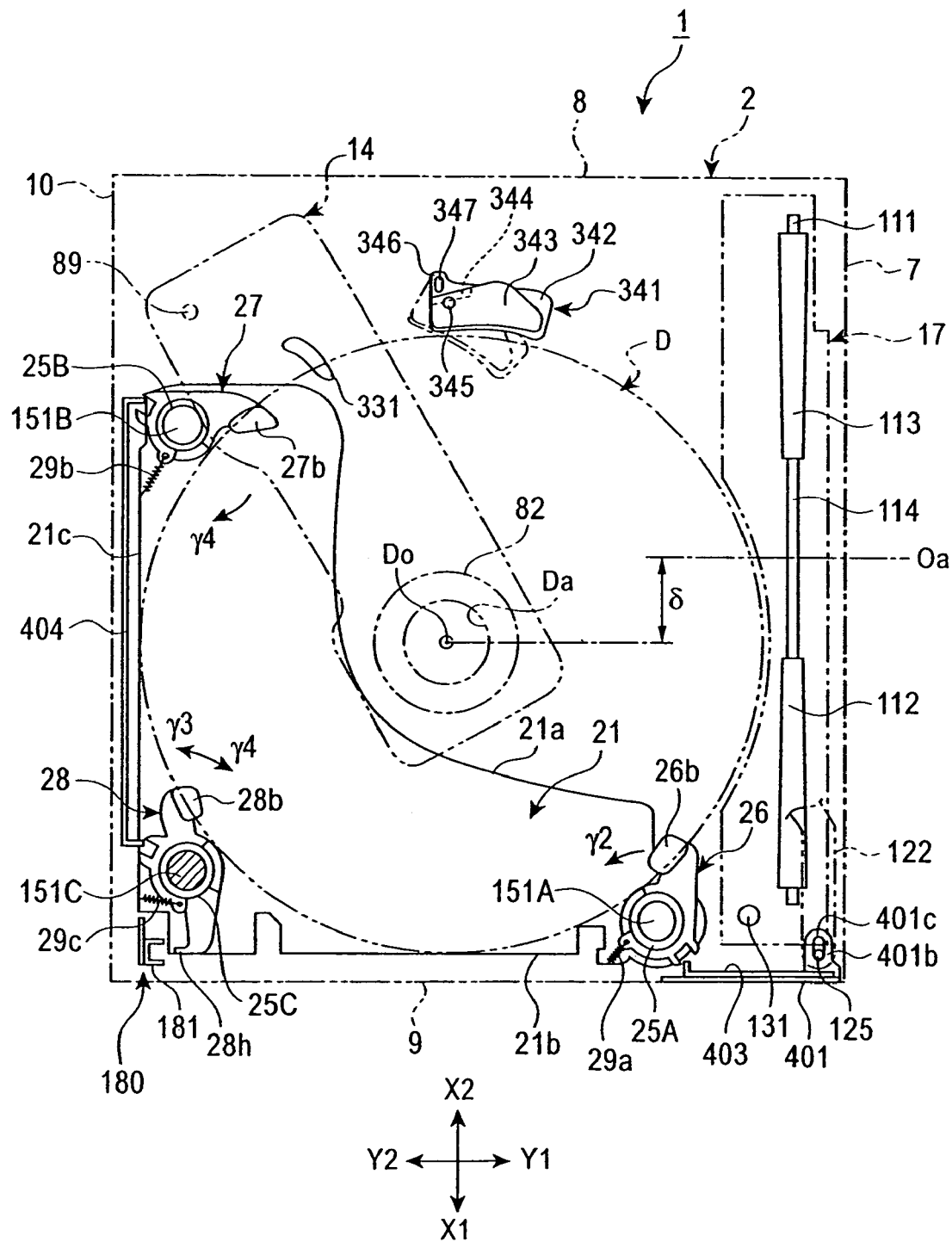

FIG. 20 is a plan drawing viewing the casing 2 from the ceiling face 11 side. An imaginary line which bisects the width dimension W of the insertion opening 23 formed in the front face 7 of the casing 2 and which is orthogonal to the front face 7 and extends inward in the casing 2 is taken as an insertion center line Oa. The center D0 of the disk D supported by the supporting member 21 within the disk supporting region 20 is at a position shifted toward the left side (X1 side) from the insertion center line Oa by a distance of δ. The distance δ is 1/10 of the diameter of the disk D or greater.

Figure 6:
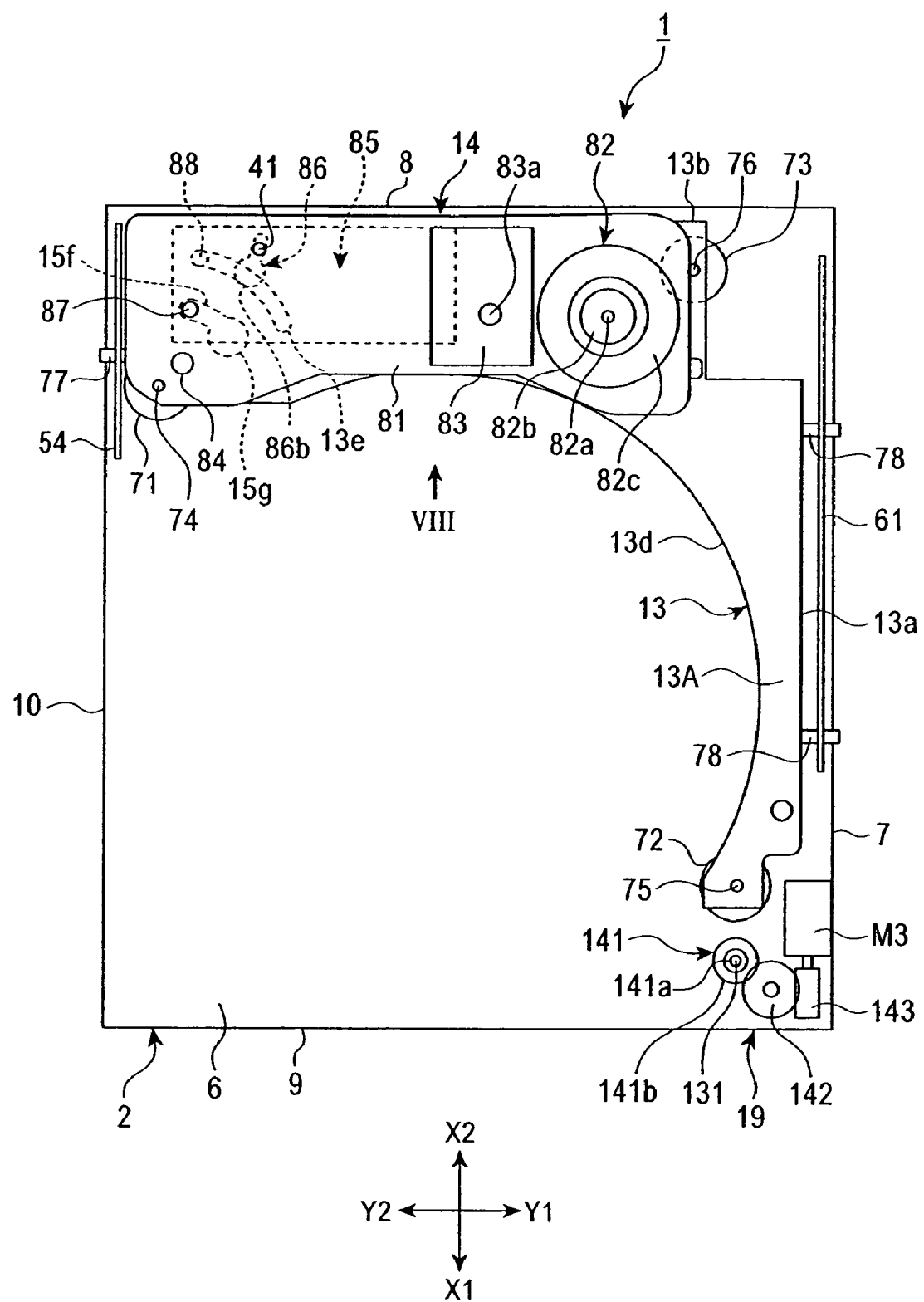
FIGS. 6 and 7 are plan views illustrating the driving unit and unit supporting base.
Figure 8:
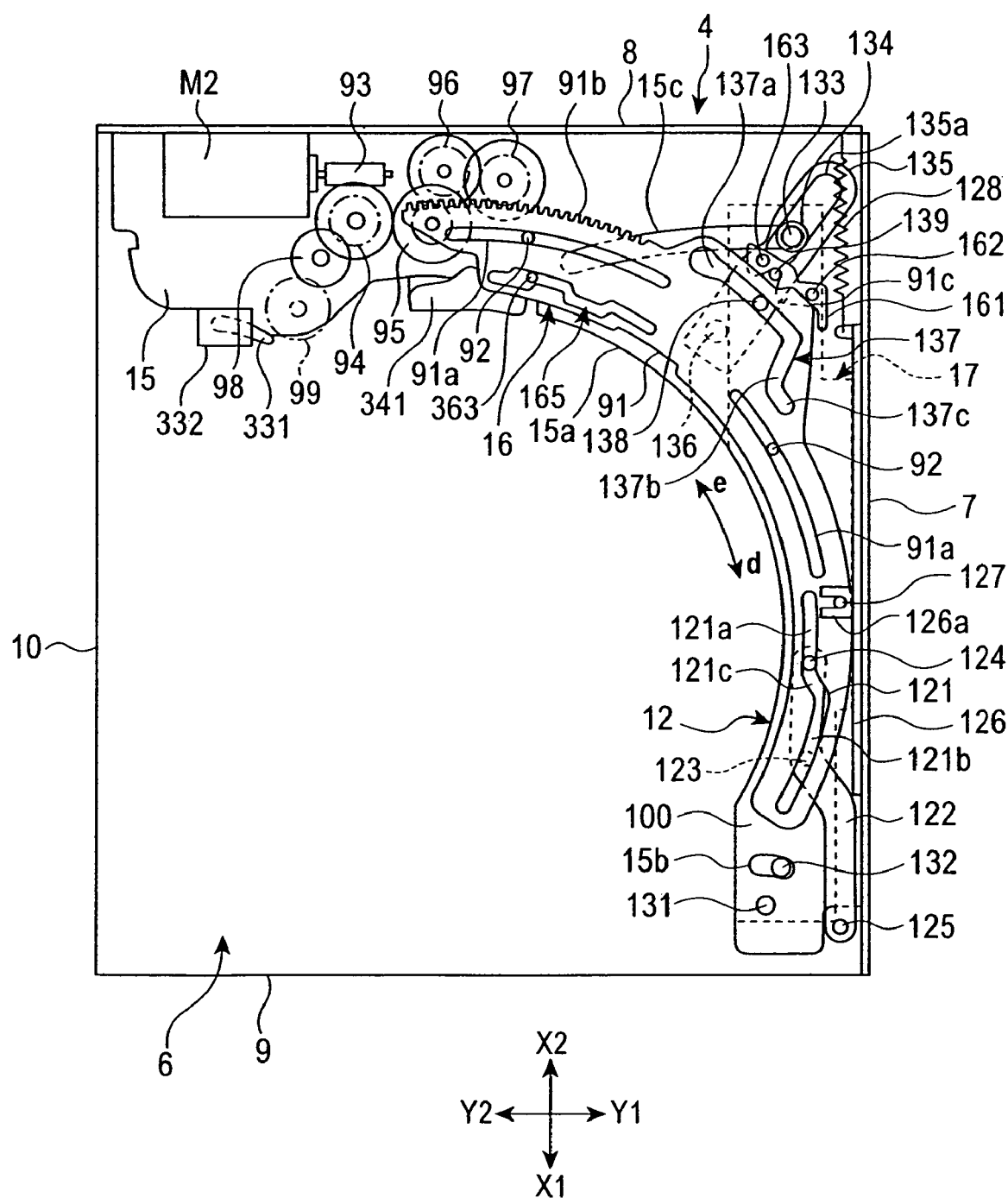
FIGS. 8 and 9 are plan views illustrating the configuration of a second motive force transmission mechanism.

In FIG. 6, the driving unit 14 is shown at a retracted position. The driving unit 14 at this time is positioned immediately inside of the right side face 8 at a position away from the insertion center line Oa to the right side (X2 side), placing the driving unit 14 at a position slightly removed from the perimeter of the disk D supported by the supporting member 21. FIG. 8 shows the transporting unit 17 in a standby position. The transporting unit 17 at this time is at a position immediately on the inside of the front face 7 and at a position slightly removed from the perimeter of the disk D supported by the supporting member 21.

Figure 18:
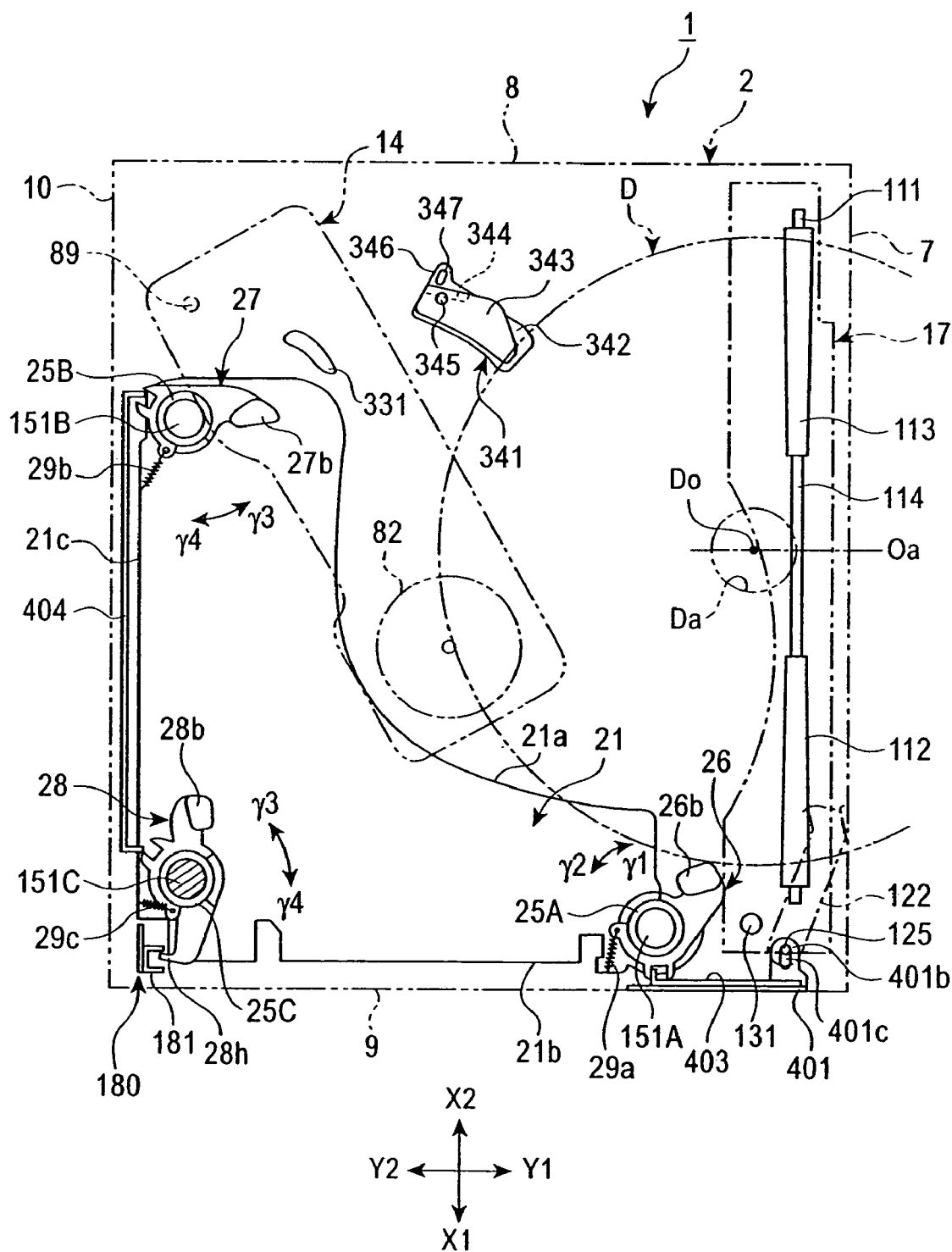
FIGS. 18 through 21 are plan view diagrams illustrating a disk carry-in operation and a disk holding operation with the supporting members.
Figure 19:
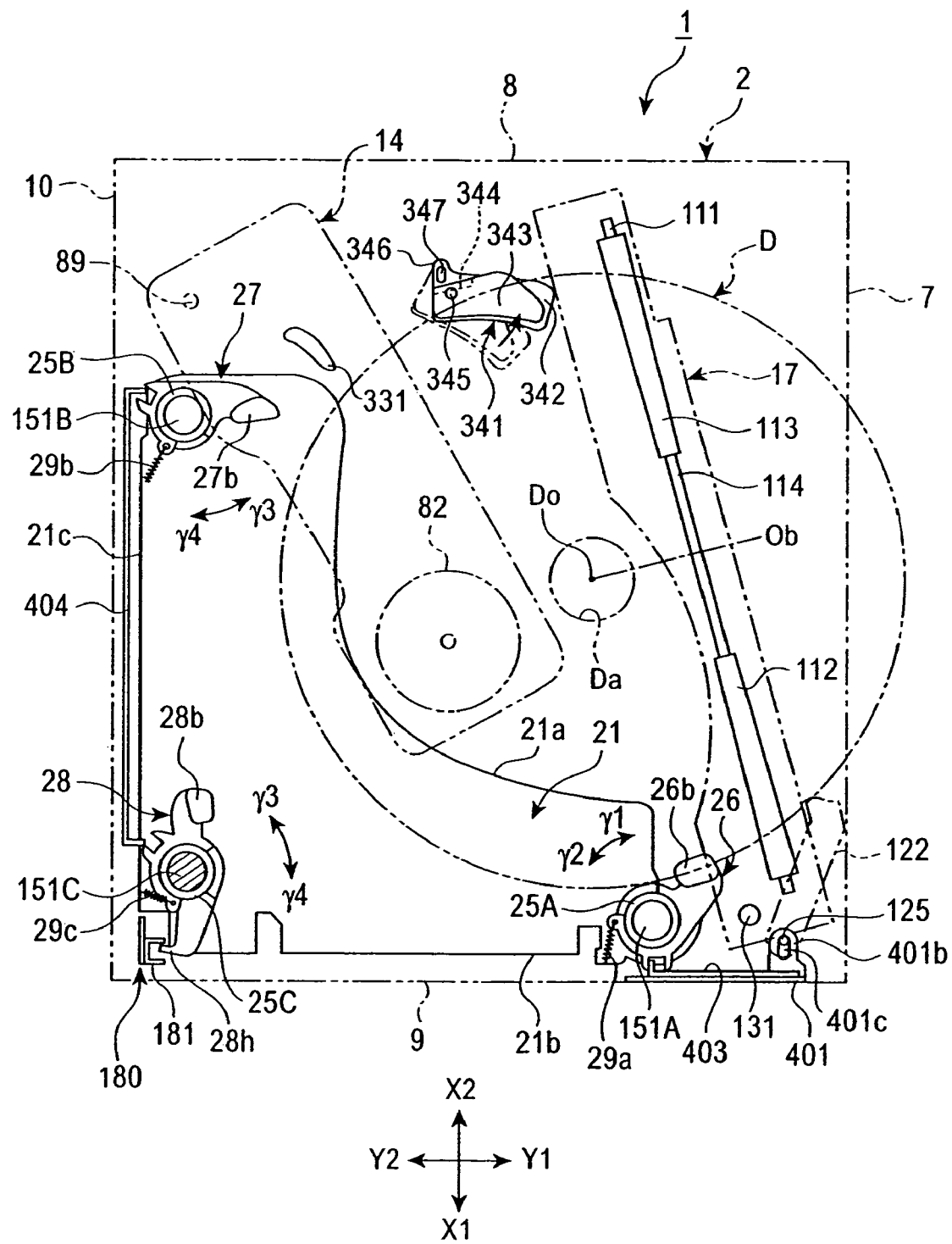

As shown in FIG. 19, the driving unit 14 pivots in the clockwise direction within the casing 2 to reach an intervention position, and the transporting unit 17 pivots in the counter-clockwise direction to reach the transporting action position. There is a portion within the casing 2 wherein the pivot region of the driving unit 14 and the pivot region of the transporting unit 17 overlap. However, as shown in FIG. 18, when the driving unit 14 pivots in the clockwise direction to stop at the intervention position, the transporting unit 17 operates to pivot between the retracted position and the transporting action position, so that the driving unit 14 and the transporting unit 17 never collide. Arranging the disk storing region 20, driving unit 14, and transporting unit 17 in this way enables the inner space of the casing 2 to be used efficiently. Within the casing 2, the arrangement is such that the transporting unit 17 is toward the near side and the disk storing region 20 is provided toward the far side, so reduction in the depth-wise dimensions of the casing 2 can be maximized. With this embodiment, the depth-wise dimension of the casing 2 (Y1-Y2 direction dimensions) is below the so-called 1 DIN size.

As shown in FIGS. 1 and 2A, the mechanism base 15 of the middle casing 4 shown in FIG. 1 is positioned above the driving unit 14 and the transporting unit 17. An inner edge 15a of the mechanism base 15 facing the inner side of the casing 2 (the X1 direction in the drawing) is at a position slightly beyond the perimeter of the disk D supported by the supporting member 21 of the disk storing region 20. Accordingly, as shown in FIG. 2B, the supporting member 21 in the disk storing region 20 is capable of elevating to the proximity of the inner side of the ceiling face 11 of the casing from a position near the upper side of the base face 6 of the casing 2. Accordingly, the mechanism base 15 is positioned at a height near the middle of the vertical movement region of the supporting member 21, and also is disposed along the inner side of the front face 7 and the inner side of the right side face 8 of the casing 2, so as to not collide with the perimeter of a disk D stored in the disk storing region 20.

(First Motive Force Transmission Mechanism)

The structure of the first motive force transmission mechanism 12, disposed on the base face 6 of the casing 2, will be described with reference to FIGS. 3 through 5.

As shown in FIG. 1, at the front of the lower casing 3 is a front bent piece 3a bent perpendicularly from the base face 6. Similarly, at the back is a back bent piece 3b, and at the right side is a right side bent piece 3c, bent perpendicularly from the base face 6.

Each member configuring the first operational mechanism 12 is disposed along the inner side of the front face 7 and the inner side of the right side face 8 of the casing 2, so as not to abut against the perimeter of the disk D stored within the disk storage region 20. Accordingly, the bottom-most supporting member 21 within the disk storage region 20 can be lowered to a position nearing the base face 6, and a configuration may be made wherein the various members constituting the first motive force transmission mechanism 12 do not abut against the perimeter of the disk D held by the supporting member 21.

Figure 3:
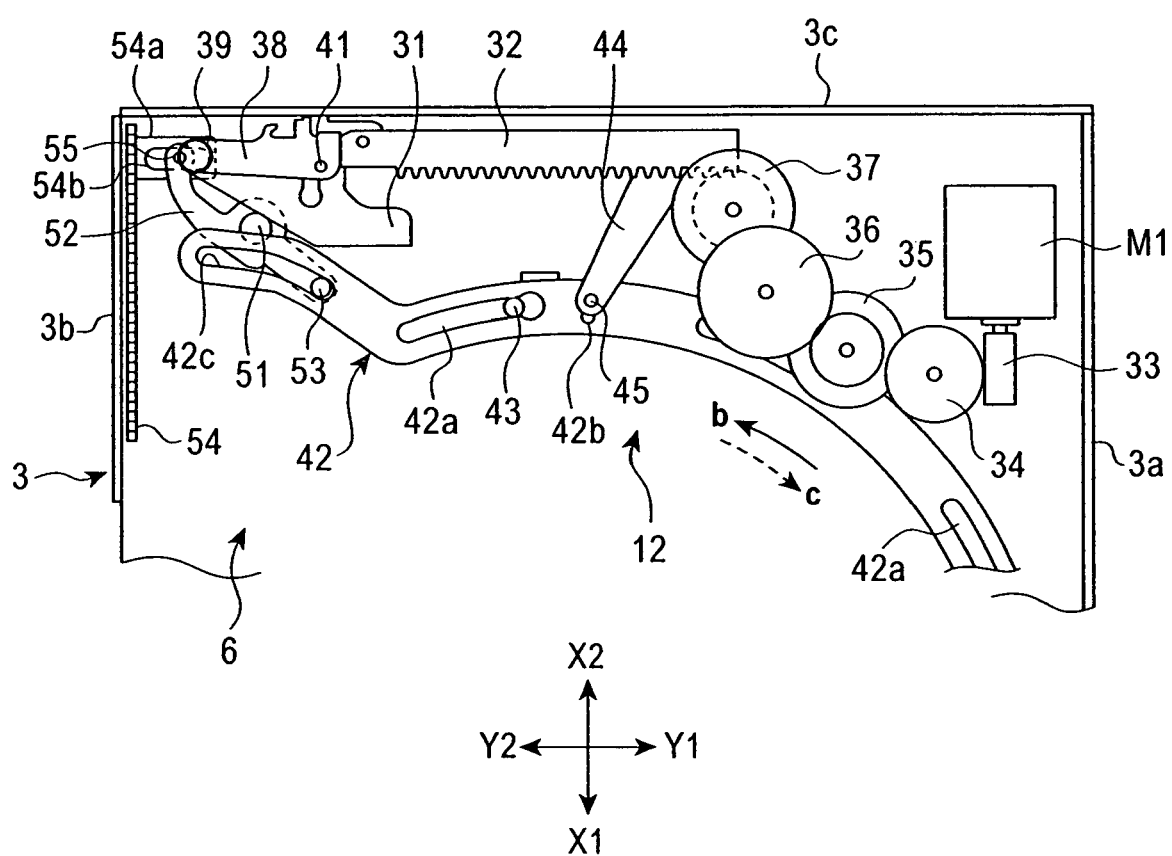
FIGS. 3 through 5 are plan views illustrating the configuration of a first motive force transmission mechanism situated on the base of the casing.

As shown in FIG. 3, the first motive force transmission mechanism 12 has provided on the base face 6 a slider 31 which linearly moves in the Y1-Y2 direction, and a rack member 32 which moves the slider 31 via an unshown linking member. Fixed immediately inside of the front face 7 on the base 6 is a first motor M1 which is the driving source of the first motive force transmission mechanism 12, and a worm gear 33 is fixed on the output shaft of the first motor M1. The rotational force of the first motor M1 is transmitted to a pinion gear 37 via reduction gears 34, 35, and 36. The pinion gear 37 meshes with the teeth of the rack member 32.

A switchover lever 38 is provided upon the slider 31. The far end (at the Y2 side) of the switchover lever 38 is rotatably supported on the slider 31 by a shaft 39. A switchover driving pin 41 protrudes upward at the near end (Y1 side) of the switchover lever 38. An attitude control pin extending downward concentrically with the switchover driving pin 41 is provided on the switchover lever 38, and the attitude control pin is inserted into an unshown cam groove formed in the base face 6. When the switchover lever 38 moves in the Y1 direction along with the slider, the position and attitude of the switchover lever 38 is controlled following the shape of the cam groove.

A lock switchover member 42 is provided on the base face 6. This lock switchover member 42 is a metal plate of which the planar shape has an arced form, with two arc-shaped sliding slots 42a formed therein. As also shown in FIG. 1, two guide pins 43 protrude from the base face 6, and each of the guide pins 43 is inserted into a sliding slot 42a. Sliding the sliding slots 42a over the guide pins 43 enables the lock switchover member 42 to be slid in a (b) direction which is toward the far side of the casing 2, and a (c) direction which toward is the near side of the casing 2, following an arc-shaped path.

A linking turning lever 44 is rotatably supported on the base face 6. The linking turning lever 44 and the rack member 32 are linked via a cam unit (not shown), and the linking turning lever 44 is pivoted in the counter-clockwise direction in a two-stage action as the rack member 32 proceeds in the Y1 direction. A linking slot 42b is formed in the lock switchover member 42 extending in the width direction thereof, with a linking pin 45 formed on the tip of the linking turning lever 44 being inserted into the linking slot 42b. As shown in FIG. 5, the lock switchover member 42 is moved in the (c) direction by the turning force of the linking turning lever 44 when the linking turning lever 44 is pivoted in the counter-clockwise direction by the moving force of the rack member 32 in the Y1 direction.

A switchover slot 42c is formed in the end of the lock switchover member 42 at the far end (Y2 side). A transmission member 52 rotatably supported by a shaft 51 is provided at the far side of the base face 6. A linking pin 53 is fixed on the near side end of the transmission member 52, and the linking pin 53 is inserted into the switchover slot 42c.

As shown in FIG. 1 as well, a locking member 54 is provided on the inner side of the back bent piece 3b. This locking member 54 is plate shaped, and is supported so as to be capable of linear motion in the X1-X2 direction on the inner side of the back bent piece 3b. A lower rack portion 54c is formed on the upper edge portion of the locking member 54.

As shown in FIGS. 1 and 3, the locking member 54 is provided with a bent piece 54a bent from the lower edge thereof toward the base face 6. A slot 54b is formed in the bent piece 54a. A linking pin 55 is fixed on the far end of the transmission member 52, and the linking pin 55 is inserted in the slot 54b. At the time of the lock switchover member 42 moving from the position shown in FIG. 4 in the (c) direction, the transmission member 52 is turned in the counter-clockwise direction by the switchover slot 42c, thereby moving the locking member 54 in the X1 direction.

As shown in FIG. 1, the locking member 54 has opened therein a lock control hole 56. The lock control hole 56 has a restricting portion 56a formed at a position approaching the base face 6 at the X1 side, a raising portion 56b which is positioned further toward the X2 side from the restricting portion 56a and which is positioned above the restricting portion 56a, and an inclined portion 56c interconnecting the restricting portion 56a and the raising portion 56b. Further, a relatively large-sized circular escape hole 56d is formed at the X2 side end of the raising portion 56b.

A locking member 61 is also provided on the inner side of the back bent piece 3a of the lower casing 3. This locking member 61 is shown in FIG. 2B. The locking member 61 is linked to the lock switchover member 42, and is supported so as to be capable of linear sliding motion in the X1-X2 direction on the inner side of the front bent piece 3a. As shown in FIGS. 1 and 3, at the time of the lock switchover member 42 moving in the (b) direction, the locking member 61 is positioned at the X2 side as shown in FIG. 2B, and when the lock switchover member 42 moves in the (c) direction, the locking member 61 is moved in the X1 direction by the moving force of the lock switchover member 42.

As shown in FIG. 2B, the locking member 61 has opened therein a pair of lock control holes 62. The lock control holes 62 each have a restricting portion 62a formed at a position approaching the base face 6 at the X1 side, a raising portion 62b which is positioned further toward the X2 side from the restricting portion 62a and which is positioned above the restricting portion 62a, and an inclined portion 62c interconnecting the restricting portion 62a and the raising portion 62b. Further, a relatively large-sized circular escape hole 62d is formed at the X2 side end of the raising portion 56b.

Now, description will be made regarding the actions of the first motive force transmission mechanism 12. As shown in FIGS. 1 through 3, when the rack member 32 has moved to the starting end at the far side (Y2 side), the slider 31 and the switchover lever 38 are positioned at the Y2 side, and at this time the linking turning lever 44 has turned in the clockwise direction and the lock switchover member 42 has moved in the (b) direction. The locking member 54 shown in FIG. 1 and the locking member 61 shown in FIG. 2B have both moved to the X2 side.

Figure 4:
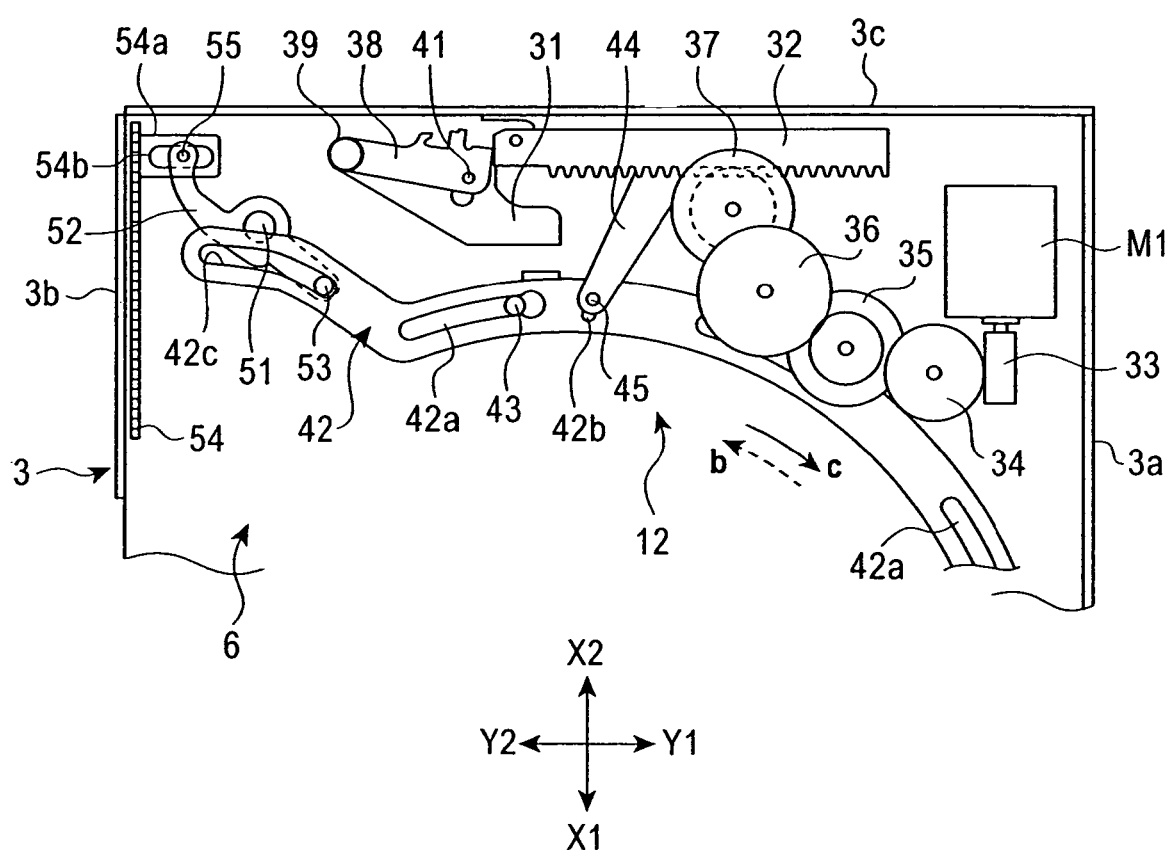

While the rack member 32 is moved from the position shown in FIG. 3 in the Y1 direction up to the position shown in FIG. 4 by the motive force of the first motor M1, the slider 31 and the switchover lever 38 move together with the rack member 32 in the Y1 direction in the drawing, and at the final step thereof, the switchover lever 38 is turned somewhat clockwise. However, while the rack member 32 is moving from the position in FIG. 3 to the position shown in FIG. 4, the linking turning lever 44 is not pivoted, and the lock switchover member 42 is stopped at the position moved in the (b) direction and does not move in the (c) direction.

In the event that the rack member 32 further moves by a short distance in the Y1 direction from the position shown in FIG. 4, the slider 31 and the switchover lever 38 does not move from the position shown in FIG. 4, due to the controlling actions of an unshown linking member linking the slider 31 and the rack member 32, and the controlling actions of an unshown cam groove formed in the base face 6, so the linking turning lever 44 is pivoted in the counter-clockwise direction, and the lock switchover member 42 is moved in the (c) direction, so that the locking member 54 and the locking member 61 are moved in the X1 direction by a distance equivalent to approximately half the overall movement range.

Subsequently, in the event of the rack member 32 moving in the Y1 direction and reaching the position shown in FIG. 5, in the stage prior to this step the linking turning lever 44 does not turn, and the slider 31 and the switchover lever 38 moves in the Y1 direction. Thereafter, the slider 31 and the switchover lever 38 do not move in the Y1 direction any further, and the linking turning lever 44 is further pivoted in the counter-clockwise direction, and as shown in FIG. 5, the lock switchover member 42 is slid in the (c) direction. Upon the lock switchover member 42 moving in the direction shown in FIG. 5, the locking member 54 is moved to the final position in the X1 direction, and further, the locking member 61 is also moved to the final position in the X1 direction. Immediately prior to the lock switchover member 42 reaching the position shown in FIG. 5, the switchover lever 38 on the slider 31 is pivoted by a large amount in the clockwise direction.

(Unit Supporting Base and Driving Unit)

The unit supporting base 13 shown in FIG. 1 is formed by bending a metal plate. A front bent piece 13a is provided on the near side of the unit supporting base 13, with this front bent piece 13a being disposed parallel to the inner side of the front bent piece 3a of the lower casing 3. A back bent piece 13b is provided on the unit supporting base 13, with this back bent piece 13b being disposed parallel to the inner side of the back bent piece 3b of the lower casing 3. Also, a side bent piece 13c of the unit supporting base 13 is disposed parallel to the inner side of the right side bent piece 3c of the lower casing 3.

Figure 7:
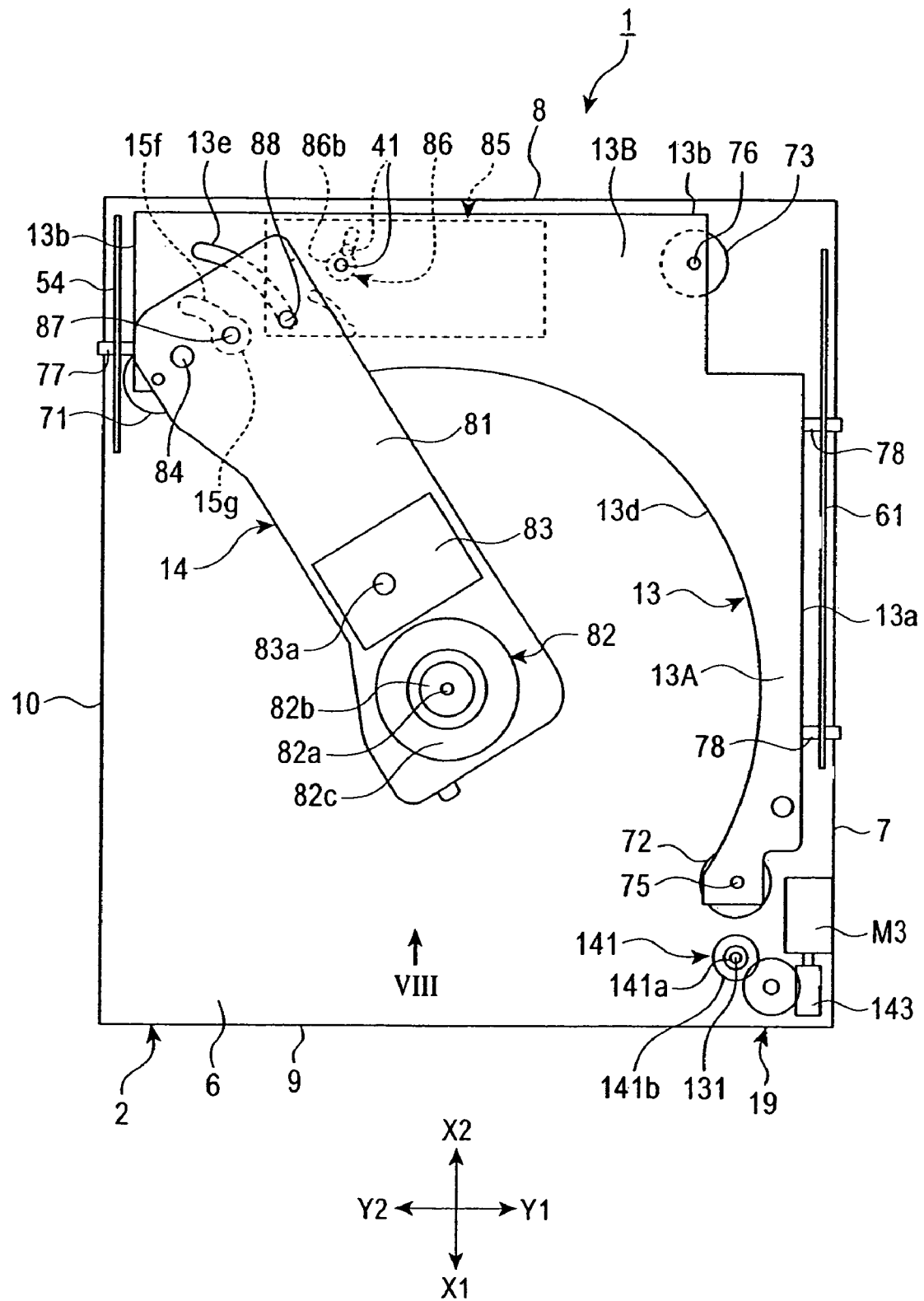

As shown in FIGS. 6 and 7 as well, an inner edge 13d of the unit supporting base 13 is formed in a recessed arc shape, with the inner edge 13d being at a position slightly beyond the edge of a disk D supported by a supporting member 21 in the disk storing region 20 shown in FIG. 1.

As shown in FIGS. 1, 6, and 7, dampers 71, 72, and 73, which are elastic supporting members, are fixed at three positions on the base face 6 of the lower casing 3. The dampers 71, 72, and 73 are formed by a liquid such as oil or the like, or a gas, being sealed within a flexible pouch formed of rubber of the like. Alternatively, a compression coil spring may be used in combination with the pouch.

As shown in FIGS. 6 and 7, supporting shafts 74, 75, and 76 are vertically fixed at three positions on the base face of the unit supporting base 13 extending downward, with the supporting shaft 74 being supported by the damper 71, the supporting shaft 75 by the damper 72, and the supporting shaft 76 by the damper 73. The unit supporting base 13 can be elastically supported above the base face 6 by the dampers 71, 72, and 73.

A restricting shaft 77 protruding in the Y2 direction is provided on the back bent piece 13b of the unit supporting base 13, with the restricting shaft 77 inserted into the lock control hole 56 of the locking member 54 shown in FIG. 1. A pair of restricting shafts 78 protruding in the Y1 direction is provided on the front bent piece 13a of the unit supporting base 13, with each of the restricting shafts 78 inserted into a lock control hole 62 of the locking member 61 shown in FIG. 2B.

As shown in FIGS. 6 and 7, the driving unit 14 has a slender driving base 81. A supporting shaft 84 vertically protrudes upwards at the far side (Y2 side) of the unit supporting base 13, and the driving base 81 is supported by the supporting shaft 84 such that the driving unit 14 is callable of pivoting in the X-Y plane.

The pivot range of the driving unit 14 is from the retracted position shown in FIG. 6 to the intervention position shown in FIGS. 7 and 18 through 21. As shown in FIG. 6, in the event that the driving unit 14 is at the retracted position, a turntable 82 which is a rotational driving unit situated on the pivoting end of the driving unit 14 is situated at the front face 7 side of the casing 2, and the side of the driving base 81 is situated so as to be parallel with the right side face 8 of the casing 2 in close proximity therewith. The driving unit 14 in the retracted position is slightly beyond the perimeter of the disk D supported by the supporting member 21 in the disk storage region 20.

As shown in FIGS. 7 and 18 through 21, upon the driving unit 14 turning to the intervention position, the turntable 82 moves to within the disk storage region 20. At this intervention position, the rotational center of the turntable 80 moves to the selection position (a) and matches the center hole of the disk D supported by the supporting member 21 beneath the center hole of the disk D.

As shown in FIG. 6, an arc guide portion 13e formed in an arc shape with a predetermined radius centered on the supporting shaft 84 is provided on the unit supporting base 13. This arc guide portion 13e is an arc-shaped slot which penetrates the unit supporting base 13. Also, a driving shaft 88 is vertically fixed on the lower face of the driving base 81 of the driving unit 14, and this driving shaft 88 is movably inserted into the arc guide portion 13e.

As shown in FIG. 6, a driving slider 85 which is a driving member is provided on the lower face of the unit supporting base 13, and the driving slider 85 is slidably supported so as to move in the Y1-Y2 direction. A driving hole 86 and an escape portion 86b connected to the driving hole 86 are formed on the driving slider 85. A switch driving pin 41 fixed onto a switchover lever 38 of the first motive force transmission mechanism 12 is inserted in the driving hole 86, and the driving slider 85 is moved in the Y1 direction by the switch driving pin 41 when the switchover lever 38 moves in the Y1 direction.

An unshown driving link mechanism for driving the driving shaft 88 is disposed between the driving slider 85 and the unit supporting base 13, and during the driving slider 85 moving from the starting end at the Y2 side shown in FIG. 2 in the Y1 direction to the position shown in FIG. 4, the driving shaft 88 is pushed in the clockwise direction by the driving link mechanism, and the driving unit 14 is turned from the retracted position shown in FIG. 6 to the intervention position shown in FIG. 7.

A spindle motor is disposed on the pivoting end of the driving base 81 of the driving unit 14, with the turntable 82 fixed to a motor shaft 82a of the spindle motor. As shown in FIG. 1 as well, the turntable 82 has a center protrusion portion 82b which enters a center hole Da of the disk D, and a flange portion 82c extending from the center protrusion portion 82b toward the perimeter. A clamp mechanism is disposed with the turntable 82. This clamp mechanism has clamping claws radially protruding from the center protrusion portion 82b. A state wherein the clamping claws are retracted within the center protrusion portion 82b is a non-clamping mode, and in this state the center protrusion portion 82b can enter the center hole Da of the disk D. A state wherein the clamping claws are protruded is a clamping mode, wherein the perimeter of the center hole Da of the disk D is clamped between the clamping claws and the flange portion 82c, so that the disk D is clamped to the turntable 82.

The driving base 81 of the driving unit 14 has a clamping switchover mechanism for operating the clamping claws. Following the rack member 32 moving to the position shown in FIG. 4 and the driving unit 14 moving to the intervention position, the rack member 32 further moves in the Y1 direction, and the driving slider 85 moves in the Y1 direction, the driving force of which operates the clamping switchover mechanism such that the clamping claws are switched from the non-clamping mode to the clamping mode.

As shown in FIGS. 6 and 7, an optical head 83 is provided on the driving base 81, with an object lens 83a disposed on the upper face of the optical head 83. A thread mechanism is provided on the driving base 81, which acts to move the optical head 83 from a position near to the turntable 82 to a position away from the turntable 82. At this time, the object lens 83a of the optical head 83 can move in the radial direction of the disk D clamped to the turntable 82.

(Second Motive Force Transmission Mechanism)

Next, the second motive force transmission mechanism 16 provided on the middle casing 4 will be described with reference to FIGS. 8 and 9.

With the second motive force transmission mechanism 16, an arc-shaped switchover member 91 is provided above the mechanism base 15 of the middle casing 4. The switchover member 91 has formed therein a pair of guide slots 91a which extend along an arc path. A pair of guide shafts 92 are fixed protruding upward from the mechanism base 15, with each of the guide shafts 92 being inserted in a respective guide slot 91a. This allows the switchover member 91 to be slidably guided in the (d) direction and the (e) direction following the arc path. Further, rack teeth 91b are formed following the arc path on the edge of the perimeter of the switchover member 91.

The mechanism base 15 is positioned at a height near the middle of the vertical movement region of the supporting member 21 within the disk storage region 20, and therefore the switchover member 91 also is positioned at a height near the middle of the vertical movement region of the supporting member 21. Also, the switchover member 91 moves along a circular arc path following the perimeter of the disk on the outer side of the peripheral edge of the disk D stored in the disk storage region 20.

A second motor M2 is provided on the mechanism base 15. a worm gear 93 is fixed to the rotational shaft of the second motor M2. An output gear 94 is provided on the mechanism base 15, and the worm gear 93 always meshes with the output gear 94.

The rotational motive force of the second motor M2 is output from the output gear 94, via a first switchover gear 95 and gear 96, and reduced and transmitted to a pinion gear 97. The first switchover gear 95 is switched between a position meshing with the output gear 94 and a position moved away from the output gear 94. The pinion gear 97 always meshes with rack teeth 91b of the switchover member 91. Also, a second switchover gear 98 is provided to the side of the output gear 94. The second switchover gear 98 is for transmitting motive force of the second motor M2 to the supporting member selecting mechanism 22 shown in FIG. 1. When the first switchover gear 95 is engaged with the output gear 94, the second switchover gear 98 is disengaged from the output gear 94, and when the first switchover gear 95 is disengaged from the output gear 94, the second switchover gear 98 engages with the output gear 94.

Figure 9:
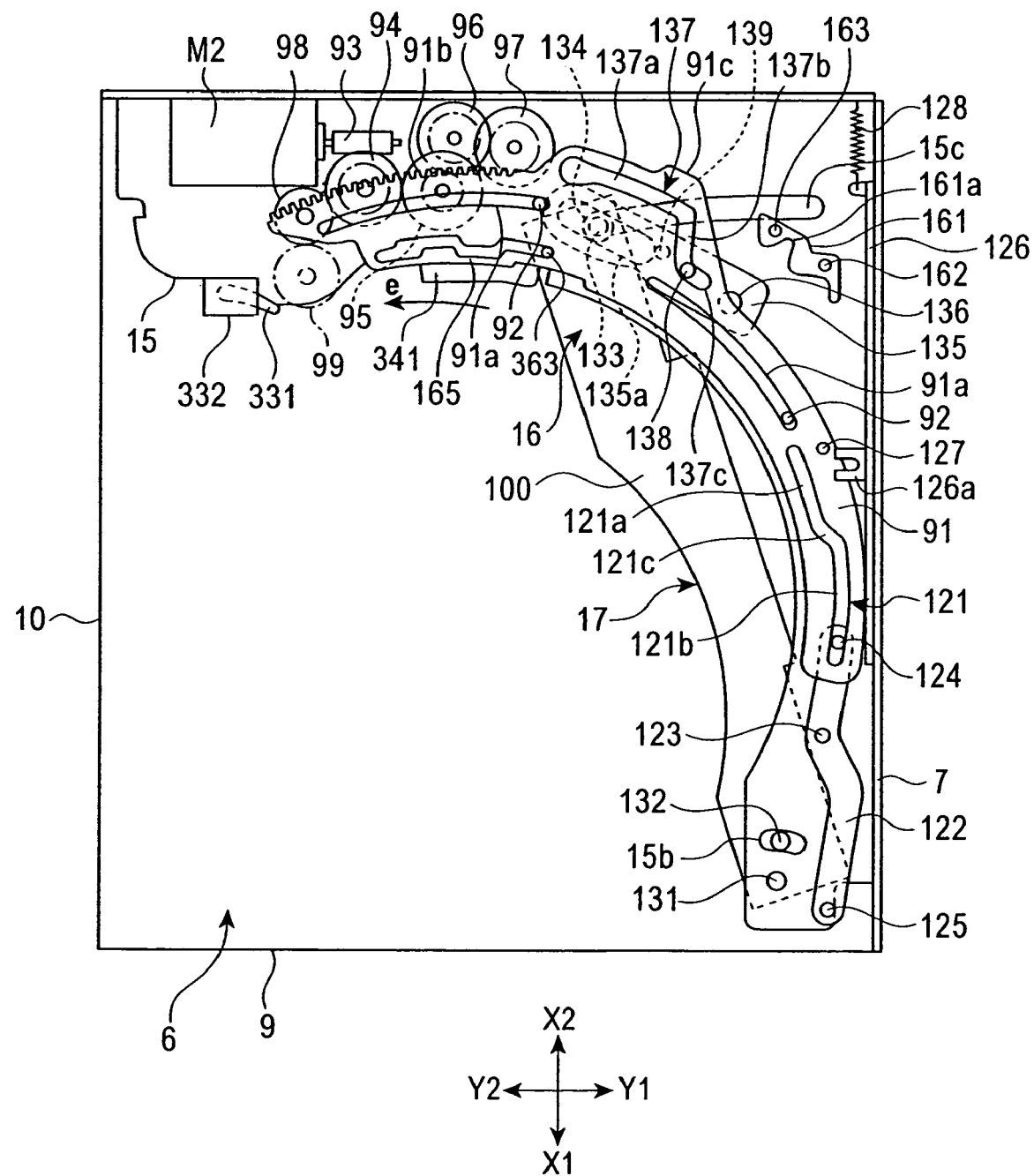
Figure 16:
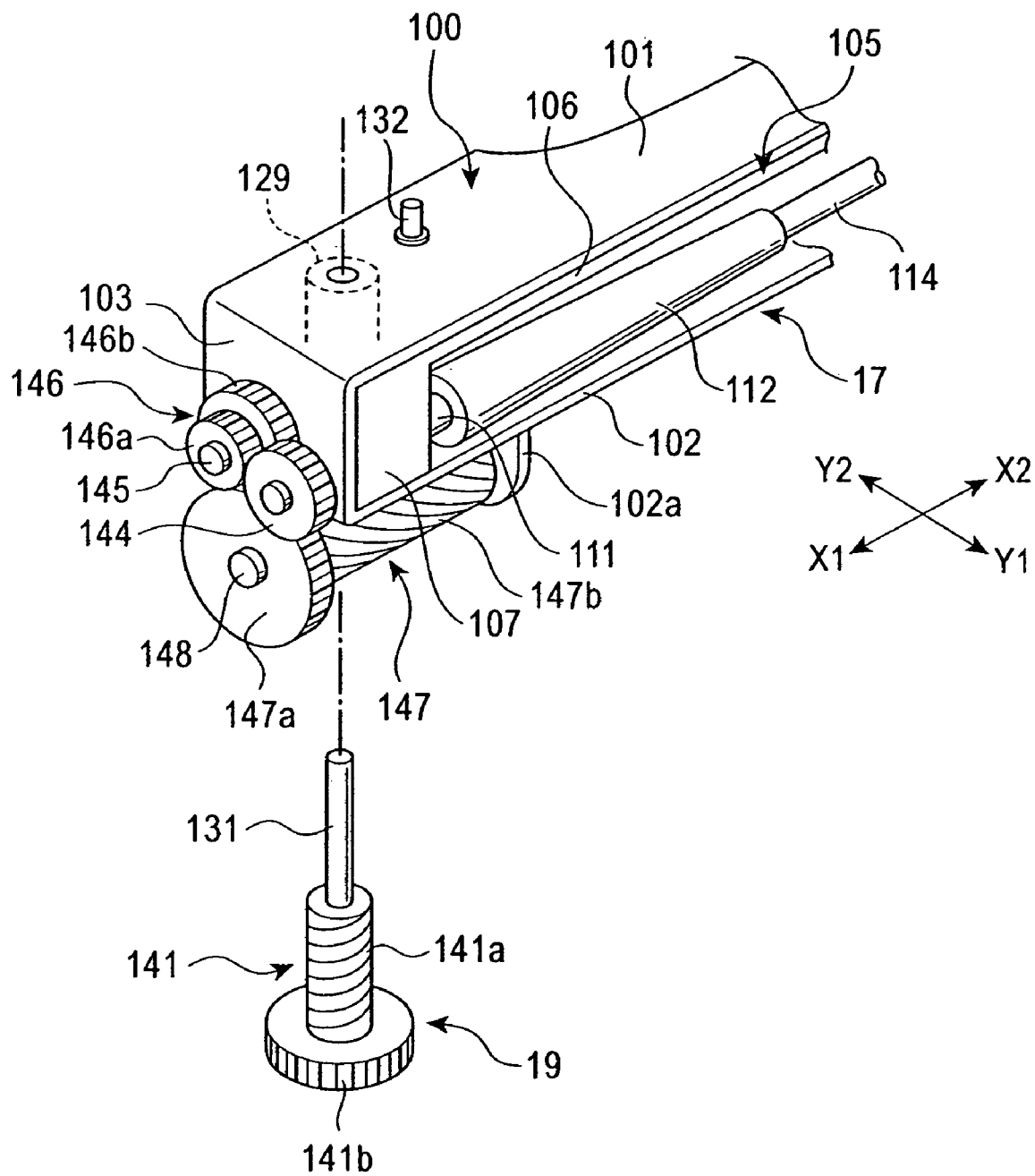
FIG. 16 is an exploded perspective view illustrating a third motive force transmission mechanism and in particular illustrating a configuration of a transportation unit turning fulcrum.

As shown in FIGS. 1, 8, and 9, the transporting unit 17 is provided below the mechanism base 15. As shown in FIGS. 2A and 16, the transporting unit 17 has a metal unit frame 100 which is slender and extends in the X1-X2 direction. The unit frame 100 has an upper face 101, lower face 102, fulcrum-side side face 103, and free-side side face 104, with the inside of the unit frame 100 being open in the Y1-Y2 direction. A sliding member 105 formed of a synthetic resin having a low friction coefficient is provided within the unit frame 100. The sliding member has a nipping portion 106 extending along the upper face 101 of the unit frame 100, a side guide portion 107 positioned on the inner side of the fulcrum-side side face 103, and a side guide portion 108 positioned on the inner side of the free-side side face 104. The gap between the side guide portion 107 and the side guide portion 108 facing one another is wider than the diameter of the disk D, and is approximately the same as the opening width dimension W of the insertion opening 23 or slightly greater, as shown in FIG. 2A.

As shown in FIGS. 18 through 21, the transporting unit 17 has a roller shaft 111 provided within the unit frame 100. The roller shaft 111 extends in parallel with the upper face 101 of the unit 100, and is rotatably supported by the fulcrum-side side face 103 and the free-side side face 104 at both ends thereof. As shown in FIGS. 18 through 20, provided on the perimeter of the roller shaft 111 are a first transporting roller 112 and a second transporting roller 113, both formed of a material with a high friction coefficient, such as synthetic rubber or natural rubber or the like. The first transporting roller 112 and second transporting roller 113 are provided with spacing therebetween in the axial direction. In the event that the transporting unit 17 is in the standby position shown in FIGS. 18, 20, and 21, the first transporting roller 112 and second transporting roller 113 are approximately parallel to the front face 7 of the casing 2 and at positions equally distanced from the insertion center line Oa.

A middle portion 114 situated between the first transporting roller 112 and second transporting roller 113 is a portion which provides no substantial transporting force to the disk D. The middle portion 114 is formed so as to be integral with the transporting rollers 112 and 113 and smaller than the transporting rollers 112 and 113, or is formed as a portion where the roller shaft 111 is directly exposed.

As shown in FIGS. 2A and 16, the first transporting roller 112 and second transporting roller 113 face the nipping portion 106 of the sliding member 105. At least one of the transporting roller 112 and 113 and the nipping portion 106 is pressed by a spring, such that the transporting rollers 112 and 113 and the nipping portion 106 are elastically pressed against each other. Accordingly, the disk D can be nipped between the transporting roller 112 and the nipping portion 106, and the transporting roller 113 and the nipping portion 106. Note that in the pressed state, the space between the middle portion 114 and the nipping portion 106 is greater than the thickness dimension of the disk D, so the disk D is never nipped between the middle portion 114 and the nipping portion 106.

The first transporting roller 112 and second transporting roller 113 are rotatably passed over the perimeter of the roller shaft 111 without any adhesion to the perimeter of the roller shaft 111. When the nipping pressure to the disk D is acting upon the transporting rollers 112 and 113, the friction between the transporting rollers 112 and 113 and the roller shaft 111 increases, such that the roller shaft 111 and the transporting rollers 112 and 113 rotate integrally. Also, the arrangement is such that in the event that the disk D being nipped is grasped by human fingers, or in other cases wherein a large resistance force is applied to the disk D being transported, the roller shaft 111 slips with respect to the transporting rollers 112 and 113.

Note that with this embodiment, the nipping portion 106 is formed of a synthetic resin material having a low friction coefficient, but an arrangement may be made wherein the nipping portion is a free-rotating roller.

The transporting unit 17 may be arranged to pivot from the standby position shown in FIG. 8, to the transporting operation position shown in FIG. 9, with the end at the X1 end in the drawing as a fulcrum. At the standby position, the unit frame 100 is slightly beyond the perimeter of the disk D supported by the supporting medium 21 in the disk storing region 20. As shown in FIG. 19, upon the transporting unit 17 pivoting in the counter-clockwise direction and reaching the transporting operation position, a transporting center line Ob which is an imaginary line passing through the center point between the transporting rollers 112 and 113 and extending perpendicularly to the axial line of the transporting rollers 112 and 113 passes through the disk storing region 20 having multiple supporting members 21.

As shown in FIGS. 1, 2A, and 16, a pivot 131 serving as the turning fulcrum of the transporting unit 17 is fixed on the base face 6 of the lower casing 3 so as to extend upwards. AS shown in FIG. 16, the transporting unit 17 is provided with a bearing portion 129 extending in a direction orthogonal to the roller shaft 111 at the end thereof at the X1 side, and this bearing portion 129 is rotatably supported by the pivot 131. The pivot 131 and bearing portion 129 are disposed at a position away from the perimeter of the disk D transported by the transporting unit 17.

With the second motive force transmission mechanism 16 shown in FIGS. 8 and 9, an arc-shaped guide hole 15b is formed in the X1 side of the mechanism base 15 of the middle casing 4, and another arc-shaped guide hole 15c is formed in the X2 side as well. The guide hole 15b and the guide hole 15c both follow arc paths centered on the pivot 131.

On the upper face 101 of the unit frame 100 of the transporting unit 17, a guide shaft 132 extending perpendicularly upward is fixed at a position near the pivot 131, and the free end side thereof away from the pivot 131 has a driving shaft 133 extending perpendicularly upward in the same way. As shown in FIGS. 8 and 9, the guide shaft 132 is passed through the guide hole 15b from the bottom, and the driving shaft 133 is also passed through the guide hole 15c from the bottom. The tip of the driving shaft 133 protrudes upward from the mechanism base 15, and a turning ring 134 is rotatably provided on the driving shaft 133.

A driving lever 135 is provided on the mechanism base 15. The base of this driving lever 135 is rotatably supported on the mechanism base 15 via a shaft 136. The driving lever 135 has formed therein a driving slot 135a, and the turning ring 134 provided on the perimeter of the driving shaft 133 is inserted inside the driving slot 135a.

The switchover member 91 provided on the mechanism base 15 has opened therein a unit control slot 137. a transmission shaft 138 protrudes perpendicularly on the upper face of the driving lever 135, and this transmission shaft 138 is inserted into the unit control slot 137 from the bottom.

A non-acting portion 137a is formed in the unit control slot 137. This non-acting portion 137a is formed following an arc path, the center of curvature of which is the center of curvature of the arc path of the switchover member 91 sliding in the (d)-(e) directions. Accordingly, as shown in FIG. 8, in the event that the transmission shaft 138 is positioned within the non-acting portion 137a, even in the event that the switchover member 91 slides in the (d)-(e) direction, the moving force thereof does not act upon the transmission shaft 138.

With the unit control slot 137, a driving inclined portion 137b is provided continuing from the Y1 side of the non-acting portion 137a, and further, a holding portion 137c is formed at the end on the Y1 side. The holding portion 137c is positioned further toward the center of curvature of the sliding path of the switchover member 91 than the non-acting portion 137a.

Accordingly, while the switchover member 91 further slides toward the (e) direction from the position shown in FIG. 8 to reach the position shown in FIG. 9, the transmission shaft 138 interacts with the driving inclined portion 137b, the transmission shaft 138 is moved in the counter-clockwise direction by the driving inclined portion 137b, and the driving lever 135 is pivoted in the counter-clockwise direction. Consequently, the transporting unit 17 pivots in the counter-clockwise direction with the pivot 131 as its fulcrum, and reaches the transporting operation position. Upon the switchover member 91 moving further in the (e) direction, the driving shaft 133 is situated at the Y2 end potion of the guide hole 15c, as shown in FIG. 9, and the transmission shaft 138 is held at the holding portion 137c of the unit control slot 137, so that the transporting unit 17 is restricted at the transporting operation position.

With this embodiment, the unit control slot 137 provided in the switchover member 91 and the driving lever 135 make up transporting unit pivoting means.

Figure 13:
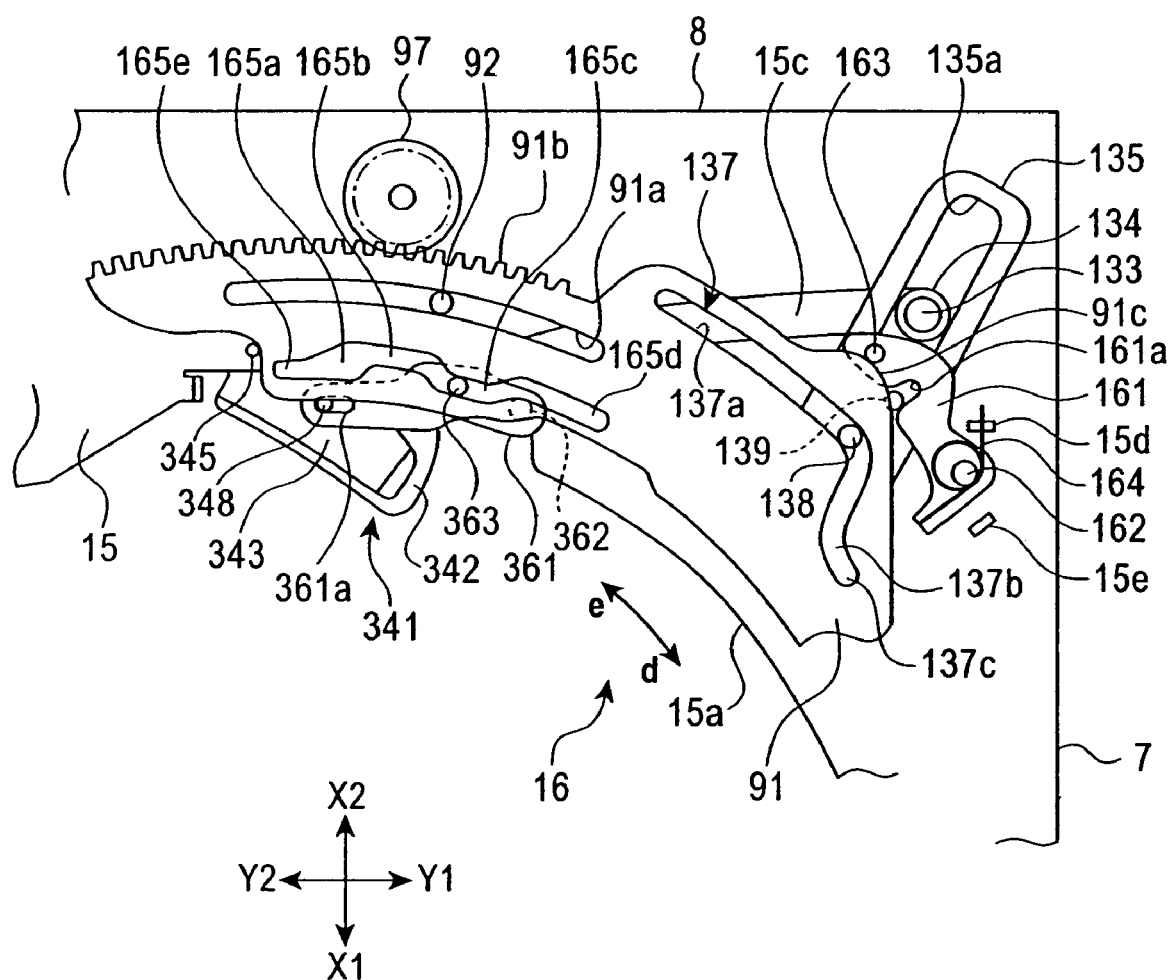
Figure 14:
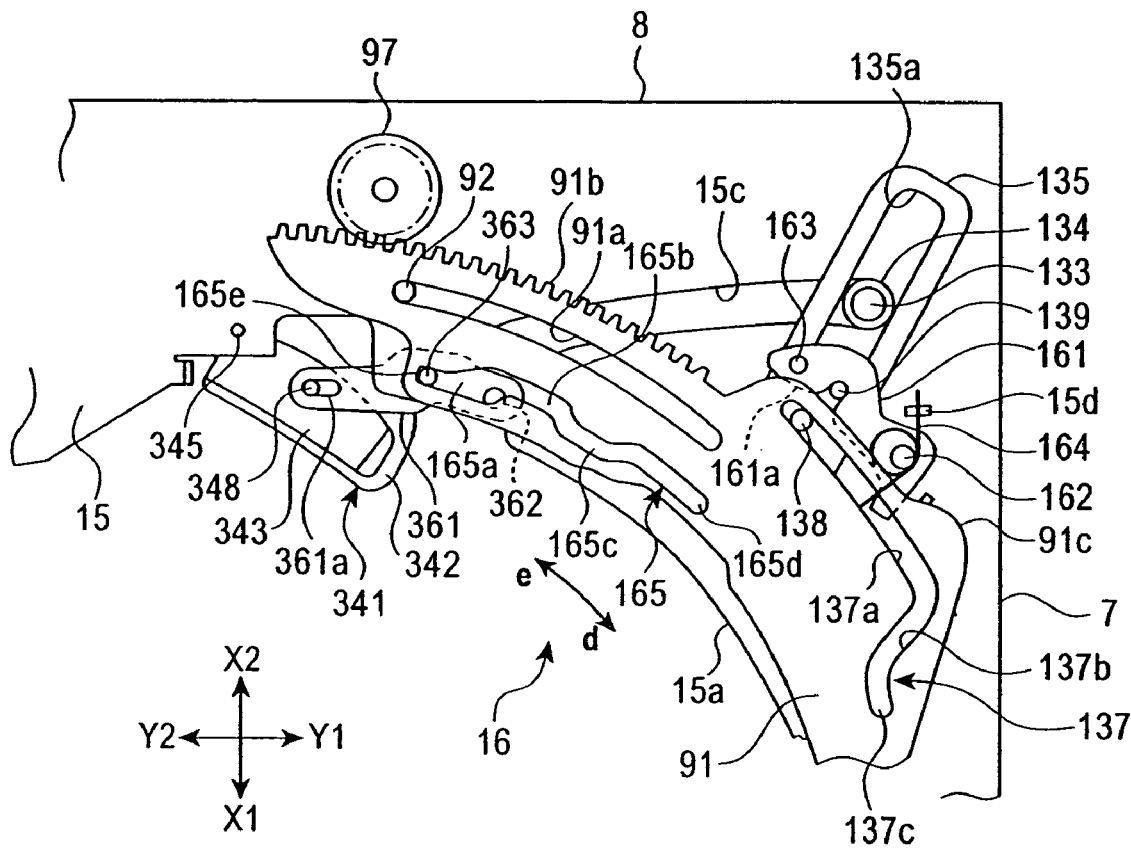

As shown in FIGS. 13 and 14, a locking mechanism which restricts the moving unit 17 at the standby position on the mechanism base 15 is provided at the inner side of the front face 7 of the casing 2. A shaft 162 is affixed to the mechanism base 15, and a locking member 161 is rotatably supported on this shaft 162. A torsion spring 164 is attached to the shaft 162, one arm portion thereof being hooked to a spring hooking portion 15d which is formed by bending to be integral with the mechanism base 15, the other arm portion being hooked to the locking member 161, wherein the locking member 161 is pulled in the counter-clockwise direction by the torsion spring 164. As shown in FIG. 13, a stopper 15e is formed by bending to be integral with the mechanism base 15, and the point at which the locking member 161 abuts against the stopper 15e becomes the limit position of the pivot range in the counter-clockwise direction.

A holding recessed portion 161a is formed on the edge portion of the locking member 161 facing the switchover member 91. A sliding protrusion 163 is affixed on the tip portion of the holding recessed portion 161a on the locking member 161. This sliding protrusion 163 is a cylindrically shaped pin. A retaining protrusion 139 is provided on the driving lever 135. Also, a disengaging cam portion 91c is formed by a protruding shape on the right edge of the switchover member 91. This disengaging cam portion 91c is in a convex curve shape.

As shown in FIGS. 8 and 14, when the switchover member 91 is moved in the (d) direction, and the driving lever 135 is pivoted in the clockwise direction by the non-acting portion 137a of the unit control slot 137, the retaining protrusion 139 provided on the driving lever 135 is held in the holding recessed portion 161a of the locking member 161. Accordingly the driving lever 135 is locked in the state of being pivoted in the clockwise direction, and the transporting unit 17 is restricted at the standby position so as not to be moved. Therefore, when the transporting unit 17 is at the standby position, and the supporting member 21 in the disk-storing region 20 is moving vertically to perform a selecting operation of the supporting member, or when the disk D clamped to the turntable 82 is rotationally driven, even if automotive vibrations and so forth are active, the transporting unit 17 does not pivot from the standby position in the counter-clockwise direction, and the transporting unit 17 is prevented from abutting against the disk D. Also, since the transporting unit 17 is restricted at the standby position, the transporting unit 17 can be restricted from jolting when automotive vibrations and so forth are active.

As shown in FIG. 13, when the switchover member 91 is moved in the (e) direction, immediately prior to the transmission shaft 138 entering the driving inclined portion 137b of the unit control slot 137, the sliding protrusion 163 is pressed with the disengaging cam portion 91c formed on the switchover member 91, and the locking member 161 is pivoted in the clockwise direction. At this time, the hold of the retaining protrusion 139 by the holding recessed portion 161a is disengaged. Accordingly, when the switchover member 91 is further moved in the (e) direction, the transmission shaft 138 can be led into the driving inclined portion 137b of the unit control slot 137, the driving lever 135 can be pivoted in the counter-clockwise direction, and the transporting unit 17 can be pivoted to the transporting operation position.

Also, from the state of the transporting unit 17 being in the transporting operation position, the switchover member 91 is moved in the (d) direction and the driving lever 135 is pivoted in the clockwise direction, the transporting shaft 138 moves from the driving inclined portion 137b of the unit control slot 137 to the non-acting portion 137a, and the locking member 161 is pivoted in the clockwise direction by the disengaging cam portion 91c. Accordingly, the retaining protrusion 139 faces the holding recessed portion 161a on the locking member 161, and afterwards when the switchover member 91 moves in the (d) direction, the disengaging cam portion 91c moves away from the sliding protrusion 163, the locking member 161 pivots in the counter-clockwise direction, the retaining protrusion 139 is held with the holding recessed portion 161a of the locking member 161, and as shown in FIG. 14, the driving lever 135 is locked.

As shown in FIGS. 8 and 9, a switchover slot 121 is formed at the Y1 and X1 side end of the switchover member 91. This switchover slot 121 has a first arc portion 121a, a second arc portion 121b extending in the (d) direction, situated further outside from the first arc portion 121a, and a switchover portion 121c connecting the arc portions 121a and 121b. The center of curvature of the first arc portion 121a and the second arc portion 121b matches the center of curvature of the arc paths of the guide slots 91a.

A switchover lever 122 is provided at the Y1 side of the mechanism base 15 at the edge thereof. The switchover lever 122 is positioned between the mechanism base 15 and switchover member 91, and is rotatably supported by a supporting shaft 123 fixed on the upper face of the mechanism base 15. A control pin 124 is fixed at the end of the switchover lever 122 on the X2 side, and the control pin 124 is slidably inserted into the switchover slot 121 formed in the switchover member 91. A switchover pin 125 is fixed on the X1 side end of the switchover lever 122. As described later, the attitude of the holding member 26 provided with each supporting member 21 can be controlled by this switchover pin 125.

As shown in FIGS. 8 and 9, a shutter opening/closing member 126 is provided on the inner side of the front face 7 of the casing 2. The shutter opening/closing member 126 is formed of a metal plate, and is supported on the inner side of the front face 7 so as to be slidable in the X1-X2 direction. Also, the shutter opening/closing member 126 is biased in the X2 direction by a pulling coil spring 128. Provided with the shutter opening/closing member 126 is a driving piece 126a bent from the lower edge in the Y2 direction. A driving pin 127 is fixed on the switchover member 91, and as shown in FIG. 8, this driving pin 127 can be inserted in a groove formed in the driving piece 126a.

In FIG. 8, the transmission shaft 138 provided on the driving lever 135 is positioned within the non-acting portion 137a of the unit control slot 137 formed in the switchover member 91, and the transporting unit 17 has pivoted in the clockwise direction and is at the standby position. At this time, the control pin 124 provided on the switchover lever 122 is positioned within the first arc portion 121a of the switchover slot 121, and the switchover lever 122 has pivoted in the counter-clockwise direction with the switchover pin 125 having moved to the Y1 side. At this time, the driving pin 127 provided on the switchover member 91 is in the groove of the driving piece 126a, and the shutter opening/closing member 126 has moved in the X1 direction.

When the switchover member 91 moves from the position shown in FIG. 8 in the (e) direction, immediately prior to the transmission shaft 138 entering the driving inclined portion 137b of the unit control slot 137, the control pin 124 provided on the switchover lever 122 enters the second arc portion 121b of the switchover slot 121, the switchover lever 122 pivots in the clockwise direction, and the switchover pin 125 moves in the Y2 direction. Due to the subsequent movement of the switchover member 91 in the (e) direction, the transmission shaft 138 enters the driving inclined portion 137b of the unit control slot 137, and as shown in FIG. 9, the transporting unit 17 pivots in the counter-clockwise direction and reaches the transporting operation position. Also, while the switchover member 91 moves in the (e) direction from the position shown in FIG. 8 to the position shown in FIG. 9, the shutter opening/closing member 126 is moved in the X2 direction by the driving pin 127 provided on the switchover member 91.

(Shutter Opening/Closing Mechanism)

Figure 17A:
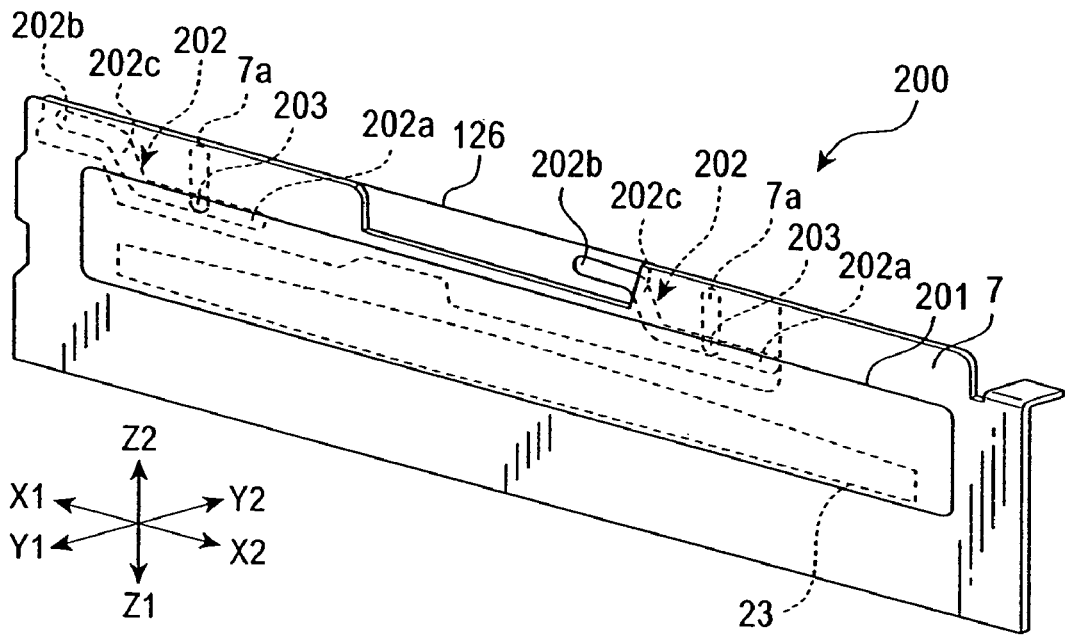
FIGS. 17A and 17B are partial perspective views illustrating the opening/closing operation of a shutter provided on the front face of the casing.
Figure 17B:
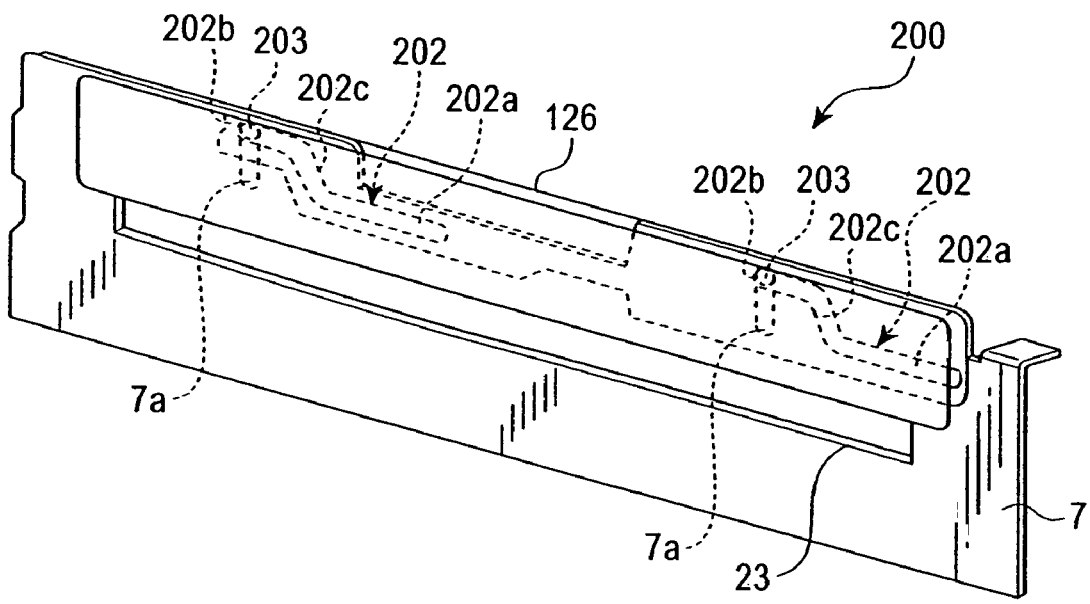

FIGS. 17A and 17B are perspective views illustrating a shutter opening/closing mechanism 200 from the front side of the front face 7 of the casing 2.

The shutter 201 is formed of a thin metal plate, having a rectangular shape which is slender in the X1-X2 direction, and has enough area to cover the insertion opening 23 formed on the front face 7 of the casing 2. Sliding pins 203 are fixed on the upper end of the shutter 201 on the Z2 side with spacing therebetween in the X1-X2 direction. Sliding slots 7a are formed on the front face 7 of the casing 2 so as to extend linearly in the vertical direction, and the sliding pins 203 are inserted into the sliding slots 7a, such that the shutter 201 is supported as to be vertically movable while being in contact with the surface of the front face 7.

Opening/closing cams 202 are formed in the shutter opening/closing member 126. These opening/closing cams 202 are cam grooves penetrating the shutter opening/closing member 126. Each opening/closing cam 202 has a closing portion 202a extending linearly in the X2 direction, an opening portion 202b extending linearly in the X1 direction higher than the closed portion 202a, and an inclined switchover portion 202c connecting the closing portion 202a and the opening portion 202b.

As shown in FIG. 8, when the switchover member 91 of the second motive force transmission mechanism 16 is positioned in the (d) direction, the shutter opening/closing member 126 has been moved to the X1 side by the driving pin 127. At this time, as shown in FIG. 17A, the sliding pins 203 are pressed down by the closing portions 202a of the opening/closing cams 202 formed in the shutter opening/closing member 126, so that the shutter 201 descends and the insertion opening 23 is closed. As shown in FIG. 9, upon the switchover member 91 moving in the (e) direction, the shutter opening/closing member 126 is moved in the X2 direction by the driving pin 127 and the pulling coil spring 128, and the sliding pins 203 are pressed upwards by the opening portions 202b of the opening/closing cams 202 as shown in FIG. 17B, so that the shutter 201 ascends and the insertion opening 23 is opened.

To describe the opening/closing timing of the shutter 201, as shown in FIG. 8, in the event that the transmission shaft 138 is positioned within the non-acting portion 137a of the unit control slot 137, and the transporting unit 17 is held in the standby position by the locking member 161, the shutter 201 is closed. Upon the switchover member 91 moving in the (e) direction from the state shown in FIG. 8 and the transmission shaft 138 reaching the end of the non-acting portion 137a of the unit control slot 137 at the (d) side (the boundary between the non-acting portion 137a and the driving inclined portion 137b), the shutter 201 is opened, and further, upon the switchover member 91 moving in the (e) direction, the transmission shaft 138 enters the driving inclined portion 137b of the unit control slot 137, and the transporting unit 17 pivots toward the transporting operation position shown in FIG. 9. During this time, the shutter 201 remains open. Also, in the event that the switchover member 91 moves from the position shown in FIG. 9 in the (d) direction, first, the transporting unit 17 pivots in the clockwise direction so as to be restored to the standby position, following which the transmission shaft 138 is moved to the boundary portion between the non-acting portion 137a and the driving inclined portion 137b, and the shutter 201 is closed.

(Gear Switchover Mechanism)

Figure 10A:
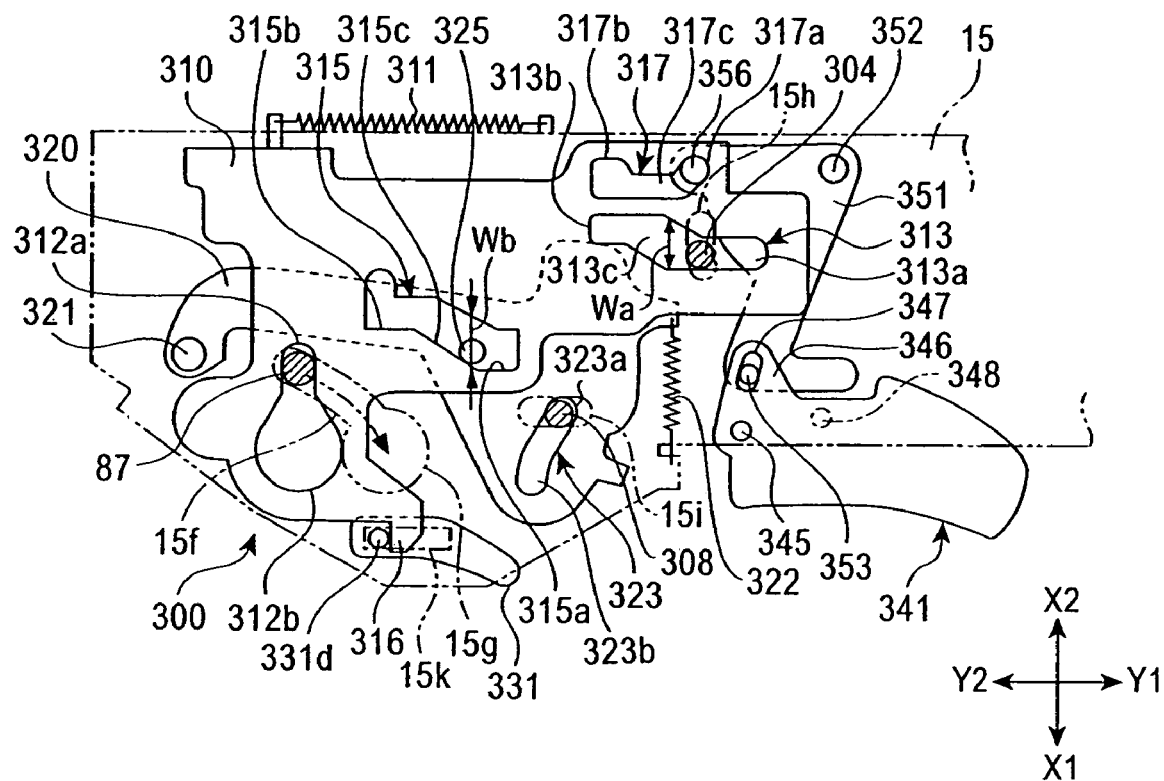
FIGS. 10A and 11A are plan view diagrams illustrating a gear-meshing switchover mechanism on a second motive force transmission mechanism and a switchover mechanism of a first protrusion guide member.
Figure 10B:
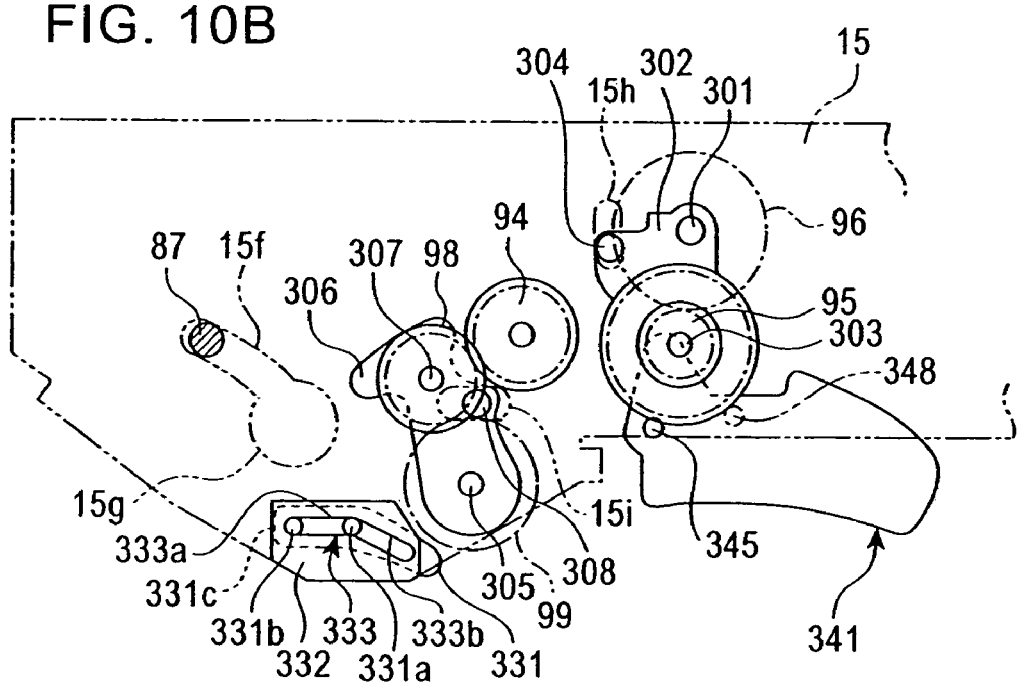
FIGS. 10B and 11B are plan view diagrams illustrating a gear switchover operation and a first protrusion guide member switchover operation corresponding to FIGS. 10A and 11A, respectively.
Figure 11A:
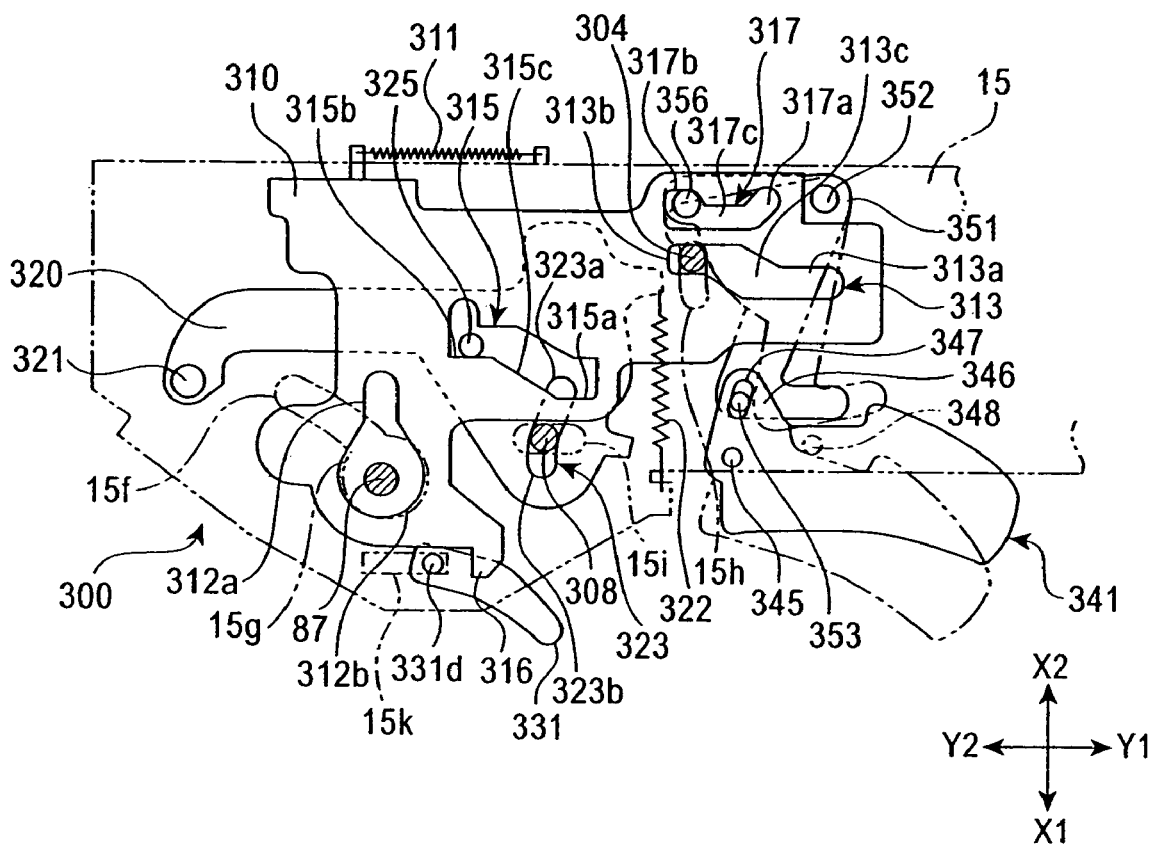
Figure 11B:
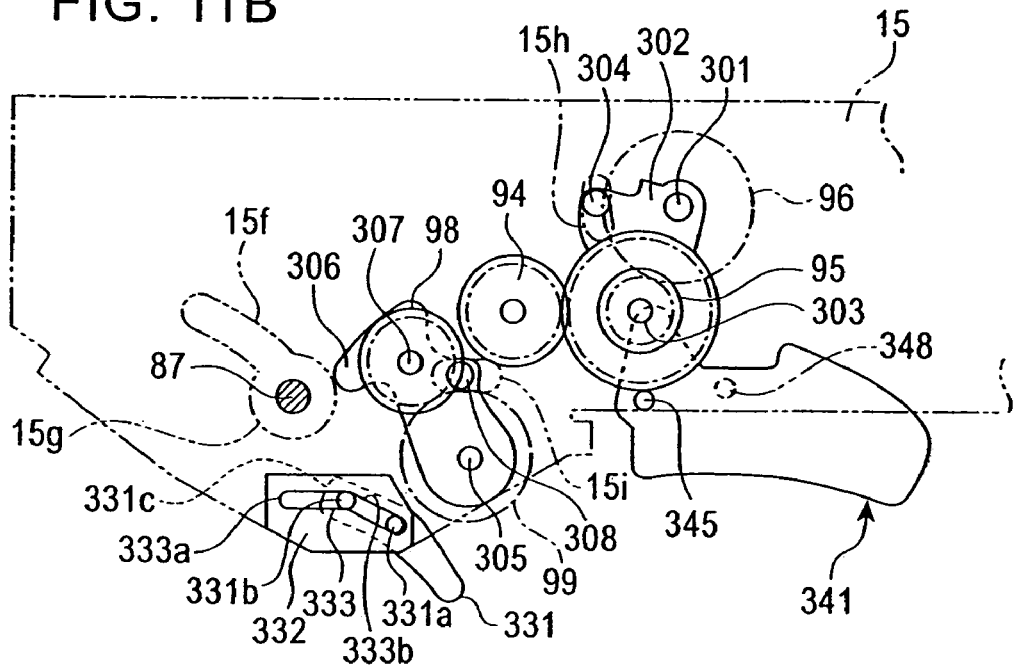

FIGS. 10A, 10B, 11A, 11B show a gear switchover mechanism 300 for switching between a first switchover gear 95 provided on the second motive force transmission mechanism 16 (see FIGS. 8 and 9) and a second switchover gear 98. FIGS. 10B and 11B show a transparent view of the gear switchover mechanism 300 provided on the upper face of the mechanism base 15, and FIGS. 10A and 11B show the gear switchover mechanism 300 provided on the lower face of the mechanism base 15, transparently through the mechanism base 15. FIGS. 10A and 10B show the operation of the mechanism when the driving unit 14 is at the retracting position (in the state shown in FIG. 6), and FIGS. 11A and 11B show the operation of the mechanism when the driving unit 14 is at the intervention position (in the state shown in FIG. 7).

As shown in FIG. 1, the mechanism base 15 provided on the middle casing 4 faces the upper side of the unit supporting base 13 which supports the driving unit 14, leaving a spacing therebetween.

As shown in FIGS. 1 and 6, a switchover control shaft 87 extending perpendicularly upwards is affixed on the supporting shaft 84 side of the driving base 81 of the driving unit 14. As shown in FIGS. 10A, 10B, 11A, and 11B, an arc-shaped guide hole 15f and a round-shaped escape hole 15g connected thereto are formed in the mechanism base 15. The switchover control shaft 87 is inserted from below the mechanism base 15 so as to be able to move within the arc-shaped guide hole 15f or the escape hole 15g. The arc-shaped guide hole 15f is formed along an arc-shaped path having the center of curvature as the shaft core of the supporting shaft 84 which is the pivoting fulcrum of the driving unit 14 positioned therebelow, and when the driving unit 14 pivots, the switchover control shaft 87 can move within the arc-shaped guide hole 15f. Then, as shown in FIG. 7, when the moving unit 14 pivots toward the intervention position, the switchover control shaft 87 is positioned in the escape hole 15g, and when the unit supporting base 13 is elastically supported by the dampers 71, 72, and 73, the driving unit 14 is not restricted by the mechanism base 15.

As shown in FIGS. 10B and 11B (and as also shown in FIGS. 8 and 9), a first switchover gear 95 is provided between the output gear 94 and gear 96 on the second motive force transmission mechanism 16, and a second switchover gear 98 is provided on the Y2 side of the output gear 94.

The gear 96 is rotatably attached to the shaft 301 affixed on the mechanism base 15. A pivoting first idling plate 302 is provided on the center of the shaft 301 between the gear 96 and the mechanism base 15, and a first switchover gear 95 is rotatably supported on the shaft 303 affixed to the first idling plate 302. The first switchover gear 95 continuously is meshed with the gear 96, and the first switchover gear 95 is capable of planetary movement around the perimeter of the gear 96 as the first idling plate 302 pivots. As shown in FIG. 11B, when the first switchover gear 95 meshes with the output gear 94, the driving force of the second motor M2 is transmitted to the pinion gear 97.

A first switchover shaft 304 extending downward (in the Z1 direction) is affixed to the first idling plate 302. An escape slot 15h is formed passing vertically through the mechanism base 15, along an arc-shaped path of a predetermined radius from the center of the shaft 301, and the first switching shaft 304 extends downward of the mechanism base 15, having passed through the escape slot 15h. FIGS. 10A and 11A reference the first switchover shaft 304 with hatching.

A short shaft 305 extending upward (in the Z2 direction) is affixed to the edge portion of the X1 side on the mechanism base 15, and a second idling plate 306 is rotatably supported by the shaft 305. A shaft 307 is affixed to the second idling plate 306, and the second switchover gear 98 is rotatably supported by the shaft 307. As shown in FIG. 2B, a rotating shaft 99a is rotatably supported on the lower face of the ceiling face 11 of the upper casing 5, and a transmission gear 99 is provided so as to be integrated with the lower edge of the rotating shaft 99a. When the upper casing 5 is disposed over the middle casing 4, the transmission gear 99 approaches and faces the upper face of the mechanism base 15 as shown in FIGS. 10B and 11B. The rotation center of the transmission gear 99 here is disposed on the same axis or approximately same axis as the shaft 305 provided on the mechanism base 15. Accordingly, the second switchover gear 98 continuously meshes with the transmission gear 99, and when the second idling plate 306 pivots, the second switchover gear 98 makes planetary movement around the perimeter of the transmission gear 99. As shown in FIG. 10B, when the second switchover gear 98 meshes with the output gear 94, the motive farce of the second motor M2 is transmitted to the transmission gear 99, and the supporting member selecting mechanism 22 is driven by the transmission gear 99.

A second switchover shaft 308 protruding downward is affixed to the second idling plate 306. An escape slot 15i is formed passing vertically through the mechanism base 15, along an arc-shaped path of a predetermined radius from the center of the shaft 305, and the second switching shaft 308 extends downward of the mechanism base 15, having passed through the escape slot 15i. FIGS. 10A and 11A reference the second switchover shaft 308 with hatching.

As shown in FIGS. 10A and 11A, with the gear switchover mechanism 300, a first switchover member 310 is provided on the lower face of the mechanism base 15. This first switchover member 310 is plate-shaped, and is linearly movably supported in the Y1-Y2 direction along the lower face of the mechanism base 15. A pulling coil spring 311 which is a pulling member is hooked between the first switchover member 310 and the mechanism base 15, and the first switchover member 310 is biased toward the Y1 direction by the pulling coil spring 311.

A driving slot 312a extending in the X1-X2 direction is formed in the first switchover member 310, and a large circular driving escape hole 312b is formed on the X1 side of the driving slot 312a. The switching control shaft 87 affixed on the driving unit 14 passes through the driving slot 312a or through the driving escape hole 312b, and is inserted in the arc-shaped guide hole 15f or escape hole 15g formed in the mechanism base 15.

As shown in FIG. 6, when the driving unit 14 is in a retreating position, the switchover shaft 87 affixed on the driving unit 14 is pivoted in the counter-clockwise direction with the supporting shaft 84 as the fulcrum, and therefore, as shown in FIG. 10A, the driving slot 312a is pressed towards the Y2 direction with the switchover control shaft 87, and the first switchover member 310 is moved toward the edge portion on the Y2 side. As shown in FIG. 7, when the driving unit 14 is pivoted in the clockwise direction and arrives at the intervention position, the switchover control shaft 87 is moved in the clockwise direction, and as shown in FIG. 11A, the first switchover member 310 is moved in the Y1 direction by the pulling force of the pulling coil spring 311.

A first switchover hole 313 is formed vertically passing through the edge portion on the Y1 side of the first switchover member 310, and the first switchover shaft 304 affixed to the first idling plate 302 is inserted in the first switchover hole 313. The first switchover hole 313 has a meshing disengaging portion 313a extending in the Y1 direction, a meshing portion 313b extending in the Y2 direction, and a switching portion 313c positioned between the meshing disengaging portion 313a and the meshing portion 313b. The width dimension in the X1-X2 direction of the meshing disengaging portion 313a and the meshing portion 313b is slightly larger than the diameter of the first switchover shaft 304, but the switchover portion 313c has a dimension Wa which is sufficiently wider than the diameter dimension of the first switchover shaft 304.

As shown in FIGS. 10A and 10B, when the first switchover member 310 is positioned on the Y2 side, the first switchover shaft 304 is led into the meshing disengaging portion 313a of the first switchover hole 313. Accordingly, the first idling plate 302 is pivoted in the counter-clockwise direction, and as shown in FIG. 10B, the meshing of the first switchover gear 95 and the output gear 94 is disengaged. As shown in FIGS. 11A and 11B, when the switchover member 310 is moved in the Y1 direction, the first switchover shaft 304 is led into the meshing portion 313b of the first switchover hole 313. At this time, the first idling plate 302 is pivoted in the clockwise direction, and the first switchover gear 95 and output gear 94 are meshed together.

Note that in the event of the first switchover member 310 being moved from the position shown in FIG. 10A toward the Y1 direction, for example the tip portion of the teeth of the output gear 94 and the tip portion of the teeth of the first switchover gear 95 may abut against one another, thus the two gears may not completely mesh together. In such a case, because the first switchover shaft 304 which is inside the first switchover hole 313 cannot completely move in the clockwise direction, the first switchover member 310 cannot move to the position shown in FIG. 11A, and the first switchover shaft 304 is positioned at the switchover portion 313c of the first switchover hole 313. At this time, since the width dimension Wa of the switchover portion 313c is large, the first switchover shaft 304 can move within the switchover portion 313c, and the first idling plate 302 can pivot with the shaft 301 as the center thereof. Accordingly, when meshing the first switchover gear 95 with the output gear 94, the output gear 94 which starts the second motor M2 is pivoted for a short time in the counter-clockwise direction which is the direction to advance meshing, or the output gear 94 can be securely meshed with the first switchover gear 95 by alternately rotating the output gear 94 for a short time in the clockwise direction and counter-clockwise direction, and thereafter, the first switchover shaft 304 can enter the meshing portion 313b of the first switchover hole 313, as shown in FIG. 11A.

With the gear switchover mechanism 300, a second switchover member 320 is provided below the first switchover member 310. This second switchover member 320 is a reversal lever. The second switchover member 320 has the edge portion on the Y2 side rotatably supported with the shaft 321 affixed to the lower face of the mechanism base 15 as the center thereof. A pulling coil spring 322 serving as a force providing member is hooked between the tip on the Y1 side of the second switchover member 320 and the mechanism base 15, and the second switchover member 320 is biased in the clockwise direction.

An interlocking slot 315 is open in the first switchover member 310, and an interlocking shaft 325 affixed to the switchover member 320 is inserted in the interlocking slot 315. A first interlocking portion 315a positioned on the Y1 side and a second interlocking portion 315b positioned farther on the Y2 side than the first interlocking portion 315a are formed on the edge portion on the X1 side of the interlocking slot 315, and an inclined portion 315c is formed between the first interlocking portion 315a and the second interlocking portion 315b. The second switchover member 320 is pulled in the clockwise direction, and therefore the interlocking shaft 325 is constantly pressed against one of the first interlocking portion 315a, second interlocking portion 315b, or inclined portion 315c.

As shown in FIG. 10A, when the first switchover member 310 is moving in the Y2 direction, the interlocking shaft 325 is pressed against the first interlocking portion 315a or the interlocking portion 315c in the vicinity thereby, and the second switchover member 320 is pivoted in the clockwise direction. As shown in FIG. 11A, when the first switchover member 310 is moved in the Y1 direction, the interlocking shaft 325 is pressed against the interlocking portion 315b, and the second switchover member 320 is pivoted in the counter-clockwise direction. However, the width dimension Wb in the X1-X2 direction of the interlocking slot 315 is greater than the diameter dimension of the interlocking shaft 325, and therefore the second switchover member 320 is continuously in a state of being pivotable in the counter-clockwise direction.

A second switchover hole 323 is formed vertically through the second switchover member 320, and the second switchover shaft 308 affixed to the second idling plate 306 is inserted in the second switchover hole 323. The second switchover hole 323 has provided therein a meshing portion 323a and a meshing disengaging portion 323b which is connected to the X1 side of the meshing portion 323a and is positioned toward the Y2 side.

As shown in FIG. 10A, when the first switchover member 310 is moving in the Y2 direction, the interlocking shaft 325 is positioned at the first interlocking portion 315a or the interlocking portion 315c in the vicinity thereby, and the second switchover member 320 is pivoted in the clockwise direction. Accordingly, the second switchover shaft 308 is led in the meshing portion 323a of the switchover hole 323 formed in the second switchover member 320, and the second idling plate 306 is pivoted in the clockwise direction. Accordingly, as shown in FIG. 10B, the second switchover gear 98 meshes with the output gear 94. As shown in FIG. 11A, when the first switchover member 310 moves in the Y1 direction, the interlocking shaft 325 slides along the inclined portion 315c and is led to the second interlocking portion 315b, and the second switchover member 320 is pivoted in the counter-clockwise direction. Accordingly, the second switchover shaft 308 is led to the meshing disengaging portion 323b of the second switchover hole 323, and the second idling plate 306 is pivoted in the counter-clockwise direction. Accordingly, as shown in FIG. 11B, the second switchover gear 98 is removed from the output gear 94.

The switchover hole 323 formed in the second switchover member 320 is formed being inclined toward the direction along the turning path of the second switchover member 320. Therefore, as shown in FIGS. 10A and 10B, when the second switchover gear 98 is meshing with the output gear 94, the second switchover member 320 is pivotable in the counter-clockwise direction within the range wherein the interlocking shaft 325 can move within the interlocking slot 315. Therefore, when the second switchover gear 98 is being meshed with the output gear 94, if the tip of the teeth of the output gear 94 and the tip of the teeth of the second switchover gear 98 abut against each other and the meshing is incomplete, the second switchover member 320 pivots in the counter-clockwise direction somewhat farther than the state shown in FIG. 10A, and also the second idling plate 306 is pressed in the clockwise direction, that is to say the meshing direction, by the second switchover member 320 which is effected by the pulling force of the pulling coil spring 322. At this time, by starting the second motor M2, and rotating the output gear 94 for a short time in the counter-clockwise direction which is the direction of advancing the meshing, or alternately rotating for a short time in the clockwise direction and counter-clockwise direction, the output gear 94 and the second switchover gear 98 can be securely meshed together.

As described above, when the driving unit 14 is moving to a retreating position, the first switchover member 310 is moved in the Y2 direction, the first switchover gear 95 is removed from the output gear 94, and the second switchover gear 98 meshes with the output gear 94, as shown in FIGS. 10A and 10B. Also, as shown in FIGS. 11A and 11B, when the driving unit 14 is pivoted turned in the clockwise direction and arrives at the intervention position, the fist switchover member 310 is moved in the Y1 direction, the first switchover gear 95 meshes with the output gear 94, and the second switchover gear 98 is removed from the output gear 94.

(First Protrusion Guide Member and Second Protrusion Guide Member)

As shown in FIGS. 1, 8, 9, 10A, 10B, 11A, and 11B, a first protrusion guide member 331 is provided on the Y2 side of the mechanism base 15 of the middle casing 4. The first protrusion guide member 331 is formed with a synthetic resin material. As shown in FIGS. 10B and 11B, a guide holder 332 is affixed on the top of the mechanism base 15. A guide slot 333 having a dogleg shape is formed in the upper face of the guide holder 332. The guide slot 333 has a direct guide portion 333a extending linearly in the Y1-Y2 direction and a protrusion guide portion 333b which is continuous from the Y1 side of the direct guide portion 333a and which extends diagonally relative to both of the Y1 direction and X1 direction.

A pair of sliding protrusions 331a and 331b are formed as an integrated unit on the upper face of the first protrusion guide member 331, and the sliding protrusions 331a and 331b are slidably inserted into the guide slot 333. An unshown compression coil spring for pushing out the back edge 331c of the first protrusion guide member 331 toward the Y1 direction is provided in the guide holder 332, and the first protrusion guide member 331 is pulled toward the direction the tip portion thereof protrudes from the guide holder 332 as shown in FIGS. 11A and 11B.

As shown in FIGS. 10A and 11A, a control protrusion 331d protruding downwards (in the Z1 direction) is formed as an integrated unit on the back edge of the first protrusion guide member 331. A guide slot 15k linearly extending in the Y1-Y2 direction is formed in the mechanism base 15, and the control protrusion 331d is inserted in the guide slot 15k and protrudes downwards of the mechanism base 15. As shown in FIGS. 10A and 11A, a compression unit 316 protruding in the X1 direction is formed on the first switchover member 310 provided on the lower side of the mechanism base 15. This compression unit 316 faces the position which can press the control protrusion 331d in the Y2 direction.

When the driving unit 14 is in the standby position shown in FIG. 6, the first switchover member 310 is moved in the Y2 direction, as shown in FIG. 10A. Accordingly, the control protrusion 331d is pressed toward the Y2 direction by the compression unit 316, and the first protrusion guide member 331 is retreated in the guide holder 332. At this time, the first protrusion guide member 331 is retreated farther toward the outside than the perimeter of the disk D held by the supporting member 21 in the disk storing region 20, and the first protrusion guide member 331 is in a position so as not to overlap with the disk D.

When the driving unit 14 is pivoted to the intervention position shown in FIG. 7, the first switchover member 310 is moved in the Y1 direction as shown in FIG. 11A, and the compression unit 316 is removed from the control protrusion 331d. Therefore, the first protrusion guide member 331 is pushed out toward the Y1 direction by the compression coil spring. At this time, as shown in FIG. 11B, the sliding protrusion 331a provided on the tip side of the first protrusion guide member 331 is led into the protrusion guide portion 333b of the guide slot 333, and the sliding protrusion 331b on the rear side is moved to the tip portion of the direct guide portion 333a. Therefore, the first protrusion guide member 331 protrudes toward the inside of the disk storing region 20 in a diagonal direction relative to both the Y1 and X1 directions.

Figure 15:
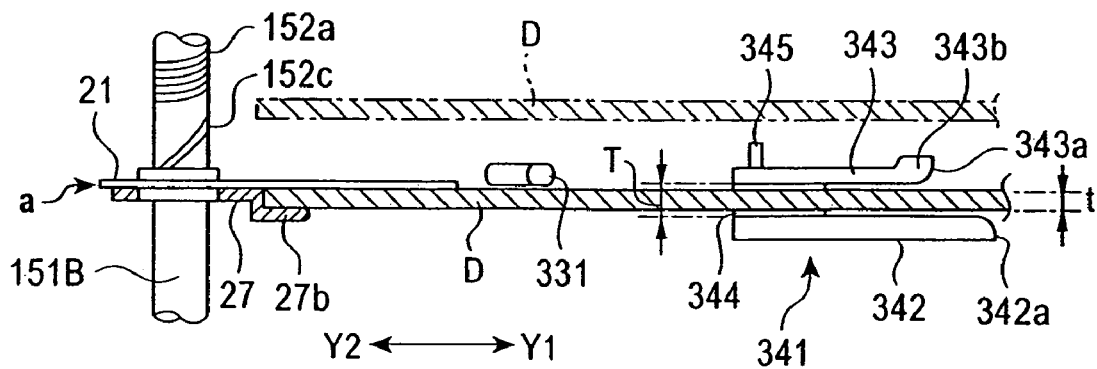
FIG. 15 is a partial cross-sectional view describing a guide functionality of a first protrusion guide member and a second protrusion guide member.
Figure 21:
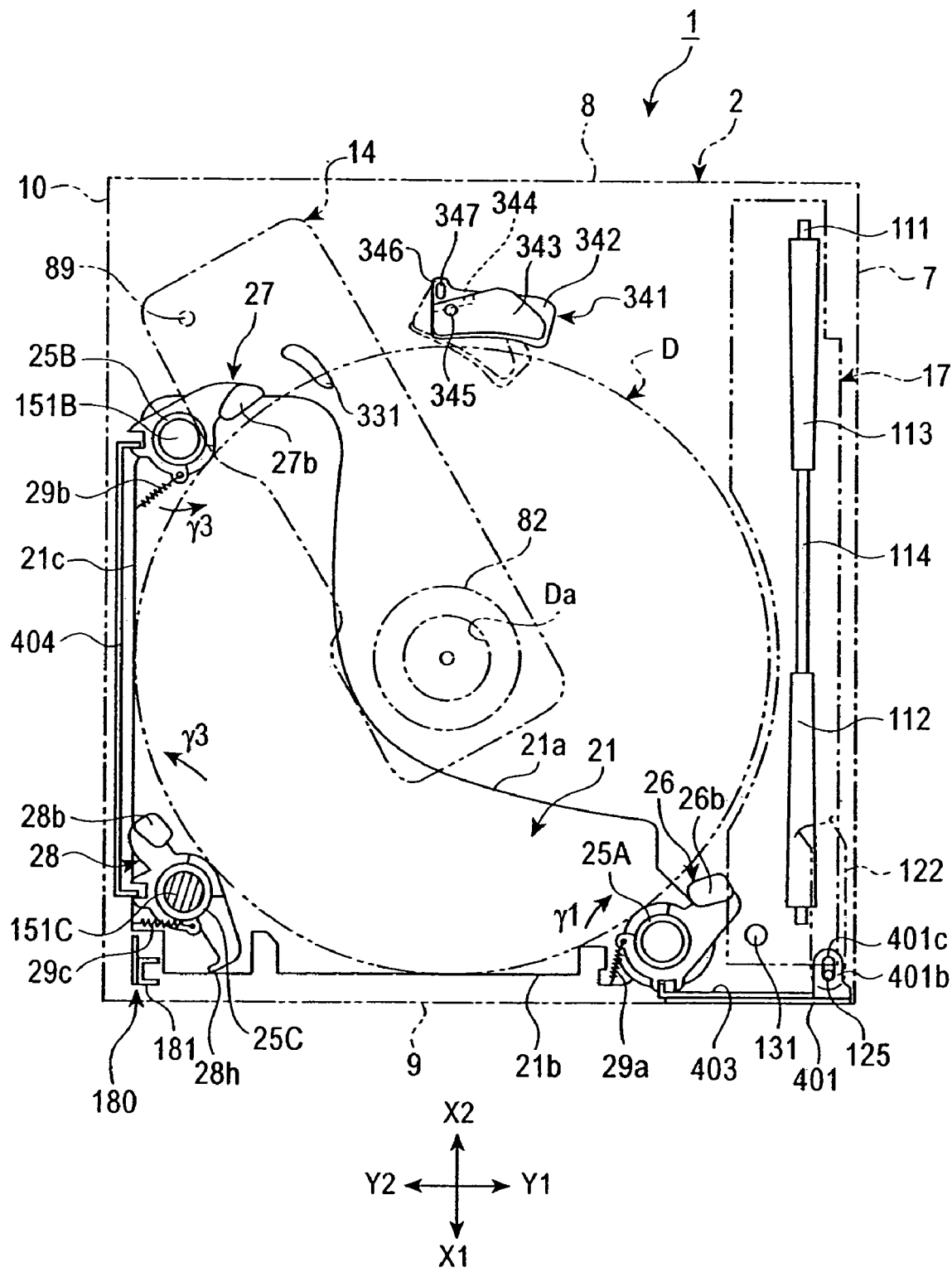

As a result, as shown in FIGS. 20 and 21, the first protrusion guide member 331 is arranged in a position of being stacked on top of the disk D in the peripheral vicinity of the disk D which is held on the lower face of the supporting member 21 moved to the selection position (a). Also, as shown in FIG. 15, the first protrusion guide member 331 is in contact with the upper face of the disk D at the selection position (a), or faces the disk with a slight spacing therebetween.

As shown in FIGS. 1, 8, and 9, and also in FIGS. 10A, 10B, 11A, and 11B, a second protrusion guide member 341 positioned farther on the Y1 side than the first protrusion guide member 331 is provided on the mechanism base 15. The second protrusion guide member 341 is formed with a synthetic resin material. As shown in FIGS. 1 and 15, and in FIGS. 20 and 21, the second protrusion guide member 341 has a lower guide portion 342 and an upper guide portion 343, and on the X2 side has a linking member 344 which links the lower guide portion 342 and upper guide portion 343. As shown in FIG. 15, the vertical spacing T between the upper face of the lower guide portion 342 and the lower face of the upper guide portion 343 is formed to be slightly wider than the thickness dimension t of the disk D. Also, an inclined guide face 342a facing the upper face is formed on the tip portion of the lower guide portion 343, and an inclined guide face 343a facing the lower face is formed on the tip portion of the upper guide portion 343, enabling the perimeter of the disk D carried in toward the Y2 direction to be easily led between the lower guide portion 342 and the upper guide portion 343 by the guide face 342a and the guide face 343a.

Figure 12:
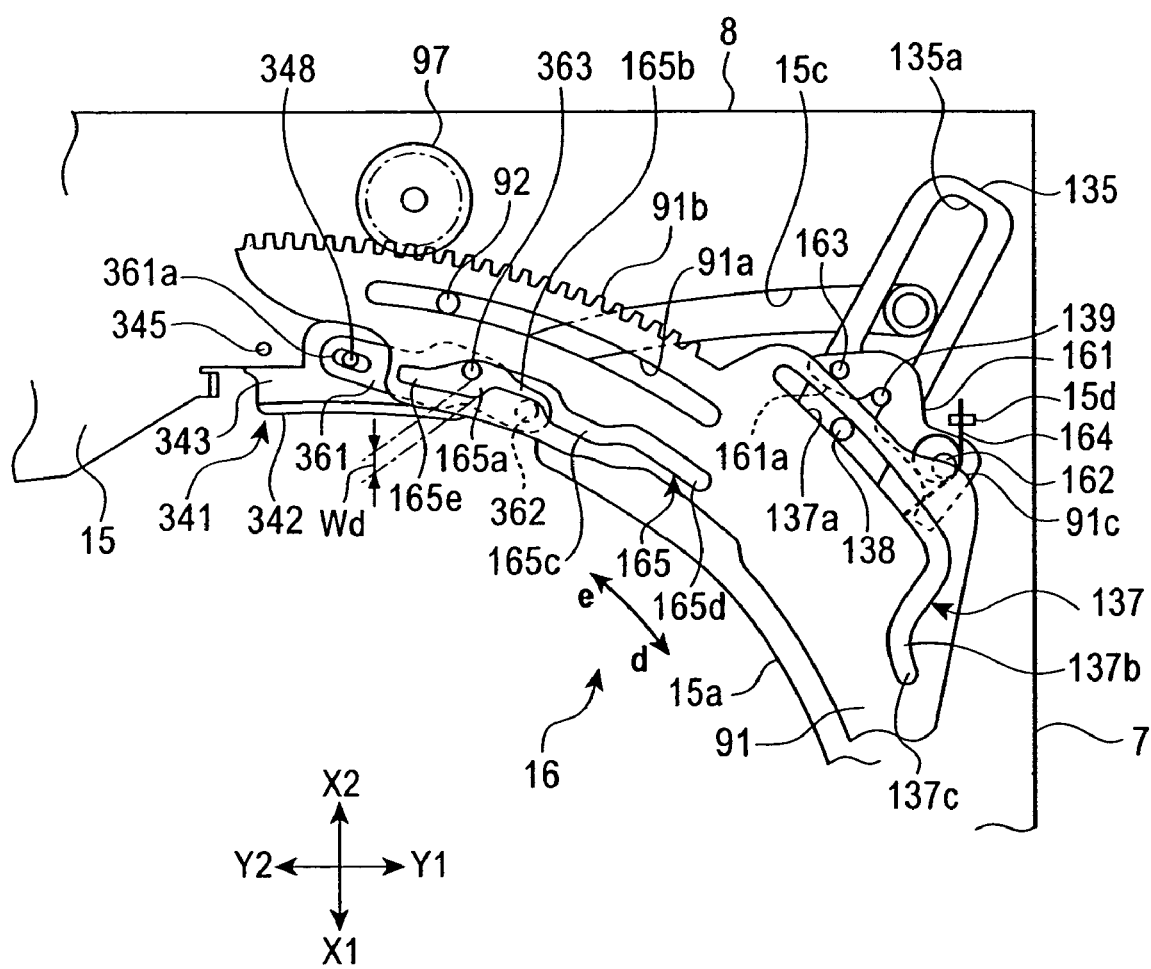
FIGS. 12 through 14 are partial plan view diagrams illustrating a switchover mechanism of a second protrusion guide member provided on a second motive force transmission mechanism, and a locking mechanism of a transporting unit.

As shown in FIGS. 10A, 10B, 11A, 11B, and in FIGS. 12 through 14, a supporting shaft 345 protrudes as an integrated unit on the upper face on the Y2 side of the second protrusion guide member 341, and the second protrusion guide member 341 is rotatably supported on the mechanism base 15 with the supporting shaft 345.

As shown in FIGS. 10A and 11A, and in FIGS. 20 and 21, a protruded piece 346 which protrudes toward the X2 direction is provided on the second protrusion guide member 341, and a slot 347 which serves as a first linking portion is open in this protruded piece. As shown in FIGS. 10A and 11A, a guide switchover member 351 is provided farther downward (on the Z1 side) than the first switchover member 310 on the lower face of the mechanism base 15, and the guide switchover member 351 is rotatably supported on the shaft 352 affixed to the mechanism base 15. A pair of arm portions are provided on the guide switchover member 351, with a linking shaft 353 affixed on the tip of one arm portion being slidably inserted into the slot 347.

A control shaft 356 is affixed to the other arm portion of the guide switchover member 351, and this control shaft 356 is inserted into the control slot 317 formed vertically through the first switchover member 310. The control slot 317 has a front holding portion 317a formed in a recessed shape in the X2 direction on the Y1 side and a rear holding portion 317b formed in a recessed shape in the X2 direction on the Y2 side, and a protrusion control portion 317c positioned on the X1 side and linearly extending in the Y1-Y2 direction is formed between the front holding portion 317a and the rear holding portion 317b.

As shown in FIGS. 12 through 14, a linking shaft 348 serving as a second linking portion at a position leaving a space from the supporting shaft 345 on the Y1 side is formed protruding as an integrated unit on the upper face of the second protrusion guide member 341. With the second motive force transmission mechanism 16, a middle switchover member 361 is provided between the switchover member 91 and the mechanism base 15. The middle switchover member 361 has the edge portion thereof on the Y1 side rotatably supported on the mechanism base 15 by the supporting shaft 362. Also, the middle switchover member 91 is constantly pulled in the clockwise direction by an unshown spring member. Therefore, the second protrusion guide member 341 is constantly pulled in the counter-clockwise direction with the supporting shaft 345 as the fulcrum, by the middle switchover member 91. A linking slot 361a is formed in the edge portion on the Y2 side of the middle switchover member 361, and the linking shaft 348 formed on the second protrusion guide member 341 is inserted in the linking slot 361a.

A guide control slot 165 is formed vertically through the switchover member 91. A switchover shaft 363 protruding upwards is affixed on the middle switchover member 361 between the supporting shaft 362 and the linking slot 361a, and the switchover shaft 363 is inserted in the guide control slot 165. Each portion of the guide control slot 165 is formed along an arc-shaped path, the center of curvature of the arc-shaped path matching the center of curvature of the arc-shaped path of the guide slot 91a formed in the switchover member 91.

An initial setting portion 165a is provided on the guide control slot 165. The inner width dimensions in the X1-X2 direction of the initial setting portion 165a is somewhat larger than the diameter of the switchover shaft 363, and as shown in FIG. 12, when the switchover shaft 363 is positioned within the initial setting portion 165a, the switchover shaft 363 has a movement margin Wd within the guide control slot 165. A first retreating guide portion 165b is formed in the guide control slot 165 on the side farther in the (d) direction than the initial setting portion 165a, and even farther on the (d) side, a first protrusion guide portion 165c is formed nearer toward the center of curvature the guide control slot, and further on the (d) side a second retreating guide portion 165d is formed. Also, on the (e) side farther than the initial setting portion 165a, a second protrusion guide portion 165e is formed on the side nearer the center of curvature.

FIG. 12 shows a state of the switchover member 91 of the second motive force mechanism 16 at the initial position. At this time, the switchover shaft 363 provided on the middle switchover member 361 is positioned in the initial setting portion 165a of the guide control slot 165 formed in the switchover member 91. At this time, the middle switchover member 361 is pivotable within the range of the movement margin Wd shown in FIG. 12.

When the switchover member 91 is stopped at the initial position shown in FIG. 12, the driving unit 14 performs a pivoting operation between the retreating position shown in FIG. 6 and the intervention position shown in FIG. 7.

When the driving unit 14 is in the retreating position, the first switchover member 310 is moving in the Y2 direction as shown in FIG. 10A and therefore the control shaft 356 provided on the guide switchover member 351 is positioned within the front holding portion 317a of the control slot 317 formed in the first switching member 310. The second protrusion guide member 341 is pulled in the counter-clockwise direction with the spring member pulling the middle switchover member 361, and further the guide switchover member 351 is pulled in the clockwise direction. Therefore, when the control shaft 356 is positioned within the front holding portion 317a, the guide switchover member 351 is pivoted in the clockwise direction, and the second protrusion guide member 341 is pivoted in the counter-clockwise direction. Accordingly, as shown in FIGS. 20 and 21, the second protrusion guide member 341 retreats to a position removed beyond the perimeter of the disk D stored in the disk storing region 20.

When the driving unit 14 is pivoted to the intervention position, the first switchover member 310 is moved from the position shown in FIG. 10A to the Y1 direction. At this time, the control shaft 356 provided on the guide switching member 351 slides along the protruding control portion 317c of the control slot 317, and therefore as shown with a broken line in FIG. 11A, the guide switchover member 351 is pivoted in the counter-clockwise direction, and the second protrusion member 341 is pivoted in the clockwise direction with the supporting shaft 345 as the fulcrum with the guide switchover member 351. At this time as shown with the broken line in FIG. 21 and also as shown in FIG. 15, the lower guide portion 342 of the second protrusion guide member 341 is in a position so as to overlap on the lower side of the disk D held by the supporting member 21 at the selection position (a), and the upper guide portion 343 is in a guide position which is overlapped on the upper side of the disk D.

Then as shown in FIG. 11A, when the first switchover member 310 finishes moving in the Y1 direction, the control shaft 356 enters the rear holding portion 317b of the control slot 317 and the guide switchover member 351 is pivoted in the clockwise direction, and the second protrusion guide member 341 is pivoted in the counter-clockwise direction and retreats outside the perimeter of the disk D held by the supporting member 21.

Thus, when the first switchover member 310 is moved in the Y1 direction, the second protrusion guide member 341 is pivoted in accordance therewith, but in the instance of this pivoting operation, as shown in FIG. 12, the switchover shaft 363 can be moved within a range of the movement margin Wd in the initial setting portion 165a of the guide control slot 165. Therefore, the middle switchover member 361 does not prevent the pivoting operation of the second protrusion guide member 341.

Thus, when the driving unit 14 begins pivoting from the retreating position to the intervention position, the second protrusion guide member 341 immediately protrudes into the disk storing region 20. The driving unit 14 is pivoted toward the intervention position, when the edge portion facing the driving unit 14 of the disk D held by the supporting member 21 at the selection position (a) is in a state of being supported vertically by the second protrusion guide member 341, and therefore the turntable 82 of the driving unit 14 does not abut against the edge portion of the disk D, and so can enter below the disk D.

Next, when the driving unit 14 is moved to the intervention position, as shown in FIGS. 11A and 11B, the first switchover member 310 is moved in the Y1 direction, the first switchover gear 95 is meshed with the output gear 94, and the motive force of the second motor M2 is applied to the pinion gear 97, and the switchover member 91 can be moved in the (d) direction or the (e) direction.

When the switchover member 91 is moved in the (e) direction and stops at the position shown in FIG. 13, and the shutter opening/closing member 126 shown in FIGS. 8 and 9 is moved in the X1 direction by the switchover member 91, as shown in FIG. 17B, the shutter 201 provided on the surface of the front face 7 is raised to uncover the insertion opening 23. At this time, as shown in FIG. 13, the switchover shaft 363 is led from the first retreating guide portion 165b of the guide control slot 165 provided on the switchover member 91 to the first protruding guide portion 165c. Accordingly, as also shown in FIG. 18, the middle switchover member 361 is pivoted in the counter-clockwise direction, and the second protrusion guide member 341 is pivoted in the clockwise direction and protrudes into the disk storing region 20.

When the switchover member 91 is pivoted from the position in FIG. 13 further in the (e) direction, the transmission shaft 138 is led into the driving inclined portion 137b of the unit control slot 137, the driving lever 135 is pivoted in the counter-clockwise direction, and the transporting unit 17 is pivoted facing the transporting operation position. At this time, the switchover shaft 363 is led into the second retreating guide portion 165d of the guide control slot 165, the middle switchover member 361 is pivoted in the clockwise direction, and as shown in FIG. 19, the second protrusion guide member 341 is pivoted in the counter-clockwise direction.

Also, when the switchover member 91 is pivoted from the initial position shown in FIG. 12 further in the (d) direction, the switchover shaft 363 is led into the second protrusion guide portion 165e of the guide control slot 165, as shown in FIG. 14. At this time also, the middle switchover member 361 is pivoted in the counter-clockwise direction and the second protrusion guide member 341 is pivoted in the clockwise direction.

As described above, the second protrusion guide member 341 protrudes in the clockwise direction or retreats in the counter-clockwise direction with the moving force in the (d)-(e) direction of the switchover member 91, but at this time, the guide switchover member 351 shown in FIG. 11A is also pivoted in accordance with the pivoting of the protrusion guide member 341. At this time, the control shaft 356 provided on the guide switchover member 351 is moved within the rear holding portion 317b of the control slot 317 formed on the first switchover member 310 in the X1-X2 direction. Accordingly, the guide switchover member 351 does not prevent the pivoting operation of the second protrusion guide member 341.

(Third Motive Force Transmission Mechanism)

Next, the structure of the third motive force transmission mechanism 19 provided on the base face 6 of the lower casing 3 will be described.

As shown in FIGS. 6 and 16, the pivot 131 serving as the rotational pivot for the transporting unit 101 is fixed to the base face 6 of the casing 2. The integral gear 141 is rotatably supported at the bottom of the pivot 131. This integral gear 141 has the upper portion thereof formed of a vertical worm gear 141a, and the lower portion formed as a lower gear 141b. As shown in FIG. 6, an intermediate gear 142 is rotatably provided on the base face 6 of the casing 2, with the intermediate gear 142 meshing with the lower gear 141b. A third motor M3 is provided on the base face 6, and a worm gear 143 fixed to the rotation shaft hereof meshes with the intermediate gear 142.

As shown in FIG. 16, with the transporting unit 17, one end of the roller shaft 111 protrudes outward from the fulcrum-side side face 103 of the unit frame 100, and a roller gear 144 which is a spur gear is fixed to the end of the roller shaft 111 protruding from the side face 103. A shaft 145 is formed on the side face 103, and an integral gear 146 is rotatably supported by this shaft 145. This integral gear 146 is integrally formed of a small-diameter spur gear 146a and a large-diameter spur gear 146b, with the small-diameter spur gear 146a meshing with the roller gear 144.

A supporting piece 102a protruding downward is formed integrally on the lower face 102 of the unit frame 100 by bending downward, and a shaft 148 is fixed to this supporting piece 102a. This shaft 148 extends in parallel with the roller shaft 111. An integral gear 147 is rotatably supported by this shaft 148. The integral gear 147 is integrally formed of a spur gear 147a and a worm wheel 147b. The spur gear 147a meshes with the large-diameter spur gear 146b.

In the state that the bearing portion 129 of the transporting unit 17 is rotatably positioned on the pivot 131, the worm wheel 147b and the worm gear 141a mesh. The rotational motive force of the third motor M3 is transmitted from the intermediate gear 142 to the lower gear 141b and the worm gear 141a, and further from the worm gear 141a to the worm wheel 147b. The motive force thereof is transmitted from the spur gear 147a to the large-diameter spur gear 146b, and further from the small-diameter spur gear 146a to the roller gear 144.

The rotational motive force of the third motor M3 provided on the lower casing 3 side is transmitted to the roller gear 144 via the integral gear 141 concentrically rotating with the pivot 131, so the roller shaft 111 can be driven independently from the action of pivoting the transporting unit 17 from the standby position to the transporting operation position, with the pivot 131 serving as a fulcrum. This disk-storing disk device 1 has separately provided the transporting unit pivoting means for pivoting the transporting unit 17 from the standby position to the transporting operation position, and the roller driving means for driving the transporting rollers 112 and 113, so that each can be independently operated.

(Supporting Member Selection Mechanism)

Next, the configuration of the supporting member selection mechanism 22 provided on the upper casing 5 will be described.

As shown in FIGS. 1 and 2B, three selecting shafts 151A, 151B, and 151C, mutually parallel and extending downward, are rotatably supported by the ceiling face 11 of the upper casing 5.

A selecting groove 152 is formed on the perimeter of each of the selecting shafts 151A, 151B, and 151C. The selection groove 152 is formed as a spiral. As shown in FIG. 2B, the spiral form of the selection groove 152 includes a fine-pitched portion 152a at the upper part of the selecting shafts 151A, 151B, and 151C, and a fine-pitched portion 152b at the lower part thereof. At the upper fine-pitched portion 152a and the lower fine-pitched portion 152b, the selection groove 152 is formed at a short pitch, with the selection groove 152 at the upper fine-pitched portion 152a and the lower fine-pitched portion 152b each being formed with at least five turns (five threads) The intermediate portions of the selecting shafts 151A, 151B, and 151C have the selection grooves 152 formed as coarse-pitch portions 152c, with each selection groove 152 making only one turn between the upper fine-pitched portion 152a and the lower fine-pitched portion 152b.

Six supporting members 21 are stacked vertically, each supporting member 21 being formed of a thin metal plate. As shown in FIGS. 18 through 21, each supporting member 21 has a left side edge 21b approximately parallel to the left side face 9 of the casing 2, and a back edge 21c approximately parallel to the back edge face 10 of the casing 2. An inner edge 21a of the supporting members 21 has a convex curved shape facing the inner side of the casing, and when the driving unit 14 is positioned facing the intervention position, the inner edge 21a of the supporting member 21 is at a position away from the perimeter of the turntable 82.

As shown in FIGS. 18 through 21, each supporting member 21 has a bearing 25A fixed at a position which is at the X1 side end and also the Y1 side end. Also, each supporting member 21 has a bearing 25B fixed at a position which is at the X2 side end and also the Y2 side end thereof, and further has a bearing 25C fixed on the supporting member 21 at a position which is at the inner side of the corner between the left side edge 21b and the back edge 21c. The bearing 25A is passed over the perimeter of the selection shaft 151A, the bearing 25B is passed over the perimeter of the selection shaft 151B, and the bearing 25C is passed over the perimeter of the selection shaft 151C. Engaging portions are formed integrally on the inner side of the bearings 25A, 25B, and 25C, in a protruding manner, with the engaging portions being slidably engaged in the selection grooves 152 formed on the perimeter of each of the selecting shafts 151A, 151B, and 151C.

The engaging portions of the six supporting members 21 are engaged in each of the five adjacent turns of the selection groove 152. Accordingly, upon the selecting shafts 151A, 151B, and 151C being rotated counter-clockwise in FIG. 18, the supporting members 21 are fed downward one at a time along the selecting shafts 151A, 151B, and 151C, and upon the selecting shafts 151A, 151B, and 151C rotating clockwise, the supporting members 21 are fed upward one at a time along the selecting shafts 151A, 151B, and 151C. The one of the selecting members 21 engaged with the coarse pitch portion 152c occupies the selection position (a) shown in FIG. 2B.

As shown in FIG. 2B, the supporting member 21 at the selection position (a) is positioned on the upper side of a loose pitch portion 152c. The supporting member 21 adjacent to the lower side of the supporting member 21 at the selection position (a) is retained at the selection groove 152 of the upper-most thread of the downward tight pitch portion 152b, but a relatively wide space extends vertically between the supporting member 21 on the lower side and the supporting member at the selection position (a) so that the driving unit 14 can enter this gap. On the other hand, the supporting member 21 adjacent to the upper side of the supporting member 21 at the selection position (a) is retained at the selection groove 152 of the lower-most thread of the upward tight pitch portion 152a, and therefore, the spacing between the supporting member 21 on the upper side and the supporting member 21 at the selection position (a) is quite narrow.

The disk D is held on the lower face of each supporting member 21, but the portions not supported with the holding claws 26b, 27b, 28b provided on the supporting member 21 (see FIGS. 18 through 21) are in a free state, and the portions of the disk D not held with the holding claws 26b, 27b, 28b with the supporting member 21 in an upward position are easily lowered. However, as shown in FIGS. 20 and 21, when the driving unit 14 is positioned in the intervention position, the first protrusion guide member 331 is consistently facing, in an overlapping manner, the upper face of the disk D which is held with the supporting member 21 at the selection position (a), and therefore even if the disk positioned on the upper side thereof sags, contact between this disk and the disk D at the selection position (a) is prevented by the first protrusion guide member 331.

A thin pinion (not shown) is provided on the upper end of each selection shaft 151A, 151B, and 151C, wherein the pinion is arranged so as to be rotatable while almost contacting the lower face of the ceiling face 11. A thin ring gear (not shown) of a large diameter is provided on the lower face of the ceiling face 11 so as to be rotatable, with the pinions provided on selection shafts 151A, 151B, and 151C all meshing with the teeth of the ring gear. Accordingly, all of the pinions are synchronized and rotationally driven, and the three selection shaft 151A, 151B, and 151C are synchronized and rotationally driven, by the rotation of the ring gear.

As shown in FIG. 2B, a rotational shaft 99a is rotatably supported on the lower face of the ceiling face 11 of the upper casing 5. The transmission gear 99 shown in FIGS. 8 and 9 and FIGS. 10B and 11B is fixed on the lower end of the rotational shaft 99a, with this transmission gear 99 meshing with the second switchover gear 98 of the second motive force transmission mechanism 16. A thin gear 99b is fixed at the upper end of the rotational shaft 99a, with the thin gear 99b being engaged with the teeth on the perimeter of the ring gear. As shown in FIG. 10B, in a state wherein the second switchover gear 98 is meshed with the output gear 94 and the transmission gear 99, and the first switchover gear 95 is disengaged from the output gear 94, starting the second motor M2 transmits the motive force thereof to the transmission gear 99, and the ring gear is driven by the thin gear 99b integrally formed with the transmission gear 99.

With the present embodiment, as described above, a supporting member selecting mechanisms for moving a selected supporting member 21 to the selection position (a) and increasing the gap with the supporting member 21 below the selected supporting member 21 is configured of three selecting shafts 151A, 151B, and 151C, each having selecting grooves 152, bearings 25A, 25B, and 25C, which each have engaging portions engaged with the selecting grooves 152, pinions 153A, 153B, and 153C which integrally rotate with the selecting shafts 151A, 151B, and 151C, a ring gear which meshes with all of the pinions, and a transmission gear 99 which rotationally drives the ring gear.

However, it should be noted that the supporting member selecting mechanism is not restricted to the arrangement described above, and may be substituted with other known mechanisms (e.g., a supporting member selecting mechanism using a cam gear described in Japanese Unexamined Patent Application Publication No. 2004-63017).

(Disk Holding Mechanism at Supporting Member)

As shown in FIGS. 18 through 21, each of the supporting members 21 have three holding members 26, 27, and 28. The holding members 26, 27, and 28 are provided on the lower face (Z1 side face) of each supporting member 21. In FIGS. 18 through 21, the holding members 26, 27, and 28 are illustrated with solid lines by transparent view through the supporting member 21. The holding member 26 is supported so as to be pivotable around the periphery of the bearing 25A. The holding member 27 is supported so as to be pivotable around the periphery of the bearing 25B, and the holding member 28 is supported so as to be pivotable around the periphery of the bearing 25C.

The holding member 26 and the supporting member 21 have spanned between them a pulling spring 29a, such that the holding member 26 is pulled in a pivoting fashion in the counter-clockwise direction (γ2 direction). A stopper (not shown) is provided to the supporting member 21, and the holding member 26 is restricted so as to not turn in the counter-clockwise direction (γ2 direction) beyond the attitude shown in FIG. 20. The holding member 27 is pulled in the clockwise direction by a pulling spring 29b, and a stopper (not shown) restricts the holding member 27 so as to not turn in the clockwise direction (γ4 direction) beyond the attitude shown in FIG. 18. In the same way, the holding member 28 is pulled in the clockwise direction by a pulling spring 29c, and a stopper (not shown) restricts the holding member 28 so as to not turn in the clockwise direction (γ4 direction) beyond the attitude shown in FIG. 18.

The holding members 26, 27, and 28 are formed of a synthetic resin. Each holding member 26, 27, and 28 has a holding claw 26b, 27b, and 28b integrated therewith. The holding claws 26b, 27b, and 28b face the lower face of the supporting member 21 leaving a space therebetween, and the disk D supplied on the lower side of the supporting member 21 is held between the lower face of the supporting member 21 and each holding claw 26b, 27b, and 28b.

As shown in FIGS. 18 through 21, a loading detecting unit 180 for detecting that a disk D has been loaded to a supporting member 21 at the selecting position (a) is provided to the corner between the left side face 9 of the casing 2 and the back side face 10 thereof. This loading detecting unit 180 has a photodetector 181. This photodetector 181 is of a configuration wherein a light-emitting element and a photoreceptor are facing each other. Only one such photodetector 181 is provided in the casing 2, and is provided at the same height as a supporting member 21 which has moved to the selecting position (a). Each of the holding members 28 provided to the supporting members 21 are provided with a detecting portion 28h protruding on the tip of an arm extending in the opposite direction from the arm including the holding claw 28b.

Upon a supporting member 21 moving to the selecting position (a), the detecting portion 28h faces the photodetector 181. At this time, as shown in FIGS. 18 and 19, in the event that a disk D is not held by the supporting member 21 which has moved to the selecting position (a), the detecting portion 28h interferes between the light-emitting device and the photoreceptor of the photodetector 181 since the holding member 28 is turned widely in the γ4 direction by the pulling coil spring 29c, so the detection output is OFF. Also, as shown in FIG. 20, in the event that a disk D is held by the supporting member 21 which has moved to the selecting position (a), the holding member 28 is pressed at the perimeter of the disk D, wherein the holding member 28 is slightly turned in the γ3 direction. Accordingly, the detecting portion 28h comes out from the photodetector 181, so the detection output of the photodetector 181 is ON.

At the mechanism control unit, monitoring the detection output of the photodetector 181 switching from OFF to ON at the time of the disk D being transported in enables recognition that the disk D has been positioned and held by the supporting member 21.

Note that the holding member 28 which has turned to the position shown in FIG. 20 is constantly pulled in the clockwise direction by the pulling coil spring 29c, and that the disk D is continuously pressed in the Y1 direction due to this force. However, a restricting mechanism (not shown) is provided within the casing, which enters the center hole Da of the disk D held by the supporting member 21 when the disk D is not being held on the turntable. Accordingly, the disk D does not come loose from the supporting member 21 from the force acting on the holding member 28 when the driving unit 14 is in a retracting position.

As shown in FIGS. 18 through 21, a transmission switchover member 401 is movably provided in the Y1-Y2 direction on the inner side of the left side face 9 of the casing 2. A first holding switchover member 403 is provided so as to be stacked on the inner side of the transmission switchover member 401. The first holding switchover member 403 is slidably supported in the Y1-Y2 direction relative to the transmission switchover member 401, but a linking spring is hooked between the transmission switchover member 401 and the first holding switchover member 403. The first holding switchover member 403 is pulled in the Y1 direction and the transmission switchover member 401 is pulled in the Y2 direction by this linking spring, whereby the transmission switchover member 401 and the first holding switchover member 403 are associated with one another.

A linking piece 401b which is bent toward the X2 direction is formed so as to be integrated on the edge portion (upper edge) on the Z2 side of the transmission switchover member 401, and a linking slot 401c is formed in the linking piece 401b. The switchover pin 125 provided on the switchover lever 122 shown in FIGS. 8 and 9 is inserted in the linking slot 401c.

Also, a second holding switchover member 404 which is movable in the X1-X2 direction is provided on the inner side of the rear side face 10 of the casing 2. The first holding switchover member 403 and the second holding switchover member 404 are operated together with the motive force of a holding disengaging mechanism not shown.

In FIGS. 18 and 19, the switchover lever 122 is rotated in the clockwise direction, and the transmission switchover member 401 and the first holding switchover member 403 are moved together in the Y2 direction by this switchover lever 122. At this time, the holding member 26 is rotated in the γ1 direction by the first holding switchover member 403. Also, in FIGS. 18 and 19, the second holding switchover member 404 is moved in the X2 direction, whereby the second switchover member 404 is removed from the holding member 27 and the holding member 28. Accordingly, the holding member 27 and the holding member 28 are rotated together in the γ4 direction by the pulling force of the pulling coil springs 29b and 29c.

As shown in FIG. 20, when the switchover lever 122 is rotated in the counter-clockwise direction, the transmission switchover member 401 and the first holding switchover member 403 are moved together in the Y1 direction by the switchover pin 125. At this time, the first holding switchover member 403 is removed from the holding member 26, and the holding member 26 is rotated in the γ2 direction by the pulling coil spring 29a.

As shown in FIG. 21, when the switchover lever 122 is rotated in the counter-clockwise direction, and the first holding switchover member 403 is driven in the Y2 direction by the holding disengaging mechanism not shown, while the transmission switchover member 401 is in the state of being held in the Y1 direction by the switchover pin 125, the linking spring is stretched and only the first holding switchover member 403 is moved in the Y2 direction. Simultaneously with this, the second holding switchover member 404 is driven in the X1 direction by the holding disengaging mechanism. At this time, the holding member 26 is rotated in the γ1 direction by the first holding switchover member 403, the holding members 27 and 28 are rotated in the γ3 direction by the second holding switchover member 404, and all of the holding claws 26b, 27b, and 28b are moved to the outer side of the perimeter of the disk D.

Next, description will be made regarding the overall operation of the disk-storing disk device 1.

(Supporting Member Selection Operation)

When moving one of the six supporting members 21 in the disk-storing region 20 to the selection position (a), the rack member 32 is set at the starting point, having been moved in the farthest Y2 direction by the first motor M1 of the first motive force transmission mechanism 12, as shown in FIG. 3. Accordingly, the slider 31 and switchover lever 38 are moved in the Y2 direction, and as shown in FIG. 6, the driving slider 85 provided on the lower face of the unit supporting base 13 is moved in the Y2 direction by the switchover driving pin 41 provided on the switchover lever 38, and the driving unit 14 is set to a retracting position which does not abut against the disk D stored in the disk-storing region 20.

At this time, since the switchover control shaft 87 protruding upward from the driving unit 14 is moving in the counter-clockwise direction, the first switchover member 310 provided on the lower face of the mechanism base 15 is moved in the Y2 direction by the switchover control shaft 87, as shown in FIG. 10A.

When the first switchover member 310 is moving in the Y2 direction, the control protrusion 331d is pressed in the Y2 direction by the compression unit 316 provided on the first switchover member 310, and the first protrusion guide member 331 is retracted into the guide holder 332 shown in FIG. 10B. Accordingly, the first protrusion guide member 331 is retreated farther to the outside than the perimeter of the disk in the disk storing region 20.

As shown in FIG. 10A, when the first switchover member 310 is moving in the Y2 direction, the first switchover shaft 304 is led into the meshing disengaging portion 313a of the first switchover hole 313 provided in the first switchover member 310, and the first idling plate 302 shown in FIG. 10B is pivoted in the counter-clockwise direction, and the first switchover gear 95 supported by the first idling plate 302 is removed from the output gear 94.

Also, the interlocking shaft 325 is positioned on the first interlocking portion 315a or the inclined portion 315c of the interlocking slot 315 formed in the first switchover member 310, and so the second switchover member 320 is pivoted in the clockwise direction. The second switchover shaft 308 is led into the meshing portion 323a of the second switchover hole 323 formed in the second switchover member 320, and so as shown in FIG. 10B, the second idling plate 306 is pivoted in the clockwise direction, and the second switchover gear 98 is meshed with the output gear 94.

At this time, with the second motive force transmission mechanism 16, as shown in FIGS. 8 and 12, the switchover member 91 is at the initial position, and as described above the first switchover gear 95 is removed from the output gear 94, so the pinion gear 97 is not rotated, and the switchover member 91 is stopped at the initial position. When the switchover member 91 is stopped at the initial position, the switchover shaft 363 affixed to the middle switchover member 361 is positioned in the initial setting portion 165a of the guide control slot 165 with movement room as shown in FIG. 12. The middle switchover member 361 is pulled in the clockwise direction, so the second protrusion guide member 341 is pivoted in the counter-clockwise direction by the middle switchover member 361, and the second protrusion guide member 341 is retreated to a position removed from the periphery of the disk D within the disk storing region 20.

As shown in FIG. 8, when the switchover member 91 is stopped at a predetermined position, the transmission shaft 138 is positioned in the non-acting 137a of the unit control slot 137 formed in the switchover member 91. Accordingly, the driving lever 135 is held in a state of being pivoted in the clockwise direction, and the transporting unit 17 is set at a standby position not abutting against the disk D in the disk storing region 20. At this time, as shown in FIG. 12, the locking member 161 provided on the mechanism base 15 is pivoted in counter-clockwise direction by the pulling force of the torsion spring 164, and the retaining protrusion 139 is held by the holding recessed portion 161a of the locking member 161. A driving lever provided to this retaining protrusion 139 is held in the state pivoted in the clockwise direction, and the transporting unit 17 is accordingly restricted from moving from the standby position.

As shown in FIG. 8, when the switchover member 91 is stopped at the initial position, the shutter opening/closing member 126 provided on the inner side of the front face 7 is moved in the X1 direction by the switchover member 91. Therefore, as shown in FIG. 17A, the shutter 201 is lowered and the insertion opening 23 in the front face 7 is closed.

Also, in FIG. 8, the switchover lever 122 is pivoted in the clockwise direction by the switchover member 91. Therefore, the transmission switchover member 401 and the first holding switchover member 403 are moved together in the Y1 direction, as shown in FIG. 20, and therefore, the first holding switchover member 403 is removed from the holding member 26, and the holding member 26 is pivoted in the γ2 direction by the pulling coil spring 29a. Also, as shown in FIG. 20, the second holding switchover member 404 provided on the inner side of the rear side face 10 is moved in the X2 direction so as to be removed from the holding members 27 and 28, and therefore the holding members 27 and 28 are pivoted in the γ4 direction by the pulling coil springs 29b and 29c. Accordingly, in the case that the disk D is supplied to the supporting member 21, this disk D is held between the holding claws 26b, 27b, and 28b and the lower face of the supporting member 21. Note that at this time, the restriction mechanism provided within the casing 2 is positioned in the center hole Da of the disk D held by the supported member 21, and prevents the disk D from falling from the supporting member 21.

When an operation is performed to select one of the supporting members 21 by operating an operation unit provided on the face of the casing 2 or a remote control device, the second motor M2 shown in FIG. 8 is started. When the second motor M2 is started, by always rotating the output gear 94 shown in FIG. 10B in the counter-clockwise direction with the second motor M2, or by rotating in the clockwise direction for a short time, followed by the counter-clockwise direction, the second switchover gear 98 and the output gear 94 can be securely meshed together.

The rotational force of the second motor M2 thereafter is transmitted from the output gear 94 to the transmission gear 99 via the second switchover gear 98. A ring gear provided on the lower face of the ceiling face 11 of the casing 2 is driven by this transmission gear 99, and the three selection shafts 151A, 151B, and 151C provided on the supporting member selection mechanism 22 are synchronized and rotated. With the rotation of the three selection shafts 151A, 151B, and 151C, the supporting members 21 are sequentially fed downward, or are sequentially fed upward. A rotation detecting unit for detecting the rotational phase of the ring gear is provided within the casing 2, and with the rotation detecting unit, the mechanism control unit can confirm which supporting member 21 has arrived at the selection position (a). Accordingly, when confirmation is made that the supporting member 21 specified by an operation has moved to the selection position (a), the second motor M2 is stopped.

(Setting for Disk Insertion Standby Mode)

At the time of loading a disk D to the disk-storing disk device 1, an operating unit provided on the front face 7 of the casing 2 or a remote controller is operated, so as to specify a supporting member 21 not holding a disk D. When the supporting member 21 not holding a disk D is moved to the selection position (a) and is stopped by the supporting member selection operation, the first motor M1 shown in FIG. 3 is started with the mechanism control.

The rack member 32 is moved from the position in FIG. 3 in the Y1 direction with the motive force of the first motor M1, and at the point of being moved to the position shown in FIG. 4, the first motor M1 stops. When the rack member 32 is moved from the position in FIG. 3 to the position in FIG. 4, the slider 31 and the switchover lever 38 are moved in the Y1 direction along with the rack member 32. Also, the driving slider 85 is moved from the position shown in FIG. 6 to the position shown in FIG. 7 with the switchover driving pin 41 provided on the switchover lever 38. At this time, the moving force of the driving slider 85 acts upon the driving shaft 88 via a linking mechanism, the driving shaft 88 is pulled in the Y1 direction, and the driving shaft 88 is moved along an arc-shaped guide portion 13e formed in the unit supporting base 13. Also, the driving unit 14 is pivoted in the clockwise direction with the supporting shaft 18 as the fulcrum thereof.

While the rack member 32 moves from the starting position shown in FIG. 3 to the position shown in FIG. 4, the linking turning lever 44 is stopped at the position to which it has been pivoted in the clockwise direction, and the lock switchover member 42 is stopped at the state in which it has moved in the (b) direction. At this time, the transmission member 52 situated at the Y2 end of the first motive force transmission mechanism 12 has been pivoted in the clockwise direction, and the locking member 54 is moved toward the X2 side by this transmission member 52. Also, as shown in FIG. 2B, the locking member 61 provided on the inner face of the front face 7 of the casing 2 is also moved toward the X2 side. Accordingly, the restricting shaft 77 provided behind the unit supporting base 13 is held within the restricting portion 56a of the lock control hole 56 formed in the locking member 54 shown in FIG. 1, and the restricting shafts 78 provided at the front of the unit supporting base 13 are also held by the restricting portions 62a of the lock control holes 62 formed in the locking member 61, as shown in FIG. 2B.

Accordingly, the unit supporting base 13 is lowered to a position in proximity of the base face 6 by compressing the dampers 71, 72, and 73, at which lowered position the unit supporting base 13 and the driving unit 14 are restricted in a state wherein elastic movement (movement when elastically supported by the dampers 71, 72, and 73) is prevented, and the turntable 82 of the driving unit 14 which has pivoted to the intervention position can move below the disk D held by the supporting member 21 at the selecting position (a).

When the driving unit 14 is pivoted from the retreating position to the intervention position, the switchover control shaft 87 provided on the driving unit 14 is also pivoted in the clockwise direction, and so the first switchover member 310 is moved from the position shown in FIG. 10A in the Y1 direction. At this time, the compression unit 316 provided on the first switchover member 310 is moved away from the control protrusion 331d, and so the first protrusion guide member 331 protrudes into the disk storing region 20 facing diagonally relative to the Y1 direction and to the X1 direction, as shown in FIGS. 11A and 11B.

Also, when the first switchover member 310 starts moving from the position shown in FIG. 10A in the Y1 direction, immediately the control shaft 356 pulls out from the holding portion 317a of the control slot 317 and slides along the protrusion control portion 317c. Accordingly, as shown with a broken line in FIG. 11A, the guide switchover member 351 is pivoted in the counter-clockwise direction, and the second protrusion guide member 341 protrudes toward the disk storing region 20.

When the driving unit 14 has finished moving to the intervention position, the control shaft 356 enters into the rear side holding portion 317b of the control slot 317, as shown in FIG. 11A, the guide switchover member 351 is pivoted in the clockwise direction, and as shown with a solid line in FIG. 11A, the second protrusion guide member 341 is pivoted in the counter-clockwise direction, and the second protrusion guide member 341 is retreated to outside the disk storing region 20.

When the driving unit 14 is pivoted to the intervention position, and as shown in FIG. 11A, the first switchover member 310 is moved in the Y1 direction, the first idling plate 302 is pivoted in the clockwise direction by the first switchover hole 313, and as shown in FIG. 11B the first switchover gear 95 is meshed with the output gear 94. Simultaneously, the second switchover member 320 is pivoted in the counter-clockwise direction by the second interlocking portion 315b of the interlocking slot 315, the second idling plate 306 is pivoted in the counter-clockwise direction by the second switching hole 323 formed on the second switching member 320, and the second switchover gear 98 is removed from the output gear 94.

When a detecting means (not shown) detects that the driving unit 14 has finished moving toward the intervention position, the second motor M2 in FIG. 8 is started, and the output gear 94 is rotated in the counter-clockwise direction or is rotated for a short time in the clockwise direction and afterwards rotated in the counter-clockwise direction. Thus, the first switchover gear 95 and the output gear 94 are securely meshed together.

Afterwards, the output gear 94 is driven in the counter-clockwise direction by the second motor M2, the pinion gear 97 is driven in the counter-clockwise direction, and the motive force is applied to the rack teeth 91b, whereby the second switchover member 91 is driven in the (e) direction. When the switchover member 91 is moved to the position in FIG. 13, the second motor M2 is stopped. In the state in FIG. 13, the switchover shaft 363 provided on the middle switchover member 361 is led by the first protrusion guide portion 165c of the guide control slot 165 formed in the switchover member 91. Accordingly, the middle switchover member 361 is pivoted in the counter-clockwise direction, and the second protrusion guide member 341 is pivoted again in the clockwise direction and protrudes into the disk storing region 20.

Also, when the switchover member 91 is stopped at the position shown in FIG. 13, the control pin 124 provided on the switchover lever 122 shown in FIG. 8 is moved from the first arc-shaped portion 121*a* of the switchover slot 121 formed on the switchover member 91 to the second arc-shaped portion 121*b* via the switchover member 121*c*. Accordingly, the switchover lever 122 is pivoted in the clockwise direction, and the switchover pin 125 provided on the edge portion on the X1 side of the switchover lever 122 is moved in the Y2 direction as shown in FIG. 18. At this time, the transmission switchover member 401 and the first holding switchover member 403 linked via the linking spring are moved in the Y2 direction by the switchover pin 125, and the holding member 26 is widely pivoted in the γ1 direction by the first holding switchover member 403. Note that a second holding switchover member 404 provided on the inner side of the back side face 10 of the casing 2 remains having been moved in the X2 direction, and the holding members 27 and 28 remain having been pivoted in the γ4 direction.

Also, when the switchover member 91 is moved to the position shown in FIG. 13, the sliding protrusion 163 is pressed by the disengaging cam portion 91*c* on the switchover member 91, the locking member 161 is pivoted in the clockwise direction, the holding recessed portion 161*a* is removed from the retaining protrusion 139, and the lock on the driving lever 135 is disengaged.

When the switchover member 91 is moved in the position shown in FIG. 13, the shutter opening/closing member 126 shown in FIGS. 8 and 9 is moved in the X2 direction by the driving pin 127 provided on the switchover member 91, and as shown in FIG. 17B, the sliding pins 203 provided on the shutter 201 are guided to the opening portions 202*b* of the opening/closing cams 202 formed in the shutter opening/closing member 126, the shutter 201 ascends in the Z2 direction, and the insertion opening 23 is uncovered.

Thus, with the disk insertion standby mode, the driving unit 14 is pivoted to the intervention position, and the first protrusion guide member 331 and the second protrusion guide member 341 protrude into the disk storing region 20. Also, with the supporting member 21 at the selection position (a), the holding member 26 in the position closest to the insertion opening 23 is pivoted in the clockwise direction. The transporting unit 17 is in the standby position, but the lock on the driving lever 135 is disengaged. The shutter 201 is then retracted, and a disk D can be inserted into the insertion opening 23.

(Disk Carry-In Operation)

When a disk D is inserted from the insertion opening 23, and the disk insertion is detected with an unshown insertion detecting unit, a third motor M3 shown in FIG. 7 is started, the roller shaft 111 on the transporting unit 17 at the standby position is started, and the first transporting roller 112 and the second transporting roller 113 are rotated in the carry-in direction. When the disk D is nipped by the transporting rollers 112 and 113 and the nipping portion 106, the disk D is carried into the casing 2 by the rotational force of the transporting rollers 112 and 113.

As shown in FIG. 18, the disk D is carried into the casing 2 with the center D0 thereof being moved over the insertion center line Oa, with the transporting unit 17 being in a standby position. At this time, the second protrusion guide member 341 is pivoted in the clockwise direction, and therefore the edge portion on the Y2 side of the disk D carried in along the insertion center line Oa enters between the lower guide portion 342 of the second protrusion guide member 341 and the upper guide portion 343. The disk D is carried in while being nipped by the transporting rollers 112 and 113 of the transporting unit 17 and the nipping portion 106. When the center D0 of the disk D moves further toward the interior of the casing 2 than the transporting rollers 112 and 113, the perimeter on the Y2 side of the disk D becomes easier to vibrate vertically.

However, as shown in FIG. 18, the edge portion on the Y2 side of the disk D is vertically supported by the lower guide portion 342 and the upper guide portion 343 of the second protrusion guide member 341, and therefore, thereafter the disk D does not abut against the turntable 82 nor enter the upper side of the supporting member 21 at the selection position (a), and is securely supported on the lower face of the supporting member 21.

As shown in FIG. 18, when the unshown detecting member detects that the disk D has moved to the position supported by the second protrusion guide member 341, the second motor M2 shown in FIG. 8 is restarted, and the switchover member 91 is moved in the (e) direction. When the switchover member 91 begins moving in the (e) direction, immediately the transmission shaft 138 is led into the driving inclined portion 137*b* of the unit control slot 137, and the driving lever 135 is pivoted in the counter-clockwise direction. The transporting unit 17 is pivoted in the counter-clockwise direction by the driving lever 135 with the fulcrum shaft 131 as the center thereof, and arrives at the transporting operation position shown in FIG. 19. At this time, as shown in FIG. 9, the shutter opening/closing member 126 is moving in the X2 direction, and therefore as shown in FIG. 17B, the shutter 201 maintains the state of being moved in the Z2 direction, and the insertion opening 23 remains uncovered. Also, since the switchover lever 122 is pivoted in the clockwise direction, and transmission switchover member 401 and the first holding switchover member 403 are moved in the Y2 direction, and the holding member 26 in a position close to the insertion opening 23 remains having been pivoted in the clockwise direction.

When the switchover member 91 is pivoted to the position shown in FIG. 9, the switchover shaft 363 is led by the second retreating guide portion 165*d* of the guide control slot 165, the middle switchover member 361 is pivoted in the clockwise direction, and as shown in FIGS. 9 and 19, the second protrusion guide member 341 is pivoted in the counter-clockwise direction and returns to the same orientation as at the time of the supporting member selecting operation.

During the time that the transporting unit 17 is pivoted turned from the standby position to the transporting operation position shown in FIG. 19, and also after the pivoting thereof is finished, the transporting rollers 112 and 113 continue to rotate in the carry-in direction. With the state in FIG. 19, disk D is carried in toward the interior of the casing 2, with the center D0 thereof moving along the carry-in center line Ob, by the transporting unit 17 in the transporting operation position. At this time, the edge portion of the disk D continues the state of being nipped by the lower guide portion 342 and the upper guide portion 343 of the second protrusion guide member 341 which is pivoted in the counter-clockwise direction. Also, by the second protrusion guide member 341 being pivoted in the counter-clockwise direction, the linking member 344 which connects the lower guide portion 342 and the upper guide portion 343 is moved in the X2 direction, and the perimeter of the disk D which is carried in along the carry-in center line Ob can be moved without abutting against the linking member 344.

During the movement from the state shown in FIG. 18 to the state shown in FIG. 19, the edge portion of the disk D is carried in while being restricted between the lower guide portion 342 and the upper guide portion 343 without vertical vibration, and therefore the perimeter of the disk D can be led between the holding claws 27*b* and 28*b* of the holding members 27 and 28 positioned on the far back side of the casing 2 and the lower face of the supporting member 21, and can lower the probability of the perimeter of the disk D drooping down and entering beneath the holding claws 27*b* and 28*b*. After the disk D is nipped by the holding claws 27*b* and 28*b* and the lower face of the supporting member 21, the perimeter of the disk D pulls out of the second protrusion guide member 341.

Further, the first protrusion guide member 331 protrudes into the disk storing region 20 on the Y2 side farther than the second protrusion guide member 341. Accordingly, immediately following the perimeter of the disk D separating from the second protrusion guide member 341, the upper face of the disk D is supported by the first protrusion guide member 331, and so the disk D can be prevented from deviating upwards.

On the other hand, during the time the disk D is carried in toward the supporting member 21, the holding member 26 maintains a state of being pivoted in the γ1 direction. As shown in FIG. 19, when the disk D passes the position nearing the selection shaft 151A and bearing 25A, the disk D can be prevented from abutting against the holding member 26.

As shown in FIG. 19, the disk D which is carried in along the carry-in center line Ob abuts against the holding members 27 and 28, and the position thereof is determined. At this time, the holding claw 28*b* is pressed by the disk D and the holding member 28 is turned slightly in the γ3 direction, the detecting portion 28*h* pulls out from the optical detecting element 181 of the load detecting unit 180, and the detecting output is ON. At this time, with the mechanism control unit, the disk D is confirmed as being loaded in the supporting member 21 at the selection position (a), the third motor M3 stops, and the transporting rollers 112 and 113 are stopped. Accordingly, the disk D carried in on the supporting member 21 remains nipped by the stopped transporting rollers 112 and 113 and the nipping portion 106.

(Disk Clamp Operation)

Following the stopping of rotation of the transporting rollers 112 and 113, the first motor M1 of the first motive force transmission mechanism 12 starts, and the rack member 32 is moved in the Y1 direction. At this time, the slider 31 and the switchover lever 38 do not move from their positions in FIG. 4, but the linking turning lever 44 is pivoted in the counter-clockwise direction by the rack member 32, and the lock switchover member 42 is moved in the (c) direction. Accordingly, the locking member 54 provided at the Y2 side of the lower casing 3 is moved by approximately half the movement range thereof in the X1 direction, and further, the rack member 61 shown in FIG. 2B is also moved by approximately half the movement range thereof in the X1 direction.

At this time, the restricting shaft 77 provided behind the unit supporting base 13 is guided to the lifting portion 56*b* of the lock control hole 56 formed in the locking member 54, and at the same time, the restricting shafts 78 provided to the front of the unit supporting base 13 are guided to the lifting portions 62*b* of the lock control holes 62 formed in the locking member 61. Accordingly, the unit supporting base 13 is lifted away from the base face 6, the driving unit 14 supported by the unit supporting base 13 is also lifted, and the center protrusion portion 82*b* of the turntable 82 provided on the driving unit 14 enters the center hole Da of the disk D from below.

Continuing from the operation of the center protrusion portion 82*b* of the turntable 82 entering into the center hole Da of the disk D, the rack member 32 is further moved in the Y1 direction by the motive force of the first motor M1 of the first motive force transmission mechanism 12, and upon the movement position thereof being detected with unshown detecting means, the first motor M1 stops. At this time, the linking turning lever 44 does not pivot, the slider 31 and the switchover lever 38 further move in the Y1 direction, and the driving slider 85 provided on the lower face of the unit supporting base 13 further moves in the Y1 direction by the switchover driving pin 41 provided on the switchover lever 38.

A clamping mechanism provided on the turntable 82 is operated by the moving force of the driving slider 85 at this time, a clamp claw protrudes from the periphery of the center convex portion 82*b* of the turntable 82, the perimeter of center hole Da of the disk D is nipped by a flange portion 82*c* and the clamp claw, and the center hole Da of the disk D is clamped to the turntable 82.

When the disk clamping is completed, the second motor M2 of the second motive force transmission mechanism 16 is started, the switchover member 91 is moved in the (d) direction, and the switchover member 91 is returned to the initial position shown in FIGS. 8 and 12, whereby the second motor M2 is stopped at this point. When the switchover member 91 is to be moved in the (d) direction, the transmission shaft 138 is moved from the driving inclined portion 137*b* of the unit control slot 137 provided in the switching member 91 to the non-acting portion 137*a*. Accordingly, the driving lever 135 is pivoted in the clockwise direction, and the transporting unit 17 is pivoted in the clockwise direction from the transporting operation position and is moved to the standby position shown in FIG. 20. During this time, the transporting rollers 112 and 113 are rotated toward the carry-in direction by the third motor M3. Accordingly, the transporting unit 17 is pivoted from the transporting operation position to the standby position while the transporting rollers 112 and 113 roll over the surface of the disk D.

At this time if the peripheral velocity of the surface of the transporting rollers 112 and 113 is arranged to be slightly faster than the turning velocity of the transporting unit 17, the transporting unit 17 returns to the standby position while the disk D is pressed by the holding members 27 and 28, and the transporting rollers 112 and 113 are removed from the disk D.

When the switchover member 91 returns to the initial position shown in FIG. 12, the locking member 161 is pivoted in the counter-clockwise direction, the retaining protrusion 139 is held by the holding recessed portion 161*a* of the locking member 161, the driving lever 135 is locked while in the state of pivoting in the clockwise direction, and the transporting unit 17 is held at the standby position. Also, the switchover shaft 363 is positioned within the initial setting portion 165*a* of the guide control slot 165, and so the middle switchover member 361 is pivoted in the clockwise direction and the second protrusion guide member 341 is pivoted in the counter-clockwise direction.

At this time, as shown in FIG. 8, the shutter opening/closing member 126 provided on the inner face of the front face 7 of the casing 2 is moved in the X1 direction by the driving pin 127 provided on the switchover member 91. Accordingly, as shown in FIG. 17A, the sliding pins 203 provided on the shutter 201 are guided to the closing portions 202*a* of the opening/closing cams 202 such that the shutter 201 is lowered in the Z1 direction, and the insertion opening 23 formed on the front face of the casing 2 is closed with the shutter 201.

Also, as shown in FIG. 8, the control pin 124 is guided within the first arc portion 121a of the switchover slot 121, and the switchover lever 122 is pivoted in the counter-clockwise direction. Accordingly, as shown in FIG. 20, the transmission switchover member 401 provided on the inner face of the left side face 9 of the casing 2 is moved in the Y1 direction by the switchover pin 125 provided on the X1 end of the switchover lever 122, and the first holding switchover member 403 is also moved in the Y1 direction. When the first holding switchover member 403 is removed from the holding member 26, the holding member 26 is pivoted in the γ2 direction by the pulling coil spring 29a, and the disk D is temporarily held between the lower face of the supporting member 21 and the holding claws 26b, 27b, and 28b of all of the holding members 26, 27, and 28.

(Setting the Disk Driving Mode)

Figure 5:
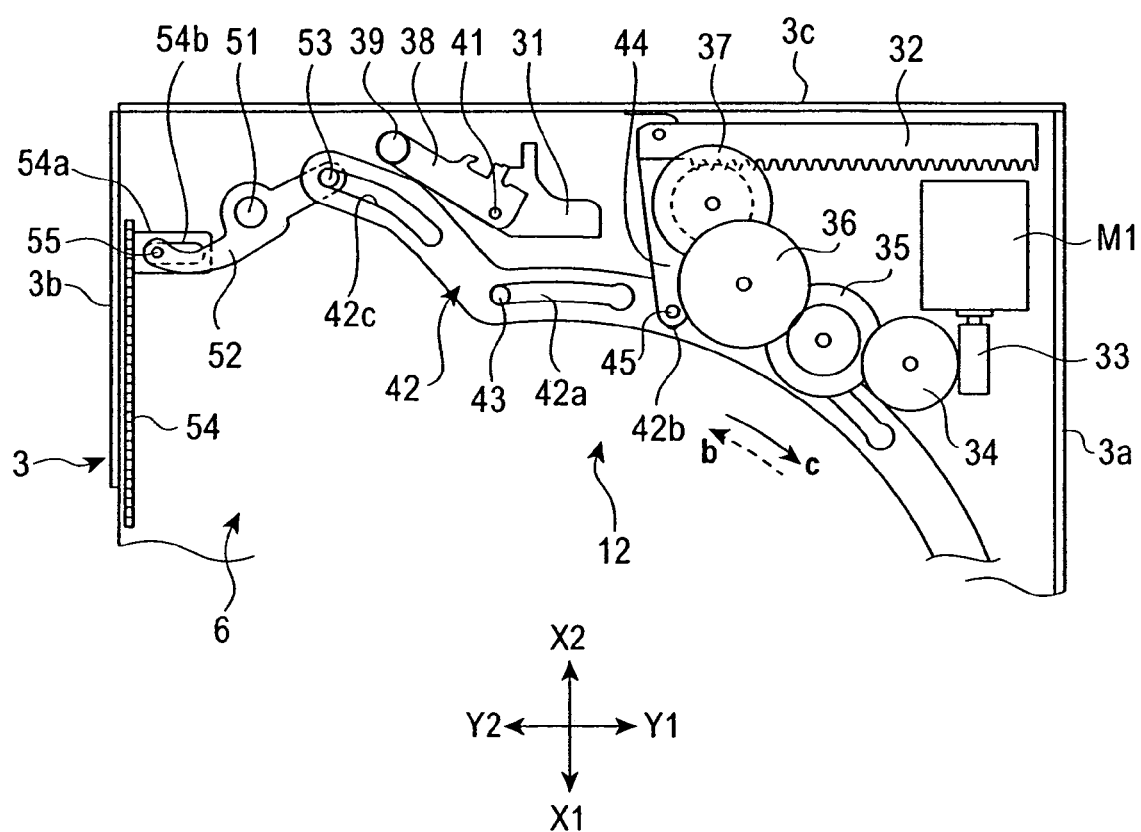

Upon the disk D held on the lower face of the supporting member 21 at the selecting position (a) having been clamped to the turntable 82, the transporting unit 17 moving to the standby position, and the insertion opening 23 being closed with the shutter 201, the first motor M1 provided to the first motive force transmission mechanism 12 starts again, and the rack member 32 is moved in the Y1 direction and moves to the end shown in FIG. 5.

As shown in FIG. 5, the motive force of the rack member 32 at this time does not act upon the slider 31 or the switchover lever 38, but the linking turning lever 44 pivots in the counter-clockwise direction and the lock switchover member 42 is moved to the end in the (c) direction. At this time, the locking member 54 is moved to the end in the X1 direction, and the locking member 61 is moved to the end in the X1 direction. Accordingly, the restricting shaft 77 provided behind the unit supporting base 13 is guided to the escape hole 56d of the lock control hole 56 formed in the locking member 54, and the restricting shafts 78 provided at the front of the unit supporting base 13 are guided to the escape holes 62d of the lock control holes 62 formed in the locking member 61, so the restriction on the restricting shafts 77 and 78 by the locking members 54 and 61 is released.

Also, upon the slider 31 having moved to the position shown in FIG. 5, the switchover lever 38 is widely pivoted in the clockwise direction by the cam portion formed on the base face 6 and the attitude control pin provided on the switchover lever 38. As shown in FIG. 7, the driving pin 41 provided on the switchover lever 38 moves to inside an escape portion 86b of a driving hole 86 formed in the driving slider 85. Accordingly, the unit supporting base 13 and the driving unit 14 are not subjected to a restriction force, and are supported elastically by the dampers 71, 72, and 73.

Also, immediately prior to the unit supporting base 13 being in the state of being elastically supported with the dampers 71, 72, and 73, the first holding switchover member 403 is moved in the Y2 direction, as shown in FIG. 21, and the holding member 26 is pivoted in the clockwise direction by the first holding switchover member 403. Also, the second holding switchover member 404 provided on the inner side of the back side face 10 is moved in the X1 direction, and the holding members 27 and 28 are pivoted in the γ3 direction by the second holding switchover member 404. Then the holding claws 26b, 27b, and 28b are moved farther to the outside than the perimeter of the disk D, and the hold on the disk D with the supporting member 21 is disengaged.

When the unit supporting base 13 is in the state of being elastically supported with the dampers 71, 72, and 73, the unit supporting base 13 is lowered, and therefore the disk D which is clamped by the turntable 82 and disengaged from the hold by the holding claws 26b, 27b, and 28b is removed slightly from the lower face of the supporting member 21 at the selection position (a) toward the Z1 side. In this state, the turntable 82 is driven by a spindle motor, the disk D is rotated, and the signal recorded on the disk D are read by the optical head 83, or a signal is recorded onto the disk D.

In the event of vibrations from the vehicle body acting upon the casing 2, the unit supporting base 13 elastically supported by the dampers 71, 72, and 73 moves vertically and horizontally, thereby reducing read error of the signals reproduced by the optical head due to the vibration absorbing functions of the dampers 71, 72, and 73.

Also, as shown in FIG. 21, when the disk D is rotationally driven by the turntable 82, the first protrusion guide member 331 is spaced above the edge portion of the disk D during rotation. Accordingly, even if another disk adjacent on the upper side of the disk D being rotationally driven is drooping down from the supporting member 21 which is in an upper position, the first protrusion guide member 331 is under this disk, and therefore the upper disk can be prevented from abutting against the disk D in rotation.

(Disk Storage Operation)

In the event of storing a disk, regarding which driving with the driving unit 14 has been completed, to the disk storing region 20, the first motor M1 of the first motive force transmission mechanism 12 is started, the rack member 32 is returned from the position shown in FIG. 5 in the Y2 direction, the linking turning lever 44 is pivoted in the clockwise direction, and the lock switchover member 42 is moved in the (b) direction. Then, the locking member 54 and the locking member 61 are moved only half the distance of the entire moving range thereof in the X2 direction. Accordingly, the restricting shaft 77 moves to the lifting portion 56b of the lock control hole 56 shown in FIG. 1, the restricting shafts 78 move to the lifting portions 62b of the lock control holes 62 shown in FIG. 2B, the unit supporting base 13 and the driving unit 14 are lifted up, and the disk D clamped onto the turntable 82 is pressed onto the lower face of the supporting member 21 at the selection position (a).

At this time, as shown in FIG. 20, the first holding switchover member 403 provided on the inner side of the left side face 9 is moved in the Y1 direction, the first holding switchover member 403 is removed from the holding member 26, and the holding member 26 is pivoted in the counter-clockwise direction by the pulling coil spring 29a. Also, the second holding switchover member 404 provided on the rear side face 10 is moved in the X2 direction, whereby the second holding switchover member 404 is removed from the holding members 27 and 28, and the holding members 27 and 28 are pivoted in the γ4 direction by the pulling coil springs 29b and 29c. Accordingly, the disk D clamped to the turntable 82 is held by the lower face of the supporting member 21 at the selection position (a) and by all of the holding claws 26b, 27b, and 28b.

Further, the second motor M2 shown in FIG. 9 is started, the pinion gear 97 is rotated in the counter-clockwise direction, and the switchover member 91 is moved in the (d) direction. When the switchover member 91 is moved to the position shown in FIG. 14, the second motor M2 stops. In the state shown in FIG. 14, the switchover shaft 363 is led into the second protrusion guide portion 165e of the guide control slot 165, the middle switchover member 361 is pivoted in the counter-clockwise direction, and the second protrusion guide member 341 is pivoted in the clockwise direction. Accordingly, as shown with a broken line in FIG. 20, the lower guide portion 342 of the second protrusion guide member 341 enters on the lower side of the disk D which is clamped to the turntable 82 and held by the holding claws 26*b*, 27*b*, and 28*b*, and the upper guide portion 343 faces the disk D from above.

Subsequently, upon the rack member 32 being moved in the Y2 direction by the first motor M1 of the first motive force transmission mechanism 12, and the slider 31 and switchover lever 38 being moved in the Y2 direction, the driving slider 85 provided on the lower face of the unit supporting base 13 is moved in the Y2 direction, the clamping mechanism provided with the turntable 82 operates, and the clamping claws are retracted to within the center protrusion portion 82*b* of the turntable 82, thereby releasing the clamping of the disk by the turntable 82.

Further, upon the rack member 32 being moved in the Y2 direction by the first motor M1 of the first motive force transmission mechanism 12, the linking turning lever 44 pivots in the clockwise direction, the lock switchover member 42 is moved in the (b) direction, the locking member 54 is returned to the initial position at the X2 side, and the locking member 61 is returned to the initial position at the X2 side. The restricting shaft 77 provided behind the unit supporting base 13 is held at the restricting portion 56*a* of the lock control hole 56, and the restricting shafts 78 provided at the front of the unit supporting base 13 are held at the restricting portions 62*a* of the lock control holes 62 formed in the locking member 61.

Accordingly, the unit supporting base 13 and the driving unit 14 are lowered to a position close to the base face 6. At this time, as shown in FIG. 20, the disk D is held by each of the holding claws 26*b*, 27*b*, and 28*b*, but the free portion of the disk D not held by each of the holding claws 26*b*, 27*b*, and 28*b* is supported from below by the lower guide portion 342 of the second protrusion guide member 341. Accordingly, in the event the driving unit 14 is lowered, the free portion of the disk D can be prevented from being lowered to the lower side, and the center convex portion 82*b* of the turntable 82 can be securely pulled out from the center hold Da of the disk D held by the supporting member 21 towards the Z1 side.

(Disk Discharging Operation)

At the time of discharging a disk D, regarding which driving at the driving unit 14 has been completed, directly from the insertion opening 23, in the disk driving mode shown in FIG. 21 the spindle motor stops, and the rotation of the turntable 82 stops. The rack member 32 of the first motive force transmission mechanism 12 is moved in the Y2 direction, and the locking members 54 and 61 are moved in the X2 direction. Accordingly, the unit supporting base 13 is lifted, and the disk D is pressed against the lower face of the supporting member 21 at the selecting position (a).

Also, the first holding switchover member 403 is moved in the Y1 direction, the second holding switchover member 404 is moved in the X2 direction, the holding member 26 is pivoted in the γ2 direction, the holding members 27 and 28 are pivoted in the γ4 direction, and the disk is temporarily held by the holding claws 26*b*, 27*b*, and 28*b* and the lower face of the supporting member 21.

Subsequently, as shown in FIG. 9, the switchover member 91 is moved in the (e) direction, and the transporting unit 17 is moved from the standby position to the transporting operation position. At this time, the transporting rollers 112 and 113 are rotated in the carry-out direction by the third motor M3. Accordingly, at the time of the transporting unit 17 turning to the transporting operation position, the Y1 edge of the disk D supported by the supporting member 21 is smoothly nipped between the transporting rollers 112 and 113 and the nipping portion 106. Note that the holding member 26 in a position close to the insertion opening 23 is pivoted in the γ1 direction as shown in FIG. 19, in accordance with the transporting unit 17 being moved to the transporting operation position.

Upon the transporting unit 17 moving to the transporting operation position and the rotation of the transporting rollers 112 and 113 stopping, the rack member 32 of the first motive force transmission mechanism 12 is further moved in the Y2 direction, the clamping of the disk D at the turntable 82 is disengaged, the locking member 54 and the locking member 61 are moved in the X2 direction by the moving force of the rack member 32 in the Y2 direction, the unit supporting base 13 and the driving unit 14 are lowered toward the base face, and the center protrusion portion 82*b* of the turntable 82 is removed in the Z1 direction from the center hole Da of the disk D. At this time, the disk D is held by the holding claws 27*b* and 28*b* as well as nipped by the transporting rollers 112 and 113 and the nipping portion 106, and therefore the turntable 82 can be easily pulled out from underneath the disk D.

Also, the shutter opening/closing member 126 moves in the X2 direction due to the moving force of the switchover member 91 in the (e) direction at the time of the transporting unit 17 moving to the transporting operation position, and as shown in FIG. 17B, the shutter 201 rises, and the insertion opening 23 is uncovered.

Also, the transporting rollers 112 and 113 are rotated in the carry-in direction, the transporting unit 17 is pivoted from the transporting operation position shown in FIG. 19 to the standby position shown in FIG. 18, and the disk D is ejected from the insertion opening 23. At this time also, as shown in FIGS. 18 and 19, the portion of the ejected disk D positioned within the casing 2 is guided between the lower guide portion 342 and the upper guide portion 343 of the second protrusion guide member 341.

Also, when discharging a disk D within the disk storing region 20, the driving unit 14 is moved to the retracted position, the transporting unit 17 is moved to the standby position, and the selecting shafts 151A, 151B, and 151C are rotated, such that the supporting member 21 holding the disk to be discharged is moved to the selecting position (a).

The driving unit 14 is then pivoted to the intervention position shown in FIG. 18, and the unit supporting base 13 and driving unit 14 are raised in the Z2 direction by the locking members 54 and 61, thereby clamping the disk D with the turntable 82. Following this the transporting unit 17 is moved to the transporting operation position, and the disk D is nipped between the transporting rollers 112 and 113, and the nipping portion 106. The clamping of the disk D with the turntable 82 is then disengaged, the center protrusion portion 82*b* of the turntable 82 is removed downwards from the center hole Da of the disk D, and the transporting unit 17 is pivoted to the standby position while rotating the transporting rollers 112 and 113 in the carry-out direction, thereby discharging the disk D from the insertion opening 23.

With the present embodiment, an arrangement is made wherein the first motive force transmission mechanism 12 is configured of the first motor M1, the reducing gears 34, 35, 36, the pinion gear 37, the rack member 32, the slider 31, and the switchover lever 38. This first motive force transmission mechanism 12 moves the driving unit 14 from the retracted position to the intervention position, and following moving the driving unit 14 from the retracted position to the intervention position, the disk D held by the supporting member 21 is clamped by the turntable 82, with the motive force of the first driving motor M1 being used to move the holding members 26, 27, and 28 from the holding position to the holding disengaged position, and the locking members 54 and 61 being moved from the restricting position for restricting elastic movement of the driving unit 14 to a restriction disengaged position wherein the restriction is disengaged.

However, it should be noted that the first motive force transmission mechanism 12 is by no way restricted to the configuration described above, and that known motive force transmission mechanisms may be used to make various modifications.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A disk-storing disk device, comprising:
    a casing having a front face, a rear face, and two side faces, said casing having an elongated insertion opening formed in said front face;
    a disk storing region, for storing a plurality of disks, in which a plurality of supporting members for supporting a disk are disposed in a stacked manner in the axial direction of the disk, said disk storing region being provided inside said casing;
    a supporting member selecting mechanism for moving said supporting members in the axial direction of the disk within said disk storing region so as to move one of said supporting members to a selecting position, said supporting member selecting mechanism being provided inside said casing;
    a driving unit for clamping a disk held by a supporting member at said selecting position and rotating said disk, said driving unit being provided inside said casing;
    a transporting mechanism for transporting a disk inserted from the insertion opening of said casing to a selected supporting member at said selecting position, said transporting mechanism being provided inside said casing;
    a mechanism supporting unit disposed within said casing beyond the perimeter of disks stored in said disk storing region, and positioned at a height between an upper limit and a lower limit of a moving region of said supporting members at the time of selection;
    a first motive force transmission mechanism provided at a position overlapping above or below said mechanism supporting unit and having a first switchover member for selectively controlling the operation of at least one type of mechanism of the disk device by the moving force of said first switchover member; and
    a second motive force transmission mechanism provided on said mechanism supporting unit and having a second switchover member for selectively controlling the operation of at least one type of mechanism of the disk device by the moving force of said second switchover member;
    wherein each of said switchover members moves in an arc path along and outside the perimeter of disks stored in said disk storing region from a region between said perimeter and said front face of the casing to a region between said perimeter and a side face of the casing, and a disk that is inserted from said insertion opening passes through a gap between said mechanism supporting unit and said first motive force transmission mechanism to be fed into said disk storing region.

2. The disk-storing disk device according to claim 1, further comprising a shutter for selectively closing the insertion opening of said casing, by the moving force of said second switchover member.

3. The disk-storing disk device according to claim 1, wherein said transporting mechanism is moved from a standby position near the insertion opening of said casing to a transporting operation position near a supporting member at said selecting position, by the moving force of said second switchover member.

4. The disk-storing disk device according to claim 1, further comprising a holding member associated with each of said supporting members, for moving between a holding position at which a disk is held and a holding disengaged position at which said holding is disengaged, wherein said holding member of a supporting member at said selecting position is operated between said holding position and said holding disengaged position by the moving force of said second switchover member.

5. The disk-storing disk device according to claim 1, said mechanism supporting unit further comprising:
    a motor for driving said second switchover member; and
    at least one gear for transmitting the motive force of said motor to said second switchover member.

6. The disk-storing disk device according to claim 1, wherein the moving range of said second switchover member is a region from the inner side of a front face of said casing where the insertion opening is formed to the inner side of a side face of said casing, and wherein the moving range of said second switchover member is set at a position vertically overlapping the carry-in path of a disk from said insertion opening to said supporting member at said selecting position.

7. The disk-storing disk device according to claim 1, wherein said mechanism supporting unit has a face parallel to a base face of said casing, and an inner edge of said mechanism supporting unit is formed as a recessed curve spaced away from the perimeter of disks within said disk storing region.

8. The disk-storing disk device according to claim 1, wherein the moving range of said supporting members within said disk storage region is a range from a position near the inner side of a base face of said casing to a position near the inner side of a ceiling face of said casing.

9. A disk-storing disk device, comprising:
    a casing having a front face, a rear face, and two side faces, said casing having an elongated insertion opening formed in said front face;
    a disk storing region, for storing a plurality of disks, in which a plurality of supporting members for supporting a disk are disposed in a stacked manner in the axial direction of the disk, said disk storing region being provided inside said casing;
    a supporting member selecting mechanism for moving said supporting members in the axial direction of the disk within said disk storing region so as to move one of said supporting members to a selecting position, said supporting member selecting mechanism being provided inside said casing;
    a driving unit for clamping a disk held by a supporting member at said selecting position and rotating said disk, said driving unit being provided inside said casing;

a transporting mechanism for transporting a disk inserted from the insertion opening of said casing to a selected supporting member at said selecting position, said transporting mechanism being provided inside said casing;

a mechanism supporting unit disposed within said casing beyond the perimeter of disks stored in said disk storing region, and positioned at a height between an upper limit and a lower limit of a moving region of said supporting members at the time of selection;

a first motive force transmission mechanism provided at a position overlapping above or below said mechanism supporting unit and having a first switchover member for selectively controlling the operation of at least one type of mechanism of the disk device by the moving force of said first switchover member;

a second motive force transmission mechanism provided on said mechanism supporting unit and having a second switchover member for selectively controlling the operation of at least one type of mechanism of the disk device by the moving force of said second switchover member; and a shutter for selectively closing an insertion opening of said casing by the moving force of said second switchover member;

wherein each of said switchover members moves in an arc path along and outside the perimeter of disks stored in said disk storing region from a region between said perimeter and said front face of the casing to a region between said perimeter and a side face of the casing, and a disk that is inserted from said insertion opening passes through a gap between said mechanism supporting unit and said first motive force transmission mechanism to be fed into said disk storing region.

10. The disk-storing disk device according to claim 9, wherein said transporting mechanism is moved from a standby position near the insertion opening of said casing to a transporting operation position near a supporting member at said selecting position, by the moving force of said second switchover member.

11. The disk-storing disk device according to claim 9, further comprising a holding member associated with each of said supporting members, for moving between a holding position in which a disk is held and a holding disengaged position in which said holding is disengaged, wherein said holding member of a supporting member at said selecting position is operated between said holding position and said holding disengaged position by the moving force of said second switchover member.

12. The disk-storing disk device according to claim 9, said mechanism supporting unit further comprising:

a motor for driving said second switchover member; and a plurality of gears for transmitting the motive force of said motor to said second switchover member.

13. The disk-storing disk device according to claim 9, wherein the moving range of said second switchover member is a region from the inner side of a front face of said casing where the insertion opening is formed to the inner side of a side face of said casing, and wherein the moving range of said second switchover member is set at a position above or below the carry-in path of a disk from said insertion opening to said supporting member at said selecting position.

14. The disk-storing disk device according to claim 9, wherein said mechanism supporting unit has a face parallel to a base face of said casing, and an inner edge of said mechanism supporting unit is spaced away from the perimeter of disks within said disk storing region.

15. The disk-storing disk device according to claim 9, wherein the moving range of said supporting members within said disk storage region is a range from a position near the inner side of a base face of said casing to a position near the inner side of a ceiling face.

* * * * *